(12) United States Patent
Papasakellariou

(10) Patent No.: US 12,445,974 B2
(45) Date of Patent: Oct. 14, 2025

(54) INFORMATION TYPE MULTIPLEXING AND POWER CONTROL

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 17/652,087

(22) Filed: Feb. 22, 2022

(65) Prior Publication Data
US 2022/0217651 A1 Jul. 7, 2022

Related U.S. Application Data

(63) Continuation of application No. 16/730,933, filed on Dec. 30, 2019, now Pat. No. 11,317,357, which is a
(Continued)

(51) Int. Cl.
*H04W 52/00* (2009.01)
*H04W 52/08* (2009.01)
(Continued)

(52) U.S. Cl.
CPC ........... *H04W 52/30* (2013.01); *H04W 52/08* (2013.01); *H04W 52/242* (2013.01);
(Continued)

(58) Field of Classification Search
CPC ... H04W 52/30; H04W 52/08; H04W 52/242; H04W 52/325; H04W 52/36;
(Continued)

(56) References Cited

U.S. PATENT DOCUMENTS 8,588,259 B2 11/2013 Papasakellariou et al.
2008/0081655 A1 4/2008 Shin et al.
(Continued)

FOREIGN PATENT DOCUMENTS

CN 103733697 A 4/2014
CN 103931242 A 7/2014
(Continued)

OTHER PUBLICATIONS

China National Intellectual Property Administration, First Office Action issued Sep. 23, 2022 regarding Application No. 201880026448.7, 17 pages.
(Continued)

*Primary Examiner* — Md K Talukder

(57) ABSTRACT

A method for a user equipment (UE) determined a total power for transmissions in a cell group (CG) or a power for transmission of a channel or signal in a cell of a CG. The method comprises receiving configuration information for first and second CGs and for first and second maximum total powers for transmissions in the first and second CGs and determining first and second total powers for transmissions in the first and second CGs, respectively. The method also comprises receiving configuration information for a set of values for one or more parameters used to determine a power for transmission of a channel or signal in a cell of a CG and an indication for a value for each parameter from the one or more parameters.

20 Claims, 30 Drawing Sheets

Related U.S. Application Data continuation of application No. 15/953,023, filed on Apr. 13, 2018, now Pat. No. 10,548,096.

(60) Provisional application No. 62/564,508, filed on Sep. 28, 2017, provisional application No. 62/562,618, filed on Sep. 25, 2017, provisional application No. 62/555,350, filed on Sep. 7, 2017, provisional application No. 62/533,294, filed on Jul. 17, 2017, provisional application No. 62/490,835, filed on Apr. 27, 2017, provisional application No. 62/488,291, filed on Apr. 21, 2017.

(51) Int. Cl.
| | | |
|---|---|---|
| *H04W 52/24* | (2009.01) | |
| *H04W 52/30* | (2009.01) | |
| *H04W 52/32* | (2009.01) | |
| *H04W 52/36* | (2009.01) | |
| *H04W 52/50* | (2009.01) | |
| *H04W 72/23* | (2023.01) | |

(52) U.S. Cl.
CPC ......... *H04W 52/325* (2013.01); *H04W 52/36* (2013.01); *H04W 52/367* (2013.01); *H04W 52/50* (2013.01); *H04W 72/23* (2023.01); *H04W 52/243* (2013.01); *H04W 52/365* (2013.01)

(58) Field of Classification Search
CPC ... H04W 52/367; H04W 52/50; H04W 72/23; H04W 52/243; H04W 52/365; H04W 52/18; H04W 52/146; H04W 72/1268; Y02D 30/70
See application file for complete search history.

(56) References Cited

U.S. PATENT DOCUMENTS

| | | | |
|---|---|---|---|
| 2008/0220806 | A1 | 9/2008 | Shin et al. |
| 2011/0171992 | A1 | 7/2011 | Seo et al. |
| 2012/0127950 | A1* | 5/2012 | Chung ............... H04L 5/0057 370/329 |
| 2013/0114505 | A1 | 5/2013 | Haim et al. |
| 2013/0176953 | A1 | 7/2013 | Stern-Berkowitz et al. |
| 2013/0322383 | A1 | 12/2013 | Dinan |
| 2014/0050205 | A1 | 2/2014 | Ahn et al. |
| 2014/0269452 | A1 | 9/2014 | Papasakellariou |
| 2014/0269454 | A1 | 9/2014 | Papasakellariou |
| 2014/0274196 | A1 | 9/2014 | Dai et al. |
| 2014/0293932 | A1* | 10/2014 | Papasakellariou .... H04L 1/0031 370/329 |
| 2014/0321442 | A1 | 10/2014 | Kim et al. |
| 2015/0358124 | A1* | 12/2015 | Suzuki ............... H04L 5/0055 370/329 |
| 2015/0358924 | A1 | 12/2015 | Papasakellariou |
| 2016/0020891 | A1* | 1/2016 | Jung .................. H04L 5/0064 370/280 |
| 2017/0013565 | A1 | 1/2017 | Pelletier et al. |
| 2017/0188311 | A1 | 6/2017 | Hwang et al. |
| 2017/0273071 | A1* | 9/2017 | Nogami ............. H04W 72/569 |
| 2018/0160375 | A1 | 6/2018 | Takeda et al. |
| 2018/0278383 | A1 | 9/2018 | Kim et al. |
| 2018/0279233 | A1 | 9/2018 | Wang et al. |

FOREIGN PATENT DOCUMENTS

| | | |
|---|---|---|
| CN | 106465295 A | 2/2017 |
| EP | 3142428 A1 | 3/2017 |
| KR | 10-2010-0034675 A | 4/2010 |
| KR | 10-2014-0097321 A | 8/2014 |
| WO | 2013165228 A1 | 11/2013 |

OTHER PUBLICATIONS

Texas Instruments, "On UL Power Control for Dual Connectivity", 3GPP TSG RAN WG1 #77, R1-142495, May 2014, 4 pages.
Intellectual Property India, Examination Report issued Feb. 9, 2022 regarding Application No. 201937042567, 6 pages.
"3rd Generation Partnership Project; Technical Specification Group Radio Access Network; Evolved Universal Terrestrial Radio Access (E-UTRA); Physical channels and modulation (Release 14)", Technical Specification 3GPP TS 36.211 V14.3.0, Jun. 2017, 195 pages.
"3rd Generation Partnership Project; Technical Specification Group Radio Access Network; Evolved Universal Terrestrial Radio Access (E-UTRA); Multiplexing and channel coding (Release 14)", Technical Specification 3GPP TS 36.212 V14.3.0, Jun. 2017, 198 pages.
"3rd Generation Partnership Project; Technical Specification Group Radio Access Network; Evolved Universal Terrestrial Radio Access (E-UTRA); Physical layer procedures (Release 14)", Technical Specification 3GPP TS 36.213 V14.3.0, Jun. 2017, 460 pages.
"3rd Generation Partnership Project; Technical Specification Group Radio Access Network; Evolved Universal Terrestrial Radio Access (E-UTRA); Medium Access Control (MAC) protocol specification (Release 14)", Technical Specification 3GPP TS 36.321 V14.3.0, Jun. 2017, 107 pages.
"3rd Generation Partnership Project; Technical Specification Group Radio Access Network; Evolved Universal Terrestrial Radio Access (E-UTRA); Radio Resource Control (RRC); Protocol specification (Release 14)", Technical Specification 3GPP TS 36.331 V14.3.0, Jun. 2017, 745 pages.
International Search Report dated Aug. 7, 2018 in connection with International Patent Application No. PCT/KR2018/004698, 7 pages.
Panasonic, "Uplink transmission power management and PHR reporting for dual connectivity", 3GPP TSG RAN WG2 Meeting #84, Nov. 11-15, 2013, 3 pages, R2-133945.
Ericsson, "UL Power control in dual connectivity", 3GPP TSG RAN WG1 Meeting #76, Mar. 31-Apr. 4, 2014, R1-141645, 5 pages.
Intel Corporation, "System information to be provided in NR", 3GPP TSG-RAN WG2 Meeting #97bis, Apr. 3-7, 2017, R2-1703440, 4 pages.
InterDigital Communications, "Power Sharing for NR", 3GPP TSG RAN WG1 Meeting #88bis, Apr. 3-7, 2017, R1-1705438, 3 pages.
Huawei et al., "Uplink Power allocation in Dual connectivity", 3GPP TSG RAN WG1 Meeting #76bis, Mar. 31-Apr. 4, 2014, R1-141134, 4 pages.
Supplementary Partial European Search Report dated Jun. 16, 2020 in connection with European Patent Application No. 18 78 7919, 13 pages.
Korean Intellectual Property Office, Decision to Grant issued Jul. 6, 2022 regarding Application No. 10-2022-7021244, 7 pages.
Qualcomm Incorporated, "Remaining Issues on Power Control for NR", 3GPP TSG RAN WG1 Meeting AH 1801, R1-1800884, Jan. 2018, 9 pages.

\* cited by examiner

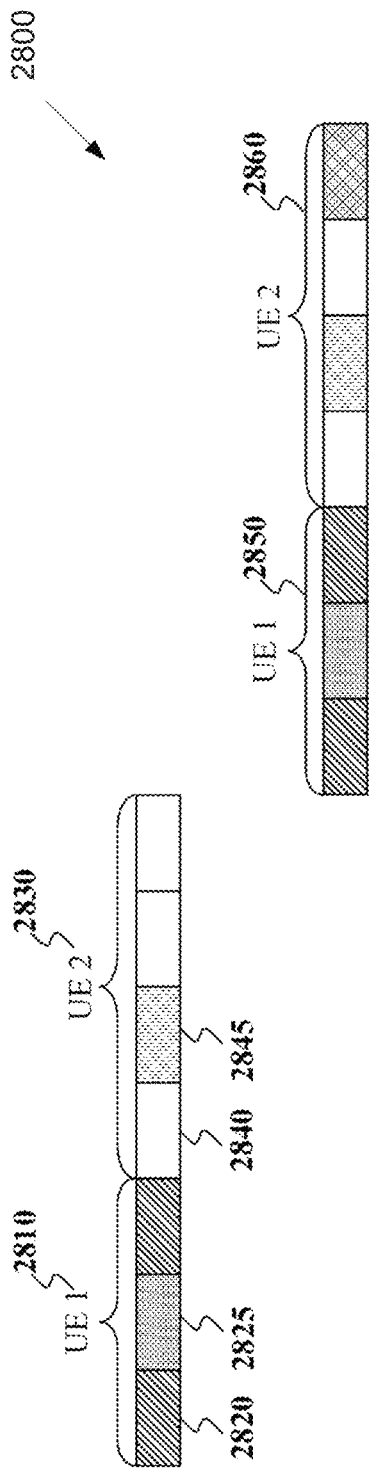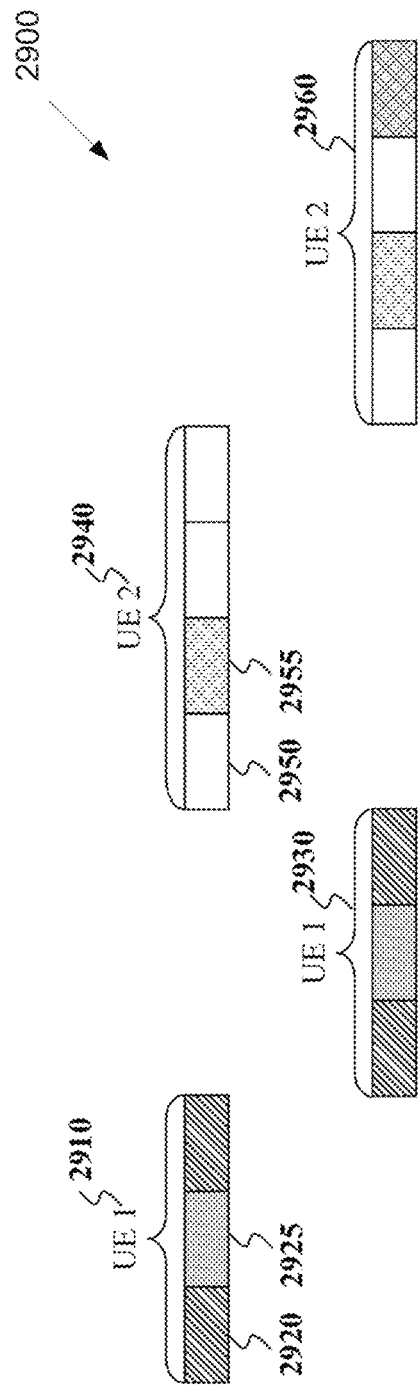
FIG. 28
FIG. 29

INFORMATION TYPE MULTIPLEXING AND POWER CONTROL

CROSS-REFERENCE TO RELATED APPLICATIONS AND CLAIM OF PRIORITY

This application is a continuation of U.S. Non-Provisional patent application Ser. No. 16/730,933 filed Dec. 30, 2019, which is a continuation of U.S. Non-Provisional patent application Ser. No. 15/953,023 filed Apr. 13, 2018, now U.S. Pat. No. 10,548,096, and claims priority to U.S. Provisional Patent Application No. 62/488,291 filed on Apr. 21, 2017; U.S. Provisional Patent Application No. 62/490,835, filed on Apr. 27, 2017; U.S. Provisional Patent Application No. 62/533,294 filed on Jul. 17, 2017; U.S. Provisional Patent Application No. 62/555,350 filed on Sep. 7, 2017; U.S. Provisional Patent Application No. 62/562,618 filed on Sep. 25, 2017; and U.S. Provisional Patent Application No. 62/564,508 filed on Sep. 28, 2017. The content of the above-identified patent document is incorporated herein by reference.

TECHNICAL FIELD

The present application relates generally to control schemes in wireless communication systems. More specifically, this disclosure relates to transmission power control, transmission of scheduling requests, and transmission of uplink control information in wireless communication systems.

BACKGROUND

5th generation (5G) or new radio (NR) mobile communications, initial commercialization of which is expected around 2020, is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beam-forming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3x, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G/NR networks may provide flexibility to support various applications meeting part of the above requirements on a use case basis.

SUMMARY

The present disclosure relates to a pre-5th-Generation (5G) or 5G/NR communication system to be provided for supporting higher data rates beyond 4th-Generation (4G) communication system such as long term evolution (LTE). Embodiments of the present disclosure provide transmission power control, transmission of scheduling requests, and transmission of uplink control information in advanced communication systems.

In one embodiment, a method for a UE to determine a transmission power during a time period is provided. The method includes receiving a configuration for a first group of cells (CG1) and for a second group of cells (CG2) and receiving a configuration for a power $P_{CMAX,max1}$ for transmissions to CG1 and for a power $P_{CMAX, max2}$ for transmissions to CG2. $P_{CMAX,max1} \le P_{CMAX}$, $P_{CMAX, max2} \le P_{CMAX}$, and $P_{CMAX}$ is a maximum power for transmissions to CG1 and CG2. The method includes computing a total power $\hat{P}_{CG1}$ for transmissions on CG1 as a smaller of $\hat{P}_{CMAX, max1}$ and a total power obtained from power control formulas for the transmissions on CG1 and computing a total power $\hat{P}_{CG2}$ for transmissions on CG2 as a smaller of (a) a smaller of $\hat{P}_{CMAX, max2}$ and a total power obtained from power control formulas for the transmissions on CG2 and (b) $\hat{P}_{CMAX} - \hat{P}_{CG1}$. $\hat{P}$ is a linear value of P and P is a value for power. Additionally, the method includes transmitting on CG1 with a total power of $\hat{P}_{CG1}$ and on CG2 with a total power of $\hat{P}_{CG2}$.

In another embodiment, a UE is provided. The UE includes a receiver configured to receive a configuration for a CG1 and for a CG2 and a configuration for a power $P_{CMAX,max1}$ for transmissions to CG1 and for a power $P_{CMAX, max2}$ for transmissions to CG2. $P_{CMAX, max1} \le P_{CMAX}$, $P_{CMAX, max2} \le P_{CMAX}$, and $P_{CMAX}$ is a maximum power for transmissions to CG1 and CG2. The UE further includes a processor configured to compute during a time period, a total power $\hat{P}_{CG1}$ for transmissions on CG1 as a smaller of $\hat{P}_{CMAX,max1}$ and a total power obtained from power control formulas for the transmissions on CG1 and a total power $\hat{P}_{CG2}$ for transmissions on CG2 as a smaller of (a) a smaller of $\hat{P}_{CMAX, max2}$ and a total power obtained from power control formulas for the transmissions on CG2 and (b) $\hat{P}_{CMAX} - \hat{P}_{CG1}$, wherein $\hat{P}$ is a linear value of P and P is a value for power. The UE further includes a transmitter configured to transmit on CG1 with a total power of $\hat{P}_{CG1}$ and on CG2 with a total power of $\hat{P}_{CG2}$ during the time period.

In yet another embodiment, a base station (BS) is provided. The BE includes a transmitter configured to transmit a configuration for a CG1 and for a CG2 and a configuration for a power $P_{CMAX,max1}$ for transmissions to CG1 and for a power $P_{CMAX,max2}$ for transmissions to CG2. $P_{CMAX, max1} \le P_{CMAX}$, $P_{CMAX, max2} \le P_{CMAX}$, and $P_{CMAX}$ is a maximum power for transmissions to CG1 and CG2. The BS further includes a receiver configured to receive, from a user equipment (UE) during a time period, a first number of signals or channels transmitted on CG1 with a total power of $\hat{P}_{CG1}$ and a second number of signals or channels transmitted on CG2 with a total power of $\hat{P}_{CG2}$. A total power $\hat{P}_{CG1}$ is a smaller of $\hat{P}_{CMAX,max1}$ and a total power from power control formulas for the transmissions on CG1. A total power $\hat{P}_{CG2}$ is a smaller of (a) a smaller of $\hat{P}_{CMAX,max2}$ and a total power from power control formulas for the transmissions on CG2 and (b) $\hat{P}_{CMAX} - \hat{P}_{CG1}$, wherein $\hat{P}$ is a linear value of P and P is a value for power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 28 illustrates an example first embodiment for TDM of two PUCCH transmissions from two respective UEs is a same slot according to embodiments of the present disclosure;

FIG. 29 illustrates an example second embodiment for TDM of two PUCCH transmissions from two respective UEs is a same slot according to embodiments of the present disclosure;

DETAILED DESCRIPTION

FIG. 1 through FIG. 38, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.3.0, "E-UTRA, Physical channels and modulation;" 3GPP TS 36.212 v14.3.0, "E-UTRA, Multiplexing and Channel coding;" 3GPP TS 36.213 v14.3.0, "E-UTRA, Physical Layer Procedures;" 3GPP TS 36.321 v14.3.0, "E-UTRA, Medium Access Control (MAC) protocol specification;" and 3GPP TS 36.331 v14.3.0, "E-UTRA, Radio Resource Control (RRC) Protocol Specification;" and U.S. Pat. No. 8,588,259, "Multiplexing Large Payloads of Control Information from User Equipments."

Figure 1:
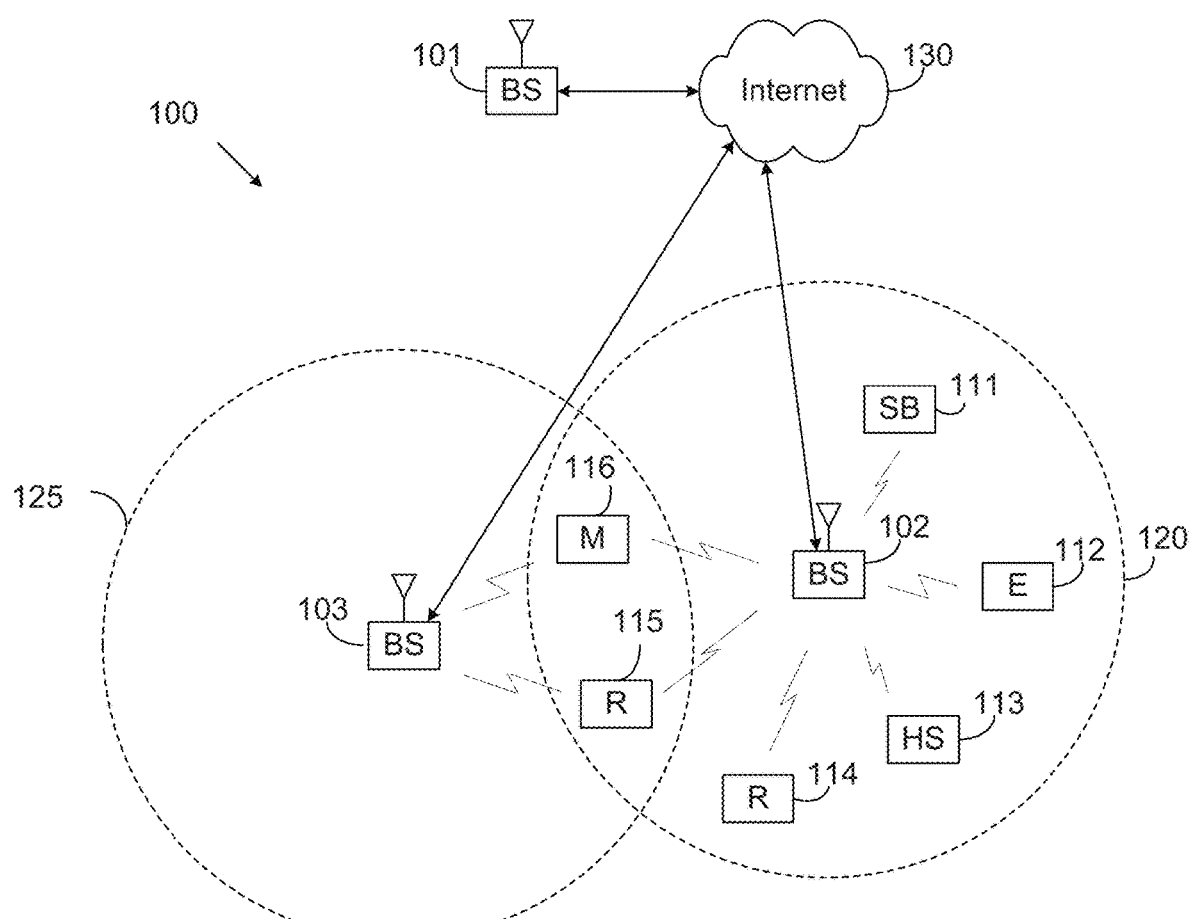
FIG. 1 illustrates an example wireless network according to embodiments of the present disclosure.
Figure 2:
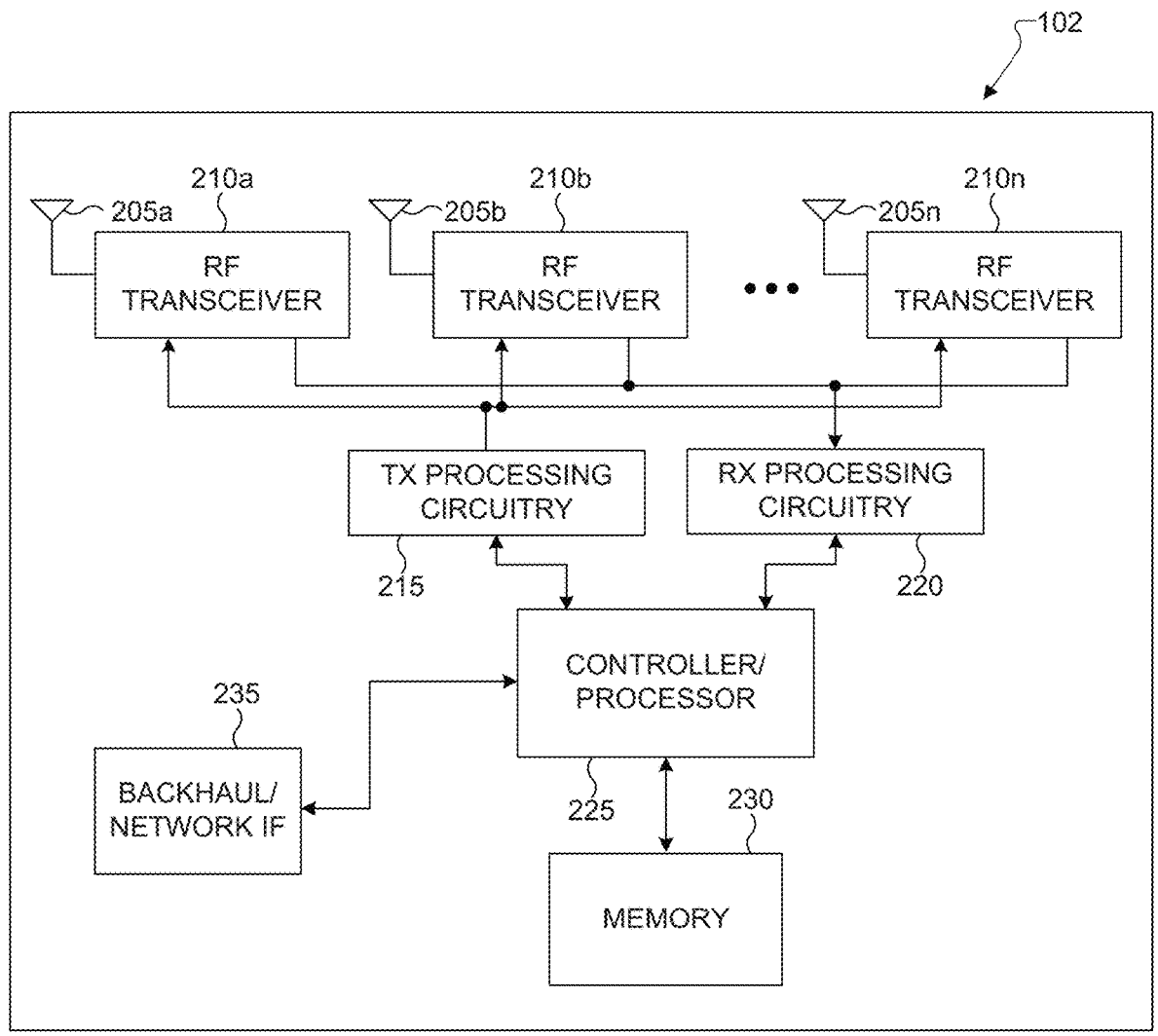
FIG. 2 illustrates an example eNB according to embodiments of the present disclosure.
Figure 3:
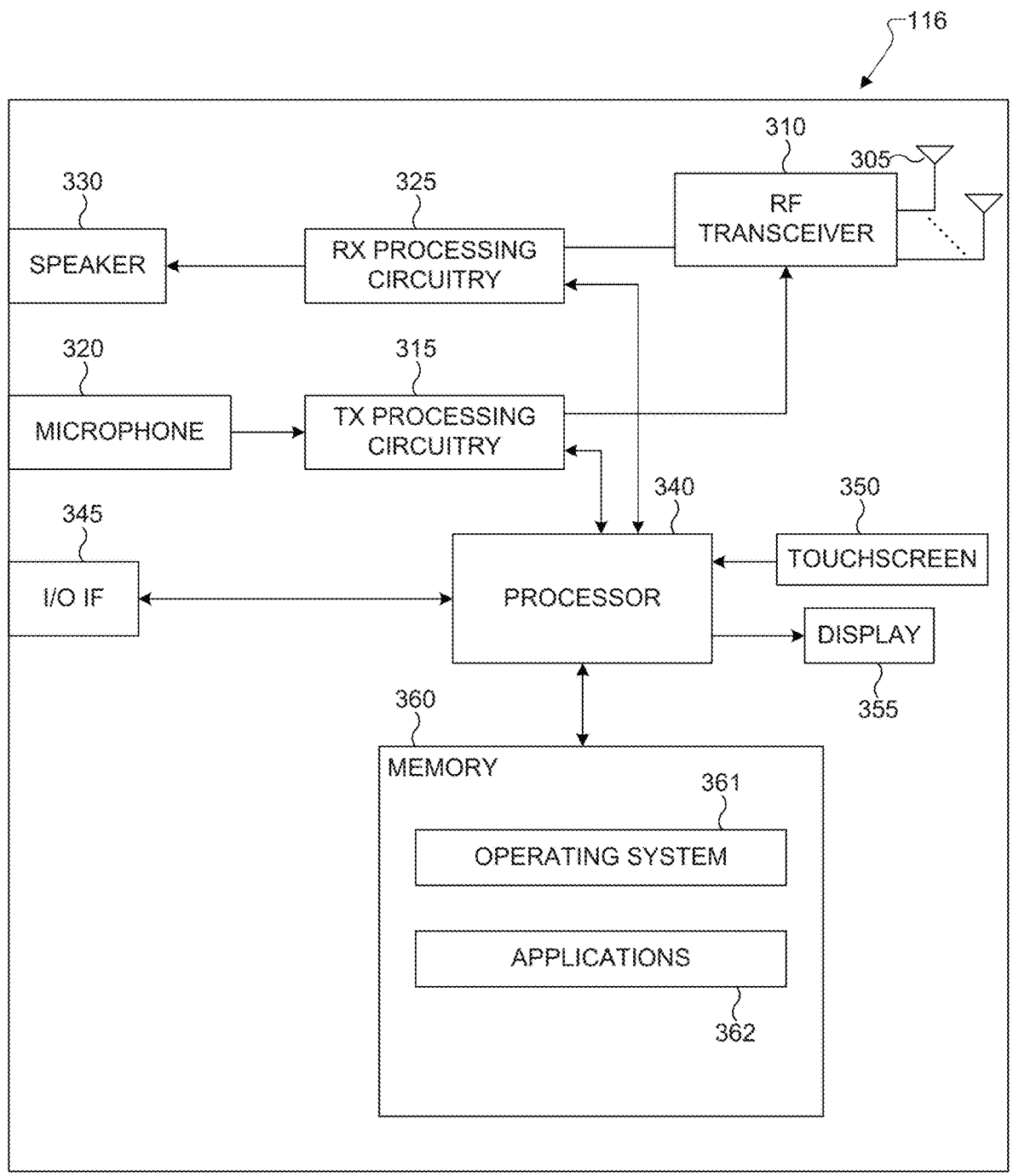
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient transmission power control, transmission of scheduling requests, and transmission of uplink control information in an advanced wireless communication system. In certain embodiments, and one or more of the eNBs 101-103 includes circuitry, programing, or a combination thereof, for efficient transmission power control, transmission of scheduling requests, and transmission of uplink control information in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G/NR, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems. In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G/NR system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more slot symbols. A slot symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can have a BW of 180 KHz and include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

Figure 4:
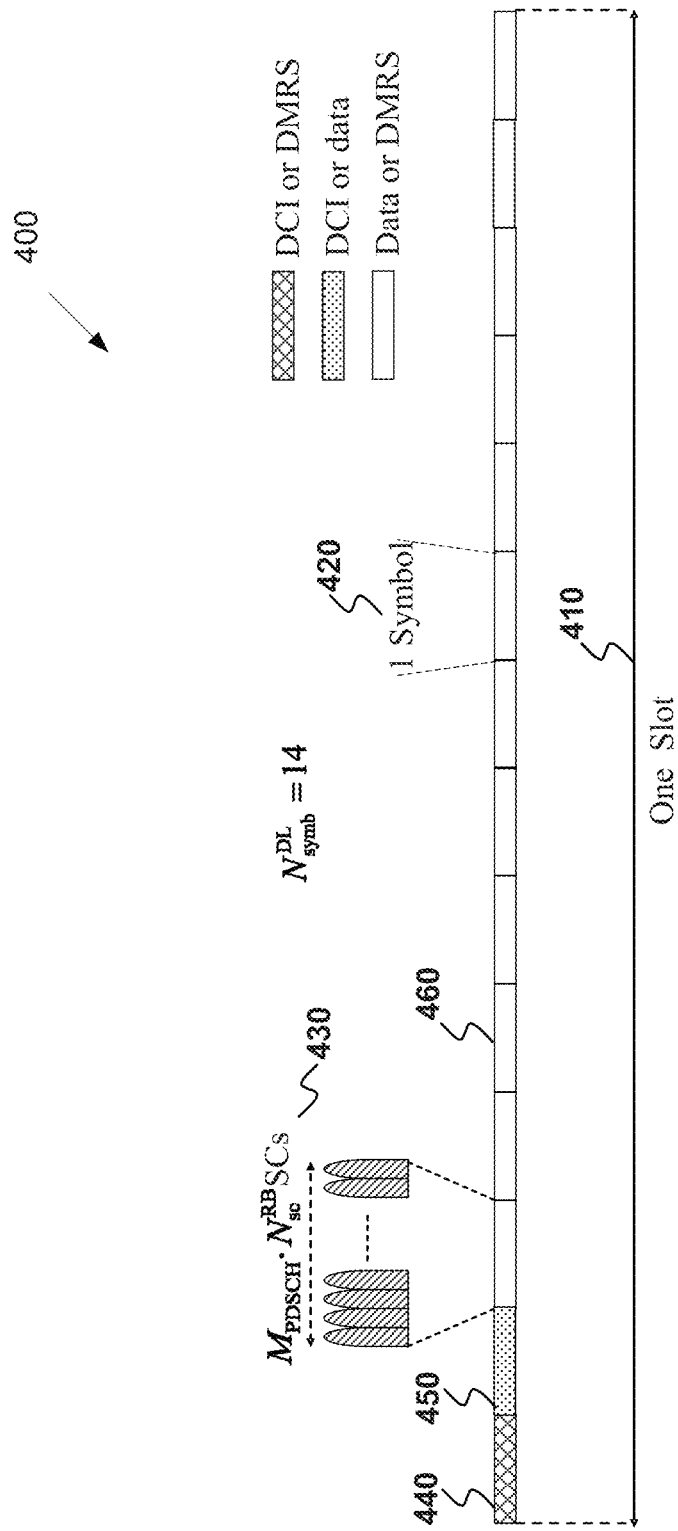
FIG. 4 illustrates an example DL slot structure according to embodiments of the present disclosure.

FIG. 4 illustrates an example DL slot structure 400 according to embodiments of the present disclosure. The embodiment of the DL slot structure 400 illustrated in FIG. 4 is for illustration only and could have the same or similar configuration. FIG. 4 does not limit the scope of this disclosure to any particular implementation.

A DL slot 410 includes $N_{symb}^{DL}$ symbols 420 where a gNB can transmit data information, DCI, or DMRS. A DL system BW includes $N_{RB}^{DL}$ RBs. Each RB includes $N_{sc}^{RB}$ SCs. A UE is assigned $M_{PDSCH}$ RBs for a total of $M_{sc}^{PDSCH} = M_{PDSCH} \cdot N_{sc}^{RB}$ SCs 430 for a PDSCH transmission BW. A PDCCH conveying DCI is transmitted over control channel elements (CCEs) that are substantially spread across the DL system BW. A first slot symbol 440 can be used by the gNB to transmit PDCCH. A second slot symbol 450 can be used by the gNB to transmit PDCCH or PDSCH. Remaining slot symbols 460 can be used by the gNB to transmit PDSCH and CSI-RS. In some slots, the gNB can also transmit synchronization signals and channels that convey system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH.

UCI includes hybrid automatic repeat request acknowledgement (HARQ-ACK) information, indicating correct or incorrect detection of data transport blocks (TB s) in a PDSCH, scheduling request (SR) indicating whether a UE has data in the UE's buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH).

Figure 5:
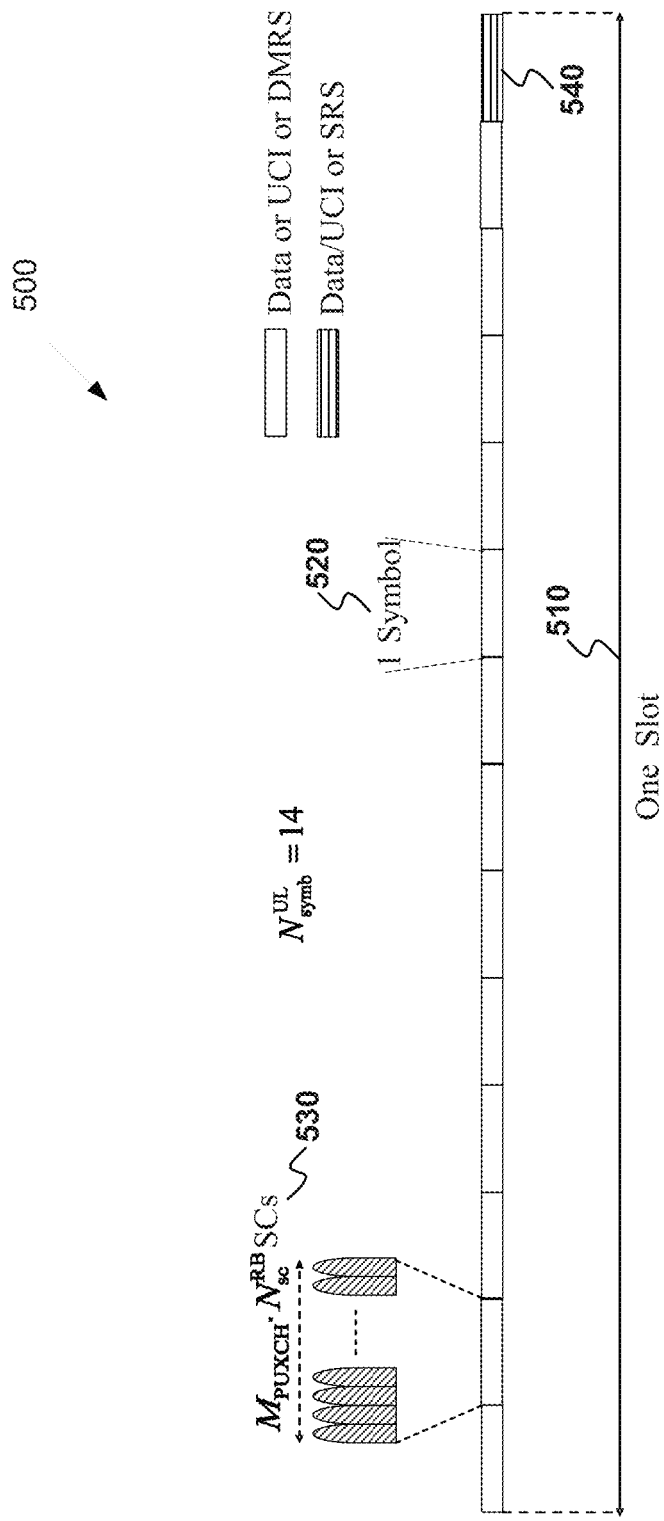
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. The embodiment of the UL slot structure 500 illustrated in FIG. 5 is for illustration only and could have the same or similar configuration. FIG. 5 does not limit the scope of this disclosure to any particular implementation.

As shown in FIG. 5, a slot 510 includes $N_{symb}^{UL}$ symbols 520 where UE transmits data information, UCI, or DMRS. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH} = M_{PUXCH} \cdot N_{sc}^{RB}$ SCs 530 for a PUSCH transmission BW ("X"="S") or for a PUCCH transmission BW ("X"="C"). Last one or more slot symbols can be used to multiplex SRS transmissions 550 or short PUCCH transmissions from one or more UEs.

A number of UL slot symbols available for data/UCI/DMRS transmission is $N_{symb}^{PUXCH} = 2 \cdot (N_{symb}^{UL} - 1) - N_{SRS}$ where $N_{SRS}$ is a number of slot symbols used for SRS transmission. Therefore, a number of total REs for a PUXCH transmission is $M_{sc}^{PUXCH} \cdot N_{symb}^{PUXCH}$. PUCCH transmission and PUSCH transmission can also occur in a same slot; for example, a UE can transmit PUSCH in the earlier slot symbols and PUCCH in the later slot symbols and then slot symbols used for PUCCH are not available for PUSCH and the reverse.

A hybrid slot includes a DL transmission region, a guard period region, and an UL transmission region, similar to a special subframe in LTE specification. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

DL transmissions and UL transmissions can be based on an orthogonal frequency division multiplexing (OFDM) waveform including a variant using DFT preceding that is known as DFT-spread-OFDM.

Figure 6:
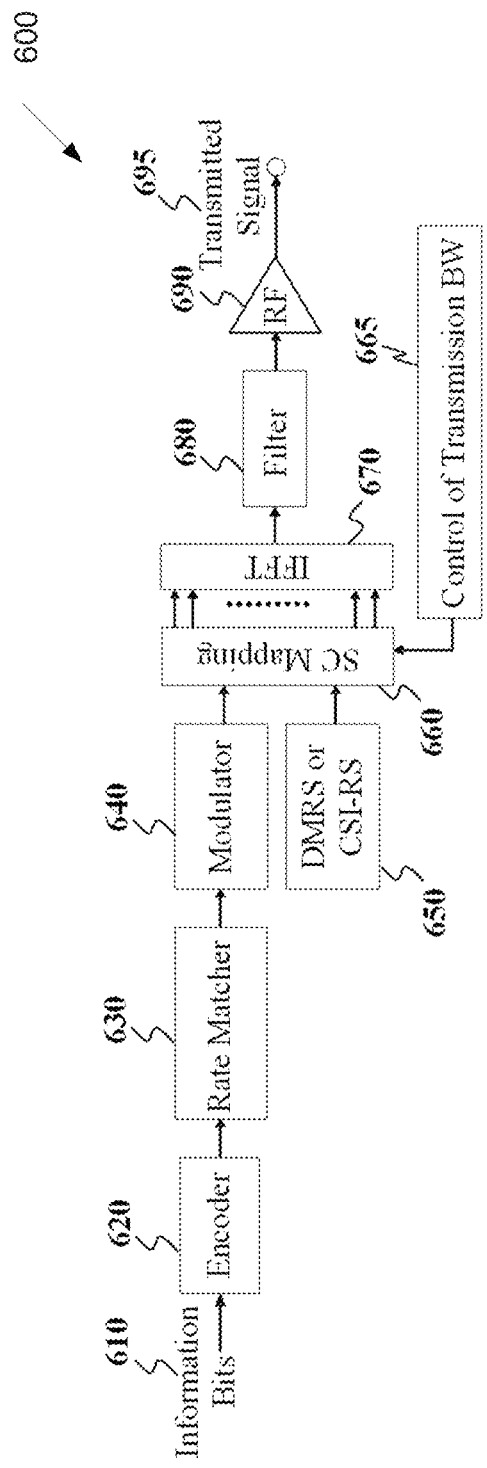
FIG. 6 illustrates an example transmitter structure using OFDM according to embodiments of the present disclosure.

FIG. 6 illustrates an example transmitter structure 600 using OFDM according to embodiments of the present disclosure. The embodiment of the transmitter structure 600 illustrated in FIG. 6 is for illustration only and could have the same or similar configuration. FIG. 6 does not limit the scope of this disclosure to any particular implementation.

As shown in FIG. 6, information bits, such as DCI bits or data bits 610, are encoded by encoder 620, rate matched to assigned time/frequency resources by rate matcher 630, and modulated by modulator 640. Subsequently, modulated encoded symbols and DMRS or CSI-RS 650 are mapped to SCs 660 by SC mapping unit 665, an inverse fast Fourier transform (IFFT) is performed by filter 670, a cyclic prefix (CP) is added by CP insertion unit 680, and a resulting signal is filtered by filter 690 and transmitted by an radio frequency (RF) unit 695.

Figure 7:
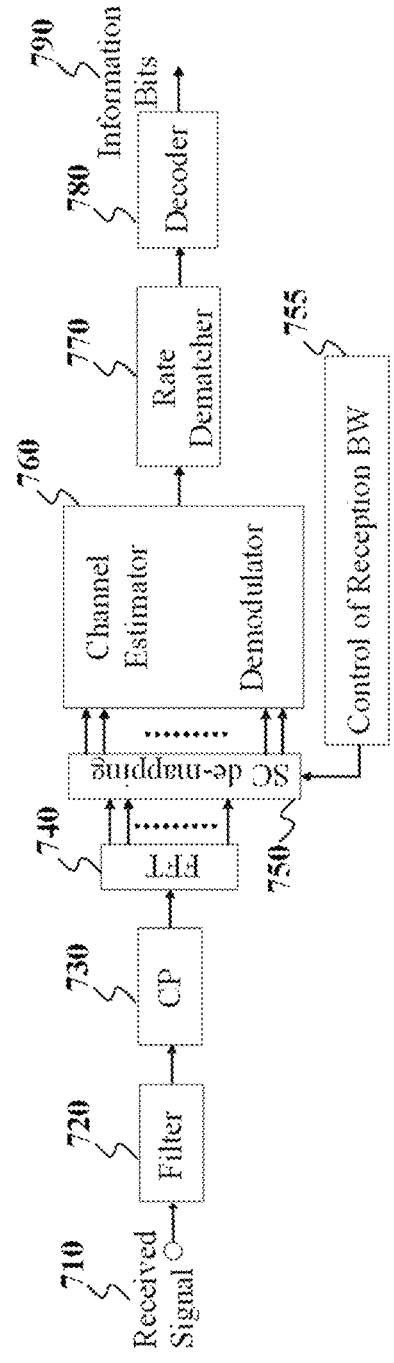
FIG. 7 illustrates an example receiver structure using OFDM according to embodiments of the present disclosure.

FIG. 7 illustrates an example receiver structure 700 using OFDM according to embodiments of the present disclosure. The embodiment of the receiver structure 700 illustrated in FIG. 7 is for illustration only and could have the same or similar configuration. FIG. 7 does not limit the scope of this disclosure to any particular implementation.

As shown in FIG. 7, a received signal 710 is filtered by filter 720, a CP removal unit removes a CP 730, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

A PUSCH transmission power from a UE is set with an objective to achieve a reliability target for associated data information by achieving a respective target received SINR at a serving cell while controlling interference to neighboring cells. UL power control (PC) includes open-loop PC (OLPC) with cell-specific and UE-specific parameters and closed-loop PC (CLPC) corrections provided to a UE by a gNB through transmission PC (TPC) commands. When a PUSCH transmission is scheduled by a PDCCH, a TPC command is included in a respective DCI format.

A UE can derive a PUSCH transmission power $P_{PUSCH,c}(i)$, in decibels per milliwatt (dBm), in cell c and slot i as in equation 1. For simplicity, it is assumed that the UE does not transmit both PUSCH and PUCCH in a same slot. For example, $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{equation 1}$$

where, $P_{CMAX,c}(i)$ is a maximum UE transmission power in cell c and slot i·$M_{PUSCH,c}(i)$ is a PUSCH transmission BW in RBs in cell c and slot i·$P_{O\_PUSCH,c}(j)$ controls a mean received SINR at the gNB in cell c and is the sum of a cell-specific component $P_{O\_NOMINAL\_PUSCH,c}(j)$ and a UE-specific component $P_{O\_UE\_PUSCE,c}(j)$ provided to the UE by the gNB through higher layer signaling. For semi-persistently scheduled (SPS) PUSCH (re)transmissions, j=0. For dynamically scheduled PUSCH (re)transmissions, j=1.

$PL_C$ is a path-loss (PL) estimate computed by the UE for cell c. For j=0 or j=1, $\alpha_c(j) \in \{0, 0.4, 0.5, 0.6, 0.7, 0.8, 0.9, 1\}$ is configured to the UE by the gNB through higher layer signaling. Fractional UL PC is obtained for $\alpha_c(j)<1$ as a path-loss (PL) is not fully compensated. $\Delta_{TF,c}(i)$ is either equal to 0 or is determined by a spectral efficiency of a PUSCH transmission as $\Delta_{TF,c}(i)=10 \log_{10}((2^{BPRE \cdot K_s}-1) \cdot \beta_{offset}^{PUSCH})$ where, $K_S$ is configured to a UE by higher layer signaling, for example as either $K_S=0$ or $K_S=1.25$ and $BPRE=O_{CQI}/N_{RE}$ for A-CSI sent via PUSCH without UL-SCH data and $$\sum_{r=0}^{C-1} K_r / N_{RE}$$

for other embodiment where C is the number of code blocks, $K_r$ is the size for code block r, $O_{CQI}$ is the number of CQI/PMI bits including CRC bits and $N_{RE}$ is the number of REs determined as $N_{RE}=M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in LTE specifications. $\beta_{offset}^{PUSCH}=\beta_{offset}^{CQI}$ for A-CSI sent via PUSCH without UL-SCH data and $\beta_{offset}^{PUSCH}=1$ otherwise.

$f_c(i)=f_c(i-1)+\delta_{PUSCH,c}(i-K_{PUSCH})$ if accumulative CLPC is used, and $f_c(i)=\delta_{PUSCH,c}(i-K_{PUSCH})$ if absolute CLPC is used where $\delta_{PUSCH,c}(i-K_{PUSCH})$ is a TPC command included in a DCI format scheduling a PUSCH or included in a DCI format 3/3A. $K_{PUSCH}$ is derived from a timeline between a slot of a PDCCH transmission scheduling a PUSCH and a TTI of a respective PUSCH transmission.

A PUCCH can be transmitted according to one from multiple PUCCH formats. A PUCCH format corresponds to a structure that is designed for a particular number of slot symbols or UCI payload range as different UCI payloads require different PUCCH transmission structures to improve an associated UCI BLER. For example, in LTE, PUCCH Format 1/1a/1b can be used for transmission of SR/HARQ-ACK payloads of 1 bit or 2 bits, PUCCH Format 3 can be used for transmission of HARQ-ACK/CSI/SR payloads from 2 bits to 22 bits, and PUCCH Format 4 or 5 can be used for transmission of HARQ-ACK/CSI/SR payloads above 22 bits.

A power control formula for a UE to determine UE a PUCCH transmission power $P_{PUCCH,c}(i)$, in decibels per milliwatt (dBm), in cell c and slot i, can depend on a respective PUCCH format. For example, for any of PUCCH formats 1/1a/1b/2a/2b/3 in LTE, a UE can determine a transmission power as in equation 2

$$P_{PUSCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{equation 2}$$

For PUCCH format 4/5, a UE can determine a transmission power as in equation 3

$$P_{PUSCH}(i) = \min\begin{Bmatrix} P_{CMAX,c}(i), \\ P_{0\_PUCCH} + PL_c + 10\log_{10}(M_{PUCCH,c}(i)) + \\ \Delta_{TF,c}(i) + +\Delta_{TxD}(F') + \Delta_{F\_PUCCH}(F) + g(i) \end{Bmatrix} [dBm] \quad \text{equation 3}$$

When a UE does not transmit a PUCCH, for the accumulation of TPC command for PUCCH, the UE assumes that a PUCCH transmit power $P_{PUCCH}$ is computed as in equation 4

$$P_{PUCCH}(i)=\min\{P_{CMAX,c}(i), P_{0\_PUCCH}+PL_c+g(i)\} \quad [dBm] \quad \text{equation 4}$$

The parameters in equation 2, equation 3, and equation 4 are as described in LTE specification and only an outline is provided below for brevity: $P_{CMAX,c}(i)$ is a maximum UE transmission power in cell c and slot i; $P_{O\_PUCCH,c}$ is a sum of a cell-specific parameter $P_{O\_NOMINAL\_PUCCH,c}$ and a UE-specific parameter $P_{O\_UE\_PUCCH,c}$ that are provided to a UE by higher layer signaling; $PL_C$ is a path-loss (PL) estimate computed by the UE for cell C; $h(\cdot)$ is a function with values depending on a format used for the PUCCH transmission and on whether HARQ-ACK, SR, or CSI is transmitted; $\Delta_{F\_PUCCH}(F)$ is provided to the UE by higher layers and a value of $\Delta_{F\_PUCCH}$ (F) depends on a respective PUCCH format (F); $\Delta_{T\times D}$(F) is non-zero if a PUCCH format F is transmitted from two antenna ports; $M_{PUCCH,c}(i)$ is a PUCCH transmission BW in RBs in cell c and slot i; $\Delta_{TF,c}(i)$ is determined by a spectral efficiency of a PUCCH transmission; and $g(i)=g(i-1)+\delta_{PUCCH}(i)$ is a function accumulating a TPC command $\delta_{PUCCH}(i)$ in a DCI Format 3/3A or in a DCI format scheduling PDSCH reception and g(0) is a value after reset of accumulation.

An SRS transmission power can be determined in association with a PUSCH transmission power. Equation 5 provides an example for a determination of an SRS transmission power:

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_C(j)\cdot PL_C+f_C(i)\}[dBm] \quad \text{equation 5}$$

where $P_{SRS\_OFFSET,c}$ (m) is configured by higher layers for periodic SRS (m=0) or for aperiodic SRS (m=1) transmissions and $M_{SRS,c}$ is an SRS transmission BW in slot i for serving cell c expressed in number of RBs. It is also possible that an SRS transmission power is not linked to a PUSCH transmission power.

A PRACH transmission power can be determined by a combination of path-loss measurements from a UE and a power ramping process, for example for contention-based transmission, or based using TPC commands when a PRACH transmission is triggered by a PDCCH order. A UE can determine an initial PRACH transmission power based on a target PRACH transmission power, preambleInitialReceivedTargetPower (in dBm), signaled in a system information block and a PL the UE measures from a RS reception as the difference of the RS transmission power that is signaled in a system information block and the RS received power (RSRP).

Therefore, a UE can determine an initial PRACH transmission power as preambleInitialReceivedTargetPower+PL. When the UE does not receive a random access response (RAR) after a PRACH transmission, the UE increases the PRACH transmission power, for example as described in LTE specification.

When a UE is power limited for transmissions of different channels or signals at a given time instance, meaning that a total power the UE computes using respective power control formulas exceeds a maximum transmission power, the UE typically first prioritizes power allocation to PRACH transmissions, then to UCI transmissions with HARQ-ACK/SR having higher priority than CSI, then to data transmissions, and finally to SRS transmissions. All data information is typically considered to have a same priority and a same power scaling applies to all PUSCH transmissions at a given time instance.

A conventional mechanism for a UE to determine a PL to apply in a determination of a transmission power relies on the UE measuring a reception power of a DL signal, such as a CRS or a CSI-RS, to determine an associated RS received power (RSRP) and, based on a known transmission power for the RS, determine the PL. While this mechanism provides sufficient functionality when a RS transmission has a wide beam-width, it has limited or no applicability in several operating scenarios. A main limitation for the applicability of the conventional mechanism is that measurements based on reception of DL signals are used to determine a PL that is intended to apply to transmissions of UL signals.

A first operating scenario where a conventional mechanism for determining a PL for the purposes of UL power control is not sufficient occurs when a UE receives on a first band and transmits on a second band particularly when the separation of the first band and the second band is large or when DL and UL transmission characteristics are different. For example, a UE can be configured for DL receptions on a mmWave band in a range of 30 GHz band and for UL transmissions on a cellular band in a range of 3 GHz.

A PL that is determined on a RSRP on a higher frequency band can be inapplicable for use in determining an UL transmission power on a lower frequency band. This inapplicability is not only due to the different carrier frequencies, as the UE can also be configured or determine a PL offset to account for the difference in carrier frequencies, but also due to the potentially different transmission characteristics in the DL of the higher frequency band and in the UL of the lower frequency band. DL transmissions on the higher frequency band can be with narrow beam-width and can be associated with a transmission beamforming gain $G_{t,D}$ at a gNB and a reception beamforming gain $G_{r,D}$ at the UE and a resulting PL is then equal to $PL_D=G_{t,D}\cdot G_{r,D}(\lambda_{DL}/4\pi d)^2$ where $\lambda_{DL}$ is the wavelength for the DL carrier frequency and d in a distance from the gNB to the UE.

UL transmissions on the lower frequency band can be omni-directional (with wide beam-width) and therefore be associated with a unity beamforming gain and an appropriate PL for use in determining an UL transmission power is then equal to $PL_U=(\lambda_{UL}/4\pi d)^2$. Therefore, from a measurement of $PL_D$, a UE can determine a value of $PL_U$ as $PL_U=PL_D\cdot(\lambda_{UL}/\lambda_{DL})^2/(G_{t,D}\cdot G_{r,D})$ when the UE can know the value of $G_{t,D}\cdot G_{r,D}$.

A second operating scenario where a conventional mechanism for determining a PL for the purposes of UL power control is not sufficient occurs when a UE receives over a first narrow beam-width and also transmits over a second narrow beam-width where a location or size of the first beam-width is different than a location or size of the second beam-width. Then, assuming DL transmissions and UL transmissions on a same band (symmetric PL), $PL_U=G_{t,U}\cdot G_{r,U}/(Q_{t,D}\cdot G_{r,D})\cdot PL_D$ where $G_{t,U}$ is a transmission beamforming gain at the UE and $G_{r,U}$ a reception beamforming gain at the gNB. Therefore, in order for a UE to determine a value of $PL_U$ for use in determining an UL transmission power, the UE needs to know the value of $G_{t,U}\cdot G_{r,U}/(G_{t,D}\cdot G_{r,D})$.

Even though the UE can know the values of $G_{t,U}$ and $G_{r,D}$ as the values are respectively specific to the UE transmission beam-width and UE reception beam-width, the UE cannot be generally assumed to know the corresponding values of $G_{t,D}$ and $G_{r,U}$ for the gNB and these values can be different for different transmissions of a same channel or of different channels from the UE. For example, $G_D$ can be smaller than $G_U$ as a transmission beam-width for a RS the UE uses to derive $PL_D$ can be larger than a transmission beam-width for a data channel or control channel from the UE.

A third operating scenario where a conventional mechanism for determining a PL for the purposes of UL power control is not sufficient occurs when different RS is used for RSRP measurement at different time instances. A UE without a higher layer connection with a gNB does not have a UE-specific configuration for a RS and needs to use a UE-common RS that is typically a wide-beam signal that aims to provide synchronization or mobility support and can be for example a synchronization signal (SS). A UE with a higher layer connection with a gNB has a UE-specific configuration for a RS, such as one or more narrow-beam CSI-RS. A PL difference between a SS and a UE-specific beam-specific CSI-RS can be large.

Therefore, different power control settings can be required for UE transmissions prior to establishing a connection with a gNB where a PL measurement can be based on a SS, such as for transmissions of random access preamble or of a message 3, and for UE transmissions after establishing a connection with a gNB where a PL measurement can be based on a UE-specific and beam-specific CSI-RS.

A fourth operating scenario where a conventional mechanism for determining a PL for the purposes of UL power control is not sufficient occurs when a target BLER for data transmission from a UE can change across different scheduling occasions. For example, a first scheduling occasion can be for a data service with a target BLER of 10% while a second scheduling occasion can be for a data service with target BLER of 0.1%. Therefore, use of two or more different power control parameters for a same channel needs to be enabled in order to allow large variations in a transmission power across different scheduling occasions particularly for a data channel but potentially also for a control channel. It is also possible to enable such variations though an increased range of TPC command field in a DCI format. Prioritizations between UCI and data can also depend on a target data BLER and tolerance for retransmissions of data information.

A UE can be configured to operate with carrier aggregation (CA) or dual connectivity (DC). For operation with CA or with DC, the UE can be configured with a first group of cells comprising a master cell group (MCG) and with a second group of cell comprising a secondary cell group (SCG). The UE can be configured a first and second maximum powers for transmissions to the MCG and the SCG, respectively. Alternatively, as in LTE, the UE can be configured a first and second maximum powers for transmissions to the MCG and the SCG, respectively. A maximum UE transmission power for operation with a MCG and a SCG can be semi-statically partitioned between the MCG and the SCG or dynamic power sharing can be possible under certain conditions where transmissions on the SCG can use leftover power from transmissions on the MCG, and the reverse, subject to a total transmission power not exceeding the maximum UE transmission power for operation with the MCG and the SCG. A power control mechanism can depend on whether transmissions on different cells have a same duration and on whether transmissions on different cells are synchronized with respect to a slot boundary. Moreover, for LTE and NR coexistence at a UE, where LTE provides the MCG and NR provides the SCG, Therefore, there is a need to enable accurate path-loss settings for a UE to use in determining a transmission power under various operating scenarios.

There is another need to enable a gNB to accurately measure a path-loss that a UE experiences for UL transmissions.

There is another need to determine a transmission power for a data channel or of a control channel according to the target reliability for associated data information.

There is another need to support simultaneous transmissions of different data information types of HARQ-ACK information types having different reception reliability requirements.

There is another need to determine power prioritization rules for transmissions of different data information types or for transmissions on different sub-cells.

Finally, there is another need to determine power control mechanisms according to different operating scenarios for CA and DC and configure a UE with a power control mechanism according to an operating scenario.

In the following, for brevity, a DCI format scheduling a PDSCH transmission to a UE is referred to as a DL DCI format while a DCI format scheduling a PUSCH transmission from a UE is referred to as UL DCI format.

A primary reason that conventional mechanisms for determining a PL become insufficient for the purposes of UL transmission power control in several operating scenarios is because such mechanisms rely on measurements of DL signals that can have different transmission or reception characteristics than UL signals. It is fundamentally more appropriate for a gNB, instead of a UE, to measure a PL experienced by transmissions from the UE. The gNB can then configure the measured PL to the UE for the UE to use in a power control formula for determining a transmission power of a channel or signal to the gNB.

A gNB can obtain a PL measurement for UL transmissions from a UE by measuring a received power of signal transmissions, such as SRS transmissions, from the UE. An SRS transmission can be configured by the gNB to the UE to occur periodically, based on higher layer configuration, or to occur dynamically based on triggering by a DCI format conveyed in a PDCCH. The gNB can determine a PL as a ratio between an SRS transmission power at the UE and a measured SRS reception power at the gNB. Therefore, the gNB needs to be aware of the SRS transmission power.

Figure 8:
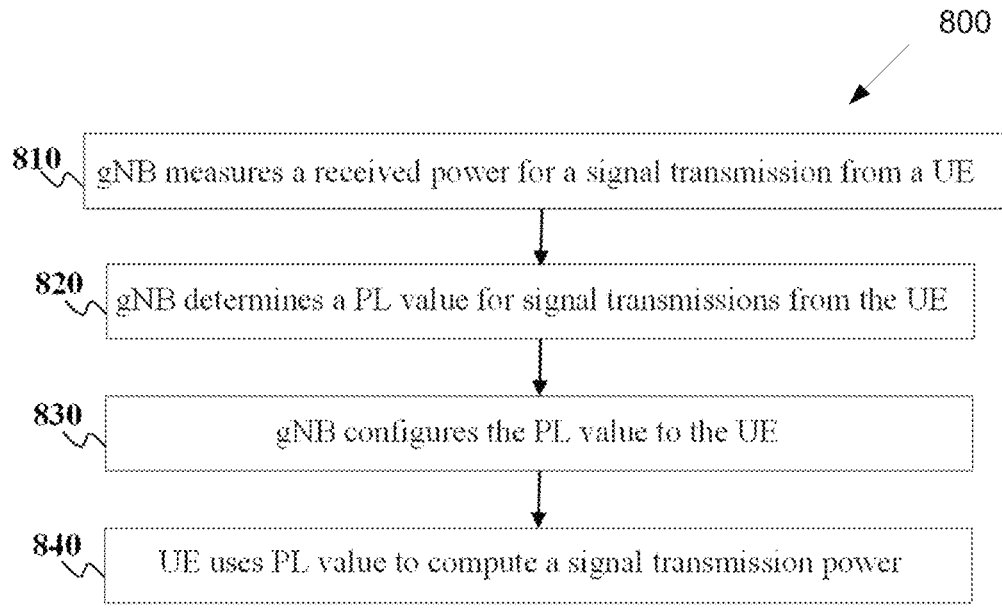
FIG. 8 illustrates a flow chart of a method for determination of a path-loss for a UE to apply for computing a transmission power according to embodiments of the present disclosure.

FIG. 8 illustrates a flow chart of a method 800 for determination of a path-loss for a UE to apply for computing a transmission power according to embodiments of the present disclosure. The embodiment of method 800 illustrated in FIG. 8 is for illustration only and could have the same or similar configuration. FIG. 8 does not limit the scope of this disclosure to any particular implementation.

As shown in FIG. 8, a UE transmits a signal, such as an SRS, and a gNB measures a received power for the signal in step 810. Based on knowledge of a transmission power for the signal, the gNB determines a value for a PL experienced for signal transmissions from the UE in step 820. The gNB configures the PL value to the UE, for example by higher layer signaling or by a field in a DCI format in step 830. The UE computes a signal transmission power based on a power control formula that uses the configured PL value as one of the UE's parameters in step 840.

An SRS transmission power can be explicitly configured by a gNB to a UE, or be specified in a system operation, or be determined by the UE based on a PL measurement from a DL RS transmitted by the gNB. In a first example, the gNB can configure a SRS transmission using a DCI format that triggers only SRS transmissions from the UE. The fields in the DCI format can include SRS transmission parameters, such as a starting bandwidth location, an SRS transmission bandwidth, a number of SRS transmissions, use of frequency hopping, a number of antenna ports for SRS transmission, a cyclic shift of a CAZAC sequence used for at least a first SRS transmission, a spectral comb, and so on. The DCI format can also include the SRS transmission power. For example, the SRS transmission power can be set to be one of $\{1/8, 1/4, 1/2, 1\}$ of a maximum UE transmission power and can be indicated by two binary elements (bits).

A similar embodiment can apply for a UE to determine an initial power, prior to potential power ramping, for a PRACH transmission at least when there is no DL signal that the UE can measure to derive a PL, such as for example when UL transmissions occur on a cellular band and DL transmissions occur on a mmWave band or, in general, when DL and UL transmissions occur in different frequency bands. An initial PRACH transmission power can be indicated in a system information block, for example using two bits to indicate an initial PRACH transmission power of {⅛, ¼, ½, 1} of a maximum UE transmission power. Alternatively, an initial PRACH transmission power offset or a path-loss offset can be indicated in a system information block for PRACH transmission in a frequency band that is different than the frequency band of the RS the UE uses for a path-loss measurement.

The system information block can also indicate RSRP ranges, such as {≤RSRP0, (RSRP0, RSRP1), (RSRP1, RSRP2), ≥RSRP2}, and therefore indicate an association among possible initial PRACH transmission power values and RSRP ranges. A UE can perform a RSRP measurement based on a DL signal, determine a range for the RSRP measurement (from the ranges indicated by the system information block), and determine an initial PRACH transmission power through the association with the RSRP range. Further, PRACH preambles can be divided into several groups according to an associated initial PRACH preamble transmission power (or according to a range for RSRP measurement).

For example, a system information block can indicate an association of a first, second, third, and fourth groups of preamble with a use of {⅛, ¼, ½, 1} of a maximum UE transmission power and with a first, second, third, and fourth RSRP ranges. Depending on the detected random access preamble, the gNB and the UE can estimate a PL for the UE and PL values can be associated with groups of random access preambles through the system information block. The UE can use a PL value for determining a power for subsequent transmissions based on the group of the last random access preamble that the UE transmitted prior to detecting a RAR.

When a UE does not receive a RAR after a first number of random access preamble transmissions for a corresponding first power, as indicated in the system information block, the UE can proceed to transmit a random access preamble with the next higher transmission second power, when any, for a maximum of a second number of transmissions as indicated in the system information block for the second power.

Figure 9:
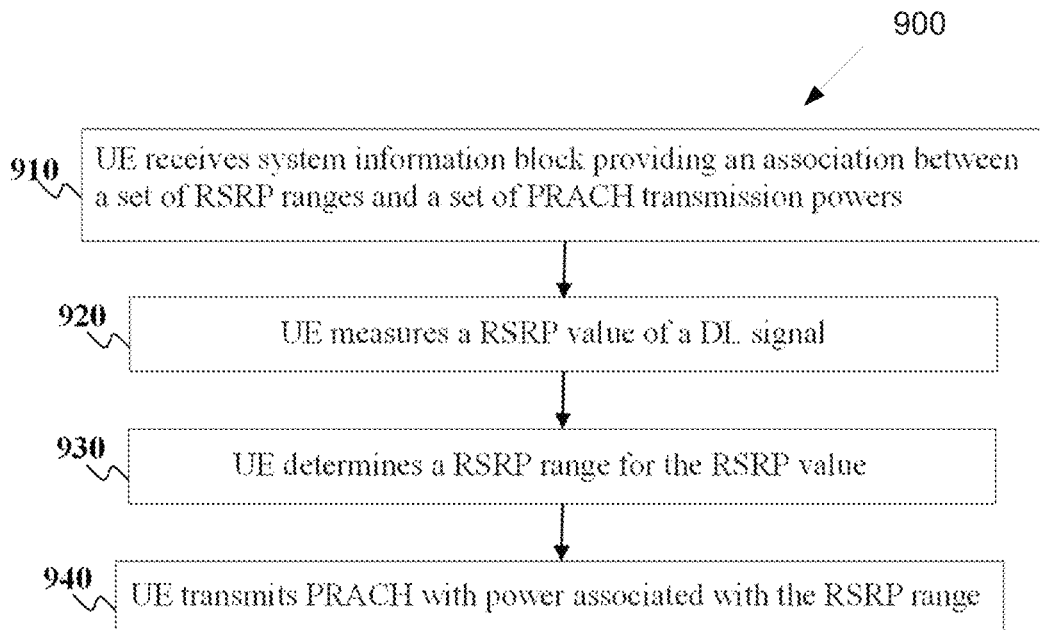
FIG. 9 illustrates a flow chart of a method for a determination for a transmission power of a random access preamble according to embodiments of the present disclosure.

FIG. 9 illustrates a flow chart of a method 900 for a determination for a transmission power of a random access preamble according to embodiments of the present disclosure. The embodiment of the method 900 illustrated in FIG. 9 is for illustration only and could have the same or similar configuration. FIG. 9 does not limit the scope of this disclosure to any particular implementation.

As shown in FIG. 9, a UE receives a system information block providing an association between a set of RSRP ranges and a set of PRACH transmission powers in step 910. The UE measures a RSRP value of a DL signal in step 920. The UE determines a RSRP range, from the set of RSRP ranges, for the RSRP value in step 930. The UE transmits a PRACH with a power, from the set of PRACH transmission powers, associated with the RSRP range in step 940.

In a second example, a UE can assist a gNB in determining a PL for the UE by reporting a transmission power for a channel or, equivalently given a maximum transmission power, by reporting a power headroom for the channel. When a UE has not yet established a higher layer connection with a gNB, the UE can include a power headroom report in an Msg3 transmission during an initial access procedure.

For example, the UE can include a power headroom report in an Msg3 transmission. The power headroom report can be for Msg3 or for a last random access preamble transmission from the UE. The power headroom can be defined as a difference between a maximum UE transmission power and a power for the Msg3 transmission or the power for the last random access preamble transmission that was detected by the gNB and resulted to a transmission of a random access response (RAR) by the gNB that scheduled the Msg3 transmission from the UE.

It is also possible that instead of a power headroom report, the UE reports the Msg3 transmission power or the random access preamble transmission power. Subsequently, the gNB can use the power headroom report to estimate a path-loss for the UE. For example, from the power headroom report, the gNB can know a transmission power for the Msg3 or the random access preamble and can compute a PL value by determining a reception power for the Msg3 or the random access preamble, respectively.

The gNB can then configure the PL value to the UE in a Msg4 or in a subsequent PDSCH transmission to the UE. Same functionalities can also apply for a 2-step random access process where a random access preamble and data such as Msg3 are jointly transmitted by a UE in a first message followed by a transmission of a RAR and potential additional data information from a gNB in a second message.

Figure 10:
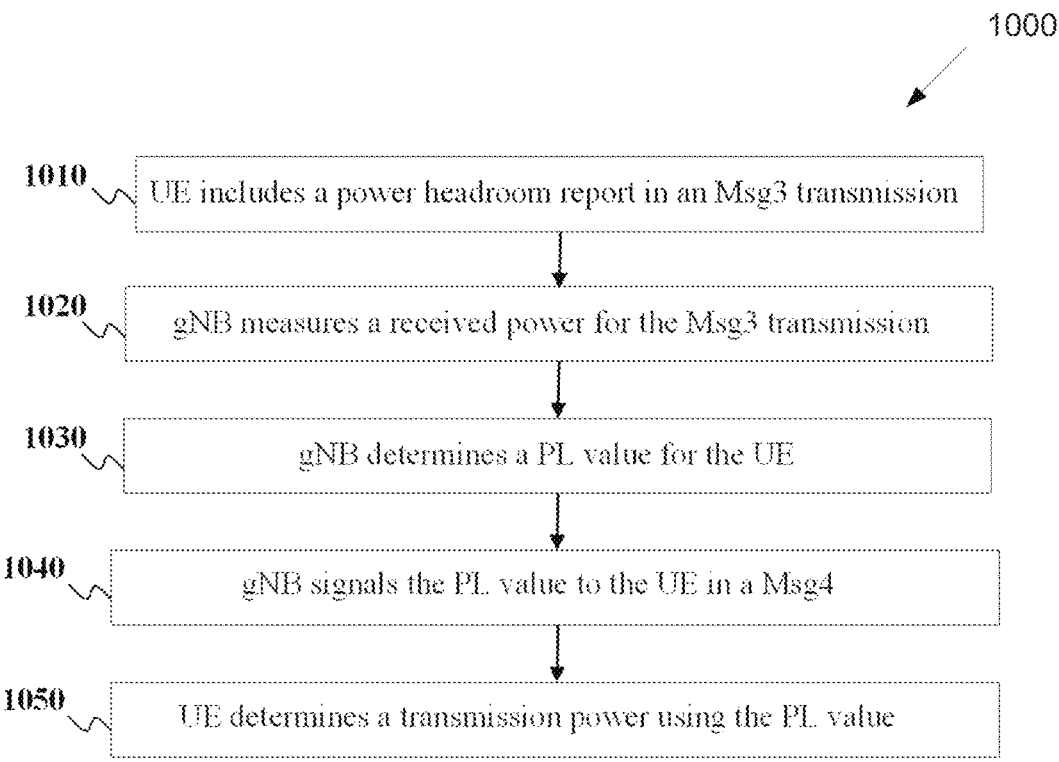
FIG. 10 illustrates a flow chart of a method for a determination for a PL during an initial access process for a UE to compute a transmission power according to embodiments of the present disclosure.

FIG. 10 illustrates a flow chart of a method 1000 for a determination for a PL during an initial access process for a UE to compute a transmission power according to embodiments of the present disclosure. The embodiment of the method 1000 illustrated in FIG. 10 is for illustration only and could have the same or similar configuration. FIG. 10 does not limit the scope of this disclosure to any particular implementation.

As shown in FIG. 10, a UE includes a power headroom report (or an actual transmission power) in an Msg3 transmission in step 1010. The power headroom report can be for a transmission of a last random access preamble or for the Msg3 (become same when combined in a single transmission for a 2-step random access process). The gNB measures a received power for the Msg3 transmission (or the received power of a previous corresponding random access preamble) in step 1020. Based on the received power measurement and on the power headroom report (or on the actual transmission power reported by the UE), the gNB determines a PL value for the UE in step 1030. The gNB signals the PL value to the UE in step 1040. The UE determines a power for subsequent transmissions based on a power control formula that include the PL value as one of the UE's parameters in step 1050.

A UE can determine a power for a Msg3 transmission based on a power control formula, for example as in LTE specification, using a PL measurement based on a DL signal, such as a SS or a CSI-RS, where a gNB informs of a transmission power for the DL signal in a system information block. Instead of using a PL measurement, a UE can determine a power for the Msg3 transmission based on a power of a last random access preamble transmission and an offset that the gNB signals in a system information block (common offset for all UEs) or in the RAR message scheduling the Msg3 transmission (UE-specific offset).

A RAR message for a UE can also include a trigger for an SRS transmission from the UE. Using a system information block, a gNB can indicate to UEs a set of SRS transmission resources and the UE can derive a resource for an SRS transmission from the set of SRS transmission resources based on a location of the RAR message for the UE in the RAR transmitted from the gNB or based on a field in the RAR message indicating a SRS transmission resource from the set of SRS transmission resources.

For example, for a set of SRS transmission resources that includes eight resources and for a RAR transmission from a gNB that includes six RAR messages to six respective UEs, a UE that identifies a fourth RAR message, from the six RAR messages in the RAR, as intended for the UE can use a fourth SRS transmission resource, from the set of twelve SRS transmission resources, for an SRS transmission triggered by a field in the fourth RAR message for the UE. In a first example, a UE can determine an SRS transmission power based on explicit signaling of the SRS transmission power in the RAR message. For example, a set of SRS transmission resources can includes four resources and a RAR message can include a field of 2 bits that indicates a SRS transmission resource from the set of SRS transmission resources.

In a second example, a UE can determine an SRS transmission power based on a transmission power of a last random access preamble prior to the RAR message reception (the RAR message can also include a power offset that the UE uses to adjust the SRS transmission power relative to the PRACH transmission power). For example, $P_{SRS}$=min $(P_{CMAX}, P_{PRACH}+10 \log_{10}(M_{SRS}/M_{PRACH})+P_{Offset})$ where $P_{Offset}$ can be zero when not included in the RAR message. It is also possible that the RAR message explicitly configures a transmission power for the SRS transmission instead of configuring a power offset.

In a third example, a UE can determine an SRS transmission power based on a power control formula, for example as in the LTE specification, where the UE can use a DL signal, such as a SS, for PL determination. A RAR message can also trigger a CSI report from a UE on a PUCCH where, similar to SRS triggering, a corresponding set of CSI-RS resources for the CSI report and a set of PUCCH resources can be indicated in a system information block or in the RAR message. When a set of PUCCH resources is indicated in a system information block, a UE can determine a PUCCH resource, from the set of PUCCH resources, based on an order of the UE's RAR message in the RAR that includes a number of RAR messages or from a field in the RAR message that indicates a PUCCH resource from the set of PUCCH resources.

Figure 11:
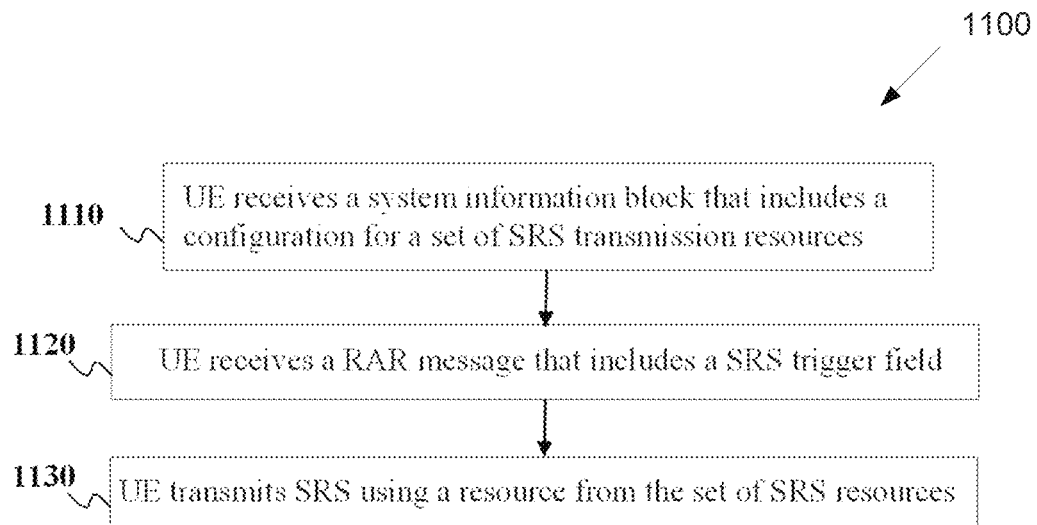
FIG. 11 illustrates a flow chart of a method for a triggering and a power determination for an SRS transmission from a UE prior to establishing a higher layer connection with a gNB according to embodiments of the present disclosure.

FIG. 11 illustrates a flow chart of a method 1100 for a triggering and a power determination for an SRS transmission from a UE prior to establishing a higher layer connection with a gNB according to embodiments of the present disclosure. The embodiment of the method 1100 illustrated in FIG. 11 is for illustration only and could have the same or similar configuration. FIG. 11 does not limit the scope of this disclosure to any particular implementation.

As shown in FIG. 11, a UE receives a system information block that includes a configuration for a set of SRS transmission resources in step 1110. After transmitting a random access preamble, the UE subsequently receives a RAR message that includes a field for triggering an SRS transmission from the UE and having a value that triggers a SRS transmission in a resource in step 1120. The UE transmits an SRS using a resource from the set of SRS resources in step 1130. The resource can be indicated in the field triggering the SRS transmission or can be determined by the UE based on the order of the RAR message in a RAR that includes a number of RAR messages.

An SRS transmission power can be determined based on an Msg3 transmission power or based on a last random access preamble power. An offset for the SRS transmission power relative to the Msg3 or the last random access transmission power can be indicated in a field in the RAR message or can be configured in the system information block.

A gNB can also obtain a PL measurement for UL transmissions from a UE after the UE establishes a higher layer connection with a gNB. The gNB can again obtain the PL measurement from a power headroom report for an UL data channel transmission and a measured received power for the UL data channel transmission, for example from the DMRS associated with the UL data channel transmission. Further, the gNB can obtain the PL measurement based on SRS transmissions from the UE where the gNB can configure the SRS transmission power or can derive the SRS transmission power from a power headroom report for an UL data channel transmission when the SRS transmission power and the UL data channel transmission power are linked, for example as in LTE specification. When the SRS transmission power and the UL data channel transmission power are not linked, the UE needs to provide a separate power headroom report for SRS transmissions.

When transmissions from a UE or receptions from a gNB are not omni-directional, the PL measurement can be per pair of UE transmission beam and gNB reception beam. A beam is typically defined from values of a set of quasi-collocation parameters such as delay spread, Doppler spread, Doppler shift, average delay, and spatial transmission/reception parameters. For example, for two UE transmission beams and two gNB reception beams and with beam reciprocity, a first PL measurement can be obtained for the pair of first UE transmission beam and first gNB reception beam and a second PL measurement can be obtained for the pair of second UE transmission beam and second gNB reception beam. Without beam reciprocity, all combinations of beams need to be considered for a PL measurement.

Therefore, a first PL measurement needs to be obtained for the pair of the first UE transmission beam and the first gNB reception beam, a second PL measurement needs to be obtained for the pair of the first UE transmission beam and the second gNB reception beam, a third PL measurement needs to be obtained for the pair of the second UE transmission beam and the first gNB reception beam, and a fourth PL measurement needs to be obtained for the pair of the second UE transmission beam and the second gNB reception beam.

A transmission power of a channel or a signal depends on the target reception reliability for associated information. For example, a PUCCH transmission can be with a larger power spectral density than a PUSCH transmission as the target reception reliability for UCI is typically higher than the target reception reliability for data information. As a consequence, different power control formulas are used for PUCCH transmissions and for PUSCH transmissions.

However, using a single power control formula for PUCCH transmissions or PUSCH transmissions fails to capture a power determination according to the data information type (data service type) as different data information types can require different BLERs.

In a first example, a UE can use at least two configurations for a set of parameters to determine a power for a PUSCH transmission according to respective at least two data information (service) types. For example, using equation 1 as reference, a UE can determine a PUSCH transmission power as in equation 5 where d is an index to a configuration, in case of multiple configurations, for a set of parameters used in determining a PUSCH transmission power. For example, d can correspond to a DL/UL beam pair. A set of parameters that can have different configurations for respective values exclude $P_{CMAX,c}(i)$ that is independent of a data information type and can also exclude $f_c(i)$ when it is used for tracking short term fading and is then independent of a data information type.

Therefore, a set of parameters that can have multiple configurations for respective values includes parameters associated with open loop power control, such as $P_{O\_PUSCH,\,c,\,d}(j)$ and $\alpha_{c,d}(j)$, and can also include $\Delta_{TF,c,d}(i)$ that is associated with a transmission power adjustment depending on a spectral efficiency for the transmission of the data information. The multiple configurations of values for the set of parameters can be signaled to a UE from a gNB by higher layers. As $P_{O\_PUSCH,\,c,\,d}(j)$ is composed of a cell-specific component and a UE-specific component, it is possible for the cell-specific component to be common to all configurations, that is be independent of parameter j or of a quasi-collocation configuration for path-loss measurement, and for the UE-specific component to be separately configured for different configurations of the power control parameters.

For path-loss measurement, a different RS signal can be used for different power control parameter configurations where, for example, a first configuration can use path-loss measurements based on either synchronization signals and possibly on a DMRS transmitted for PBCH demodulation, for example during initial access, or on a CSI-RS configured by higher layer signaling, for example after initial access and establishment of an RRC configuration with a serving gNB, and a second configuration can use path-loss measurements based on a CSI-RS configuration by higher layer signaling. Equation 5 is given by:

$$P_{PUSCH,c,d}(i) = \min\left\{ \begin{array}{l} P_{CMAX,c}(i), \\ 10\log_{10}(M_{PUSCH,c}(i)) + P_{O\_PUSCH,c,d}(j) + \\ \alpha_{c,d}(j) \cdot PL_{c,d} + \Delta_{TF,c,d}(i) + f_{c,d}(i) \end{array} \right\} [dBm] \quad \text{equation 5}$$

For a total number of D separate configurations of values for a set of parameters used for determining a PUSCH transmission power, a DCI format scheduling a PUSCH transmission can include a field with $\lceil \log_2(D) \rceil$ bits to indicate to a UE a configuration of values for the set of parameters to use in determining a PUSCH transmission power where $\lceil \; \rceil$ is the ceiling function that results the next larger integer of the ceiling function's argument.

A TPC command included in a DCI format scheduling a PUSCH transmission can also be included in a set of parameters having multiple configured values. For example, for an accumulative TPC command that includes two bits, possible values for $\delta_{PUSCH}$ can be $\{-1, 0, 1, 3\}$ dB when d=0 and $\{0, 3, 6, 9\}$ dB when d=1. For accumulative TPC commands, different $f_c(i)$ functions can apply for determining a PUSCH transmission power and, in equation 5, $f_c(i)$ is replaced by $f_{c,d}(i)$.

Different $f_{c,d}(i)$ functions/processes can correspond to different indexes and when an index $d_1$ for a first configuration of TPC command values is signaled to a UE in an UL DCI format, the UE can process the TPC command value only for $f_{c,d_1}(i)$ corresponding to index $d_1$ and not process the TPC command value for $f_{c,d_2}(i)$ corresponding to index $d_2$.

Additionally, a different processing of TPC commands can be configured for different indexes of configurations for a set of parameters used in determining a PUSCH transmission power. For example, for a first index $d_1$, TPC commands can be configured to be accumulative while for a second index $d_1$, TPC commands can be configured to be absolute. The range of absolute TPC command values can also be different for different indexes. For example, for a TPC field that includes two bits and for a first index $d_1$, absolute TPC commands can have values $\{-4, -1, 1, 4\}$ dB while for a second index $d_2$, absolute TPC commands can have values $\{-2, 0, 2, 6\}$ dB.

Figure 12:
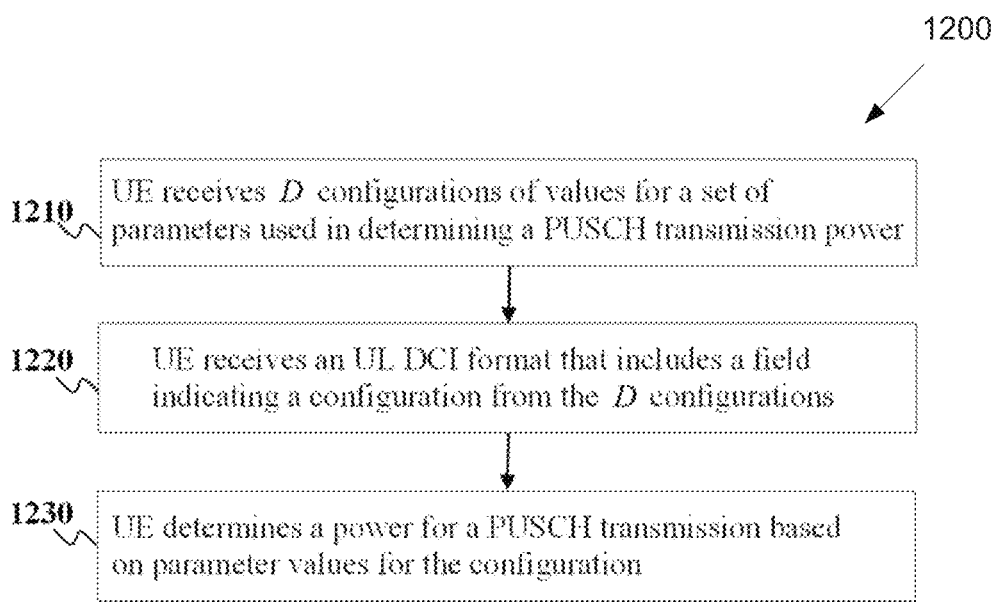
FIG. 12 illustrates a flow chart of a method for determination for a configuration of values for a set of parameters used by a UE to determine a PUSCH transmission power according to embodiments of the present disclosure.

FIG. 12 illustrates a flow chart of a method 1200 for determination for a configuration of values for a set of parameters used by a UE to determine a PUSCH transmission power according to embodiments of the present disclosure. The embodiment of the method 1200 illustrated in FIG. 12 is for illustration only and could have the same or similar configuration. FIG. 12 does not limit the scope of this disclosure to any particular implementation.

As shown in FIG. 12, a UE receives higher layer signaling for D configurations of values for a set of parameters used in determining a PUSCH transmission power in step 1210. The largest value of D and the set of parameters can be specified in a system operation. The higher layer signaling can be UE-common in a system information block or UE-specific. The UE receives an UL DCI format scheduling a PUSCH transmission and including a field of $\lceil \log_2(D) \rceil$ bits indicating one configuration from the D configurations of values for a set of parameters in step 1220. The UE determines a power for the PUSCH transmission according to the configuration of values for the set of parameters in step 1230.

Different DCI formats can be used to schedule different data information types. For example, for a same C-RNTI, a UE can be configured to decode a first DCI format having a first size and a second DCI format having a second size. Then, a different configuration for a set of parameters used in determining a PUSCH transmission power can be associated with each DCI format and explicit indication of the configuration in the DCI format is not necessary. Additionally different sets of parameters can be associated with different DCI formats and a field in a DCI format scheduling a PUSCH transmission (or PUCCH transmission, for example, for HARQ-ACK information) can indicate respective values for the parameters.

Similar, different C-RNTIs can be used to schedule different data information types and a C-RNTI mapping to a configuration of values for a set of parameters used in determining a PUSCH transmission power can be configured. Similar, different HARQ process numbers can be used to schedule different data information types. For example, for a total of 8 HARQ processes, HARQ processes with numbers of 0 to 5 can be associated with a first information type, HARQ processes with numbers 6 and 7 can be associated with a second information type, a first configuration of values for a parameter set used in determining a PUSCH transmission power can be associated with HARQ process numbers 0 to 5, and a second configuration can be associated with HARQ process numbers 6 and 7.

When a determination of an SRS transmission power is linked to determination of a PUSCH transmission power, such as for example in equation 5, a single configuration of values for set of power control parameters can be used for determining an SRS transmission power even when multiple configuration of values can be used for determining a PUSCH transmission power. This is because an accuracy of a channel estimate derived from an SRS transmission can be largely independent of target reliabilities for data information types that can be scheduled using the channel estimate obtained by the SRS transmission. Then, the SRS transmission power can be linked to a predetermined configuration of values for a parameter set used in determining a PUSCH transmission power such as a first parameter set (with index d=0) including the closed-loop component of a PUSCH power control process, $f_c(i)$, when it is not common for all configuration of values for the set of parameters.

In a second example, support for different target reception reliabilities for respective different data information (service) types can be by configuring to a UE an extended range of TPC commands and relying on closed-loop power control through the extended range of TPC commands to provide a capability for dynamic adjustments of a PUSCH transmission power. Instead of being fixed, for example to 2 bits, a size of a TPC command field in a DCI format can be configurable and can be, for example, either 2 bits or 3 bits.

To achieve a larger range for TPC command values, a gNB can configure the TPC command to include 3 bits. When accumulative closed-loop power control is used and the TPC command field includes 2 bits, respective values can be {−1, 0, 1, 3} dB, while when the TPC command includes 3 bits, respective values can be {−4, −1, 0, 1, 3, 5, 7, 9} dB. The bias toward larger TPC commands improves support of data information types requiring higher reliability while increasing the smallest negative TPC command enables to increase a reduction rate of a transmission power when a data information type requiring lower reliability is scheduled for transmission.

In one embodiment, a TPC command for a UE in a UE-group common DCI format, such as DCI format 3 or DCI format 3A, can have a fixed number of bits, such as for example 2 bits in DCI format 3 or 1 bit in DCI format 3A, even when TPC commands in a UE-specific DCI format have a configurable size. A TPC command for a UE in a UE-group common DCI format can also have a fixed mapping for the TPC command's values such as {−1, 0, 1, 3} dB for a TPC command that includes 2 bits.

In another embodiment, a TPC command for a UE in a UE-group common DCI format can have a different interpretation/mapping to power adjustments values for a different index d of $f_{c,d}(i)$. For example, for d=0, a TPC command field of 2 bits with a value set of {"00," "01," "10," "11"} can map to power adjustment values of {−1, 0, 1, 3} while, for d=1, the TPC command field of 2 bits with a value set of {"00," "01," "10," "11"} can map to power adjustment values of 1−2, 0, 2, 41.

In another embodiment, a UE can be configured multiple locations in UE-group common DCI format for respective multiple TPC commands that correspond to different indexes d of $f_{c,d}(i)$. For example, the UE can be configured a first location for a first TPC command field of 2 bits with a value set of {"00," "01," "10," "11"} mapping, for example, to power adjustment values of {−1, 0, 1, 3} for d=0 and a second location for a second TPC command field of 2 bits with value set of {"00," "01," "10," "11"} mapping, for example, to power adjustment values of {−2, 0, 2, 4} for d=1. For example, the UE can be configure a location for values of a first TPC command field corresponding to d=0 and obtain values for a TPC command field corresponding to d=1 as the value of the next TPC command field in the DCI format. It is also possible that the second TPC command field has a different number of bits than the first TPC command field.

In another embodiment, a UE can be configured different RNTIs for a UE-group common DCI format providing TPC commands for different indexes d of $f_{c,d}$. For example, the UE can be configured a first RNTI for a UE-group common DCI format for d=0 for TPC commands represented by a first number of bits and configured a second RNTI for a UE-group common DCI format for d=1 for TPC commands represented by a first number of bits.

When different functions $f_{c,d}(i)$ correspond to different indexes d for configurations of a set of parameters used for determining a PUSCH transmission power, a UE can provide separate power headroom reports for each corresponding index d. For example, when $f_{c,0}(i)$ uses TPC commands with values from {−1, 0, 1, 3} dB and $f_{c,1}(i)$ uses TPC commands with values from {−4, −1, 0, 1, 3, 5, 7, 9} dB, a UE can separately provide a first power headroom report for d=0 and a second power headroom report for d=1. Additionally, a TPC command field in a DL DCI format can be configured to have a different number of bits or different values than a TPC command field in an UL DCI format as the former is used to adjust a power of a PUCCH conveying HARQ-ACK information while the latter is primarily used to adjust a power of a PUSCH conveying data information.

When an SRS transmission power is linked to a PUSCH transmission power, a UE can ignore TPC commands with values different than a set of predetermined values for either accumulative or absolute closed-loop power control or use the nearest value from the set of predetermined values. For example, for determining an SRS transmission power, a UE can only use TPC command values corresponding to a configuration of a TPC command field with 2 bits, such as the {−1, 0, 1, 3} values, and ignore values corresponding to a configuration of a TPC command field with 3 bits that are not included in a configuration of a TPC command field with 2 bits, such as the {−4, 5, 7, 9} values.

For example, for determining an SRS transmission power, a UE can use a TPC command value from {−1, 3, 3, 3} dB when the UE receives a TPC command value from {−4, 5, 7, 9} dB, respectively, for a PUSCH transmission. For accumulative closed-loop power control, this effectively defines separate functions for processing TPC command values for SRS transmissions, $f_{SRS,c}(i)$, and for processing TPC command values for PUSCH transmissions $f_{PUSCH,c}(i)$.

Figure 13:
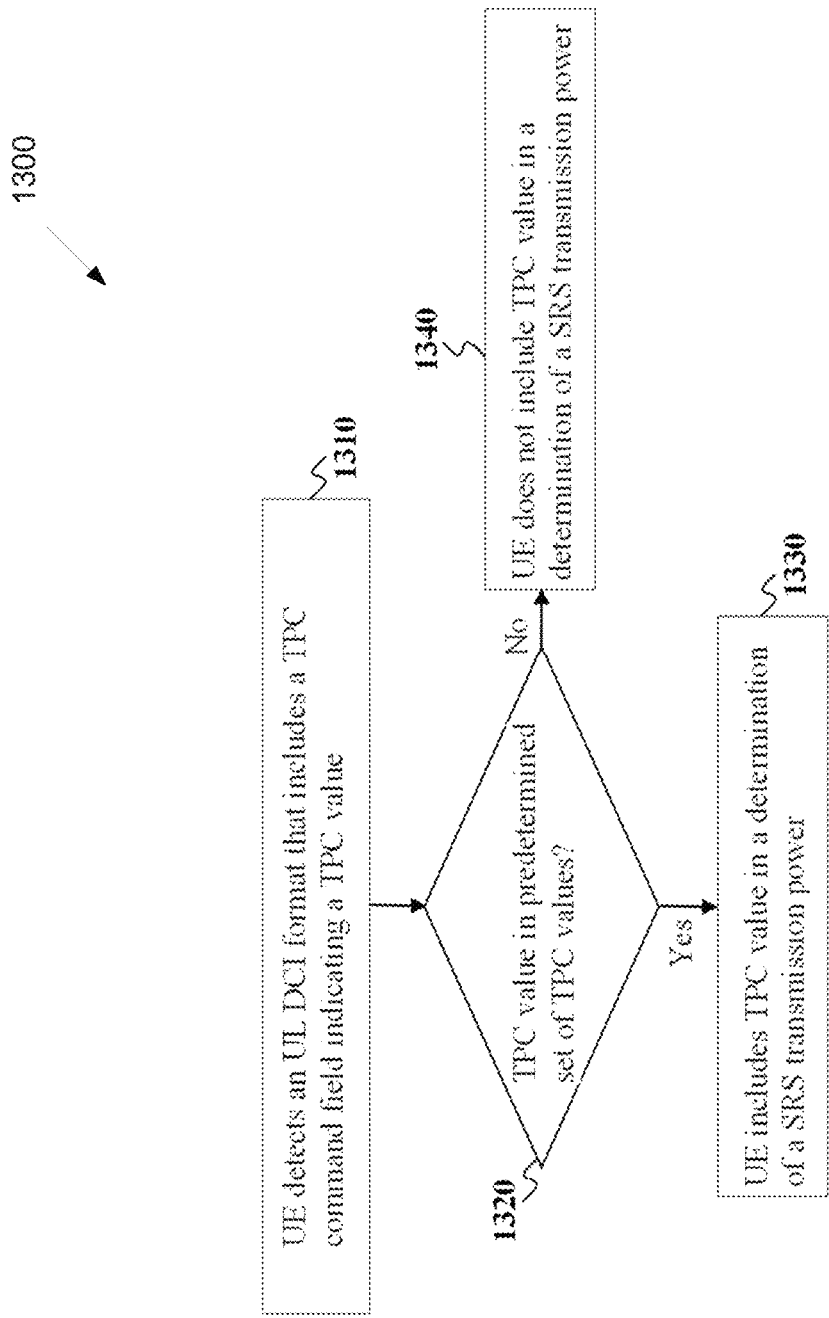
FIG. 13 illustrates a flow chart of a method for determination by a UE for a use of a TPC command in computing an SRS transmission power according to embodiments of the present disclosure.

FIG. 13 illustrates a flow chart of a method 1300 for determination by a UE for a use of a TPC command in computing an SRS transmission power according to embodiments of the present disclosure. The embodiment of the method 1300 illustrated in FIG. 13 is for illustration only and could have the same or similar configuration. FIG. 13 does not limit the scope of this disclosure to any particular implementation.

As shown in FIG. 13, a UE detects an UL DCI format scheduling a PUSCH transmission and including a TPC command field having a value for index $d_1$ indicated by the UL DCI format in step 1310. The UE determines whether the value is in a predetermined set of values for an index d for a $f_{c,d}(i)$ process in step 1320. The UE includes the value in a determination of an SRS transmission power for a $f_{c,d}(i)$ process associated with index $d_1$ in step 1330. The UE does not include the value in a determination of an SRS transmission power for a $f_{c,d}(i)$ process that is not associated with index $d_1$ in step 1340.

Support for different target reception reliabilities can also exist for HARQ-ACK transmission from a UE in response to reception of data TBs by the UE. For example, for a data information type requiring high reliability with small latency for a residual BLER of 1e-6 after one potential retransmission, a larger BLER than 1e-6 can be targeted for an initial transmission of a data TB, for example in order to increase a number of supportable UEs, and then rely on a retransmission of the data TB to reduce the BLER to 1e-6 or less. However, this requires highly reliable HARQ-ACK feedback from the UE. Conversely, for a data information type with lower reliability requirements, the reliability requirements for HARQ-ACK feedback can also be lower.

The previous mechanisms for supporting different determinations for a power of a PUSCH transmission can also apply for supporting different determinations for a power of a PUSCH transmission depending on an associated information type and a complete description is omitted for brevity. Similar to equation 5, a different configuration for a parameter set is applicable only for the open-loop power control component $P_{0\_PUCCH,c,d}$ but this can be expanded for the closed-loop power control component $g_c(i)$. Equation 6 is given by:

$$P_{PUSCH,c,d}(i) = \min\begin{Bmatrix} P_{CMAX,c}(i), \\ P_{0\_PUCCH,c,d} + PL_{c,d} + h(n_{CQI}, n_{HARQ}, n_{SR}) + \\ \Delta_{F\_PUCCH}(F) + \Delta_{TxD}(F) + g_{c,d}(i) \end{Bmatrix} [dBm] \quad \text{equation 6}$$

Similar to a PUSCH transmission power, indication of a configuration for values of a parameter set for a UE to use in determining a PUCCH transmission power can be either by explicit signaling, such as for example by higher layer signaling or by signaling in a DCI format that is associated with the PUCCH transmission, such as a DL DCI format that in response to detecting the UE transmits HARQ-ACK in a PUCCH, or implicit signaling, such as by the DCI format type or size or by the HARQ process number associated with the transmission of a data TB that is in response to reception that the UE subsequently transmits HARQ-ACK information in a PUCCH.

As a first HARQ-ACK reception reliability for a first data information type can be different than a second HARQ-ACK reception reliability for a second information type, it can be disadvantageous to multiplex first HARQ-ACK information and second HARQ-ACK information in a same HARQ-ACK codeword when the two types of HARQ-ACK information need to be transmitted at a same time. For example, first HARQ-ACK information requiring higher reliability typically involves only a few bits, such as 1 bit, while second HARQ-ACK information requiring lower reliability can involve tens of bits such as 40 bits.

For HARQ-ACK transmission of few bits, such as 1 bit, a required SINR to achieve a low BLER, such as 1e-4 BLER, is much smaller than for a required SINR for HARQ-ACK transmission of tens of bits such as 40 bits even when a corresponding BLER is larger such as 1e-3 or 1e-2. Therefore, there is a need to avoid multiplexing HARQ-ACK information for different data information types in a same HARQ-ACK codeword.

At least when a UE is not power limited and can support simultaneous PUCCH transmissions, the UE can be configured to simultaneously transmit a first PUCCH that conveys a first HARQ-ACK information type and a second PUCCH that conveys a second HARQ-ACK information type. The UE is considered to be power limited when a total power for transmitting a number of channels or signals at a given time instance exceeds a maximum power configured to the UE at the given time instance. When the UE is power limited, the UE can be configured to transmit the first PUCCH conveying the HARQ-ACK information type and either drop transmission of the second PUCCH conveying the second HARQ-ACK information type, for example when a respective HARQ-ACK codeword does not include a CRC, or transmit the second PUCCH conveying the second HARQ-ACK information type, for example when a respective HARQ-ACK codeword includes a CRC. When the UE does not support simultaneous PUCCH transmissions, the UE can drop transmission of the second PUCCH.

The UE can identify HARQ-ACK information associated with a first information type and HARQ-ACK information associated with a second information type by a field in DL DCI formats scheduling respective data TBs or by a DCI format type scheduling the respective data TBs. The field in the DCI format can be same as the field indicating a parameter set for a power control process for a UE to determine a PUCCH transmission power. Also, different DCI formats can be associated with first and second information types and a UE can determine based on a detected DCI format an association of HARQ-ACK information to a data information type. Regardless of a UE power limitation, the UE can be configured to transmit the HARQ-ACK information at different times by using time-division multiplexing for respective PUCCH transmissions.

Figure 14:
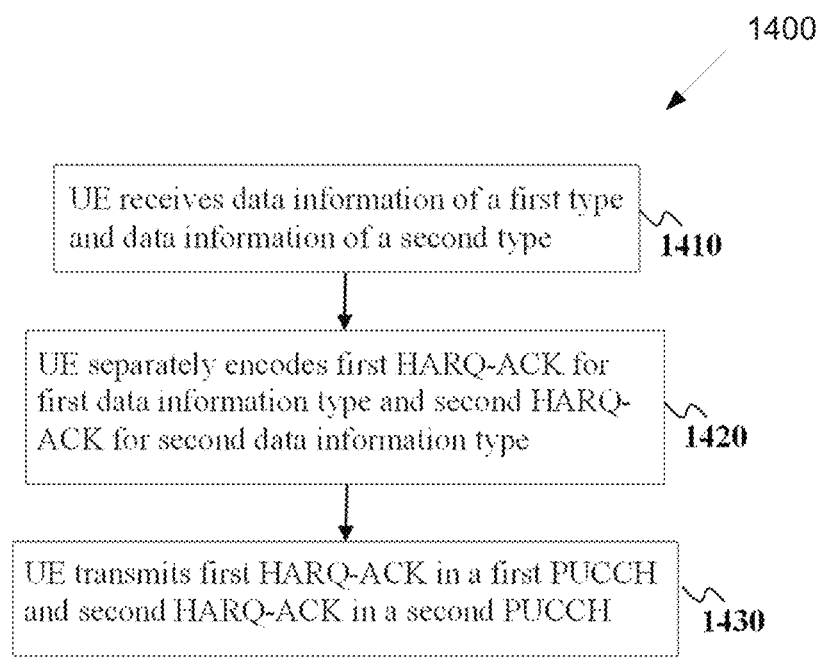
FIG. 14 illustrates a flow chart of a method for a transmission by a UE of HARQ-ACK information in response to a reception of a first data information type and of a second data information type according to embodiments of the present disclosure.

FIG. 14 illustrates a flow chart of a method 1400 for a transmission by a UE of HARQ-ACK information in response to a reception of a first data information type and of a second data information type according to embodiments of the present disclosure. The embodiment of the method 1400 illustrated in FIG. 14 is for illustration only and could have the same or similar configuration. FIG. 14 does not limit the scope of this disclosure to any particular implementation.

As shown in FIG. 14, a UE receives data information of a first type and data information of a second type in step 1410. The UE determines first HARQ-ACK information in response to correct or incorrect detection of the data information of the first type and second HARQ-ACK information in response to correct or incorrect detection of the data information of the second type. A HARQ-ACK information can correspond to correct or incorrect detection of TBs, CBs, or group of CBs and a granularity for the HARQ-ACK information can be separately configured for each data information type.

The UE can identify a data information type based on an indication in a respective DL DCI format, such as by implicit indication through a field indicating a configuration of values for a set of parameters the UE uses to determine a PUCCH transmission power or by explicit indication through a field indicating a data information type, or by a one-to-one association of a data information type with a DCI format. The UE separately encodes (including repetition coding) the first HARQ-ACK information and the second HARQ-ACK information in respective first and second HARQ-ACK codewords 1420. The UE determines a first resource for a first PUCCH transmission conveying the first HARQ-ACK codeword and a second resource for a second PUCCH transmission conveying the second HARQ-ACK codeword where the first PUCCH transmission and the second PUCCH transmission can overlap in time.

Similar considerations as for multiplexing HARQ-ACK information corresponding to different data information types in a same HARQ-ACK codeword for transmission in a PUCCH apply for multiplexing HARQ-ACK information for a first data information type in a PUSCH transmission at least when the HARQ-ACK information conveys data information of the second type. Then, the HARQ-ACK information can be transmitted in a PUCCH. When the UE is configured for simultaneous PUSCH and PUCCH transmissions, the UE can also transmit the PUSCH including with reduced power when the UE is power limited.

For transmission of different HARQ-ACK information types requiring respective different reliabilities in a PUSCH or, in general for transmission of different UCI information types requiring different reliability, different respective $\beta_{offset}^{PUSCH}$ values ($\beta_{offset}^{HARQACK}$ values) can be configured for determining a number of UCI coded modulation symbols (or PUSCH resource elements) for multiplexing HARQ-ACK in the PUSCH. For simplicity, the following descriptions consider a single set of $\beta_{offset}^{HARQ-ACK}$ values regardless of the HARQ-ACK payload or the number of data codewords in a PUSCH but multiple sets of $\beta_{offset}^{HARQ-ACK}$ values can also apply where a set can be determined based on the HARQ-ACK payload range or on the number of data codewords in the PUSCH.

When different $\beta_{offset}^{HARQACK}$ values for different HARQ-ACK information types, such as ones associated with services having different latency or reliability requirements, are configured to a UE by higher layer signaling, the UE can determine a $\beta_{offset}^{HARQACK}$ according to the HARQ-ACK information type and can separately encode different HARQ-ACK information types. For example, for multiplexing first and second HARQ-ACK information types in a same PUSCH transmission, the UE can use first and second configured $\beta_{offset}^{HARQ-ACK}$ values to determine respective resources in the PUSCH and encode the first HARQ-ACK information type separately from the second HARQ-ACK information type.

When different $\beta_{offset}^{HARQ-ACK}$ values for different HARQ-ACK information types, such as ones associated with services having different latency or different reliability requirements, are indicated to a UE by a field ("HARQ-ACK resource offset" field) in a DCI format scheduling the PUSCH transmission, a same value of the HARQ-ACK resource offset field can be used to indicate different $\beta_{offset}^{HARQ-ACK}$ values for the different HARQ-ACK information types. For example, for a HARQ-ACK resource offset field that includes 2 bits, a first set of four $\beta_{offset}^{HARQ-ACK}$ offset values configured for multiplexing a first HARQ-ACK information type, and a second set of four $\beta_{offset}^{HARQ-ACK}$ values configured for multiplexing a second HARQ-ACK information type, the same value of the HARQ-ACK resource offset field, such as the "10" value, can indicate a same index, such as the third index corresponding to the third $\beta_{offset}^{HARQ-ACK}$ value from the first set of $\beta_{offset}^{HARQ-ACK}$ values and the third $\beta_{offset}^{HARQ-ACK}$ value from the second set of $\beta_{offset}^{HARQ-ACK}$ values. It is also possible for a DCI format scheduling a PUSCH transmission from a UE to include multiple HARQ-ACK resource offset fields, one field for each HARQ-ACK information type.

A mapping of the encoded and modulated HARQ-ACK information types to PUSCH resources can be sequential where, for example, the UE first maps to PUSCH resource elements the first encoded and modulated HARQ-ACK information type and then sequentially maps to PUSCH resource elements the second encoded and modulated HARQ-ACK information type. An UL DCI format can include a first DAI field corresponding to HARQ-ACK information for PDSCH receptions (or SPS PDSCH release) associated with the first data information type and a second DAI field corresponding to HARQ-ACK information for PDSCH receptions (or SPS PDSCH release) associated the second data information type.

Figure 15:
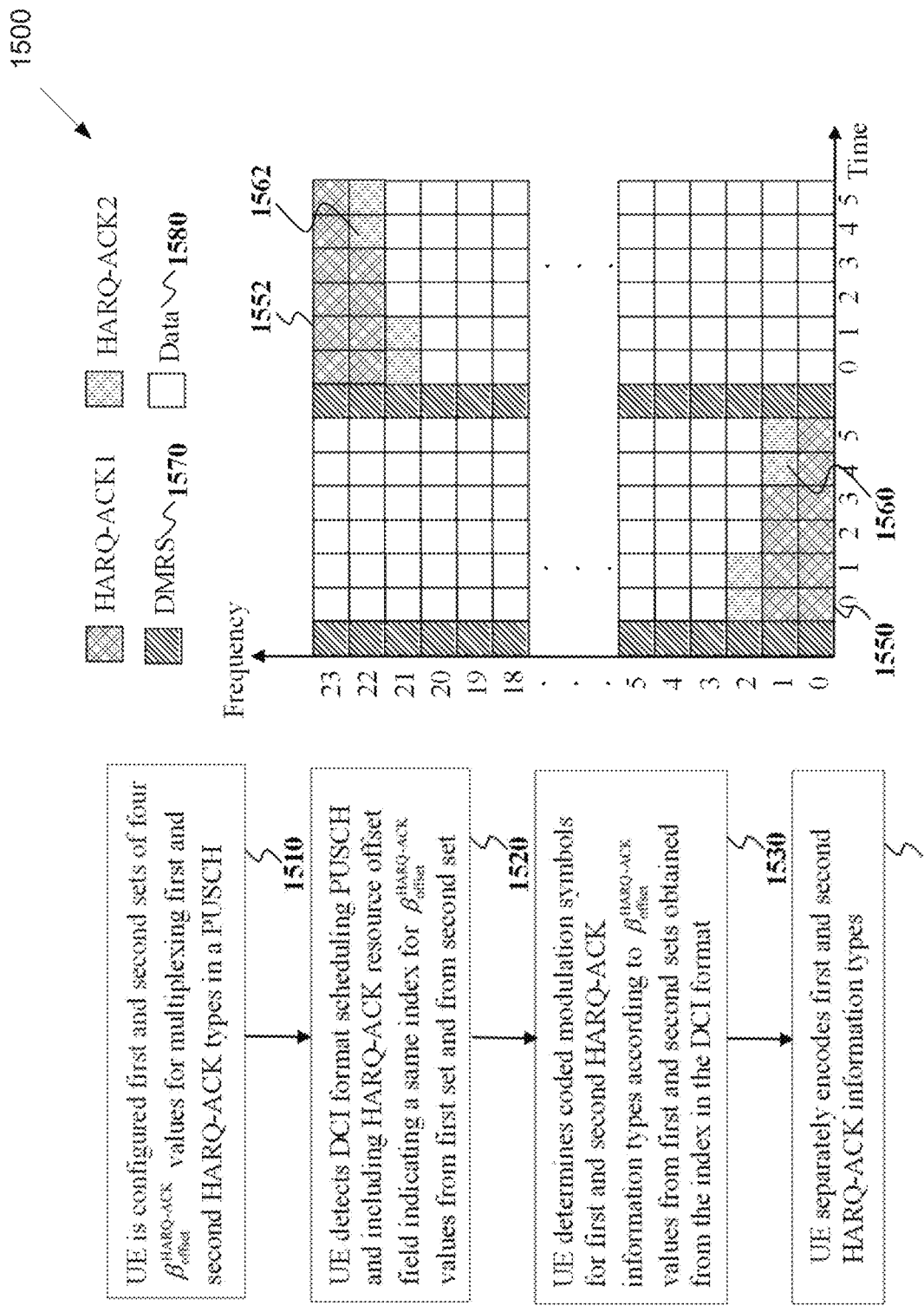
FIG. 15 illustrates a flow chart of a method for determination of different $\beta_{offset}^{HARQ-ACK}$ values for determining a number of HARQ-ACK coded modulation symbols and respective resource elements for multiplexing different HARQ-ACK information types in a PUSCH according to embodiments of the present disclosure.

FIG. 15 illustrates a flow chart of a method 1500 for determination of different $\beta_{offset}^{HARQ-ACK}$ values for determining a number of HARQ-ACK coded modulation symbols and respective resource elements for multiplexing different HARQ-ACK information types in a PUSCH according to embodiments of the present disclosure. The embodiment of the method 1500 illustrated in FIG. 15 is for illustration only and could have the same or similar configuration. FIG. 15 does not limit the scope of this disclosure to any particular implementation.

As shown in FIG. 15, a UE is configured a first set of four $\beta_{offset}^{HARQ-ACK}$ values for multiplexing a first HARQ-ACK information type in a PUSCH and is configured a second set of four $\beta_{offset}^{HARQ-ACK}$ values for multiplexing a second HARQ-ACK information type in a PUSCH in step 1510. The UE detects a DCI format scheduling a PUSCH transmission and including a HARQ-ACK resource offset field indicating a same index for a $\beta_{offset}^{HARQ-ACK}$ value from the first set and from the second set in step 1520. Based on the $\beta_{offset}^{HARQ-ACK}$ value from the first set or from the second set, and on other parameters such as the HARQ-ACK payload, the UE determines a number of HARQ-ACK coded modulation symbols and respective resource elements (REs) in the PUSCH for multiplexing for the first HARQ-ACK information type or for the second HARQ-ACK information type (it is not necessary that the UE always transmits both HARQ-ACK information types in a same PUSCH and it is possible that the UE transmits only one of the HARQ-ACK information types in a PUSCH and the other in a PUCCH) in step 1530.

The UE separately encodes the HARQ-ACK information types in step 1540. The UE can determine the HARQ-ACK payload for each HARQ-ACK information type based on a corresponding DAI field in a DCI format scheduling the PUSCH transmission in case of a dynamic HARQ-ACK codebook configuration. After encoding and modulation, the HARQ-ACK information types are mapped to REs starting with the first HARQ-ACK information type (HARQ-ACK1 in step 1550 and in step 1552) and continuing with the second HARQ-ACK information type (HARQ-ACK2 in step 1560 and in step 1562) as shown in the exemplary mapping of FIG. 15.

Prioritization rules for power allocation to different channels or signals when a UE is power limited can be configured by higher layers from a gNB at least for some channels or signals (and be predetermined in a system operation for other channel or signals). For example, prioritization rules for power allocation can be configured for all channels or signals and transmission of HARQ-ACK information can be configured to have higher priority than transmission of data information. For example, PRACH transmissions can have a default highest priority for power allocation and prioritization rules for power allocation to other channels or signals can be configured.

Higher layer configuration for power allocation rules is not always possible, for example when a UE can transmit multiple data information types and the UE is not aware at the physical layer of a transmitted data information type. For example, when a UE transmits a data information of a first type requiring typical reliability, such as BLER of 1e-1, the UE can prioritize power allocation to a channel (PUSCH or PUCCH) conveying HARQ-ACK information over a channel conveying only data information of the first type while when a UE transmits a data information of a second type requiring high reliability, such as BLER of 1e-4, the UE can prioritize power allocation to a channel conveying the data information of the second over a channel conveying HARQ-ACK information in response to a reception of data information of the first type.

For example, when a UE transmits HARQ-ACK information in response to a reception of data information of the second type, the UE can prioritize power allocation to a channel conveying the HARQ-ACK information over a channel conveying HARQ-ACK information in response to a reception of data information of the first type. For example, when a UE transmits HARQ-ACK information in response to a reception of data information of the second type or transmits data information of the second type on a cell of a primary time advance group (pTAG), the UE can prioritize power allocation to a channel conveying the HARQ-ACK information or the data information over a PRACH transmission on a cell of a secondary time advance group (sTAG).

Therefore, there is a need to enable a power limited UE to dynamically determine prioritization of power allocation to different channels or signals. As previously described, when different configurations for values of sets of parameters for a power control process of a channel are used for a UE to determine a respective transmission power for the channel, the indication of a configuration for a set of values can implicitly indicate whether or not the UE may prioritize power allocation to the channel.

Figure 16:
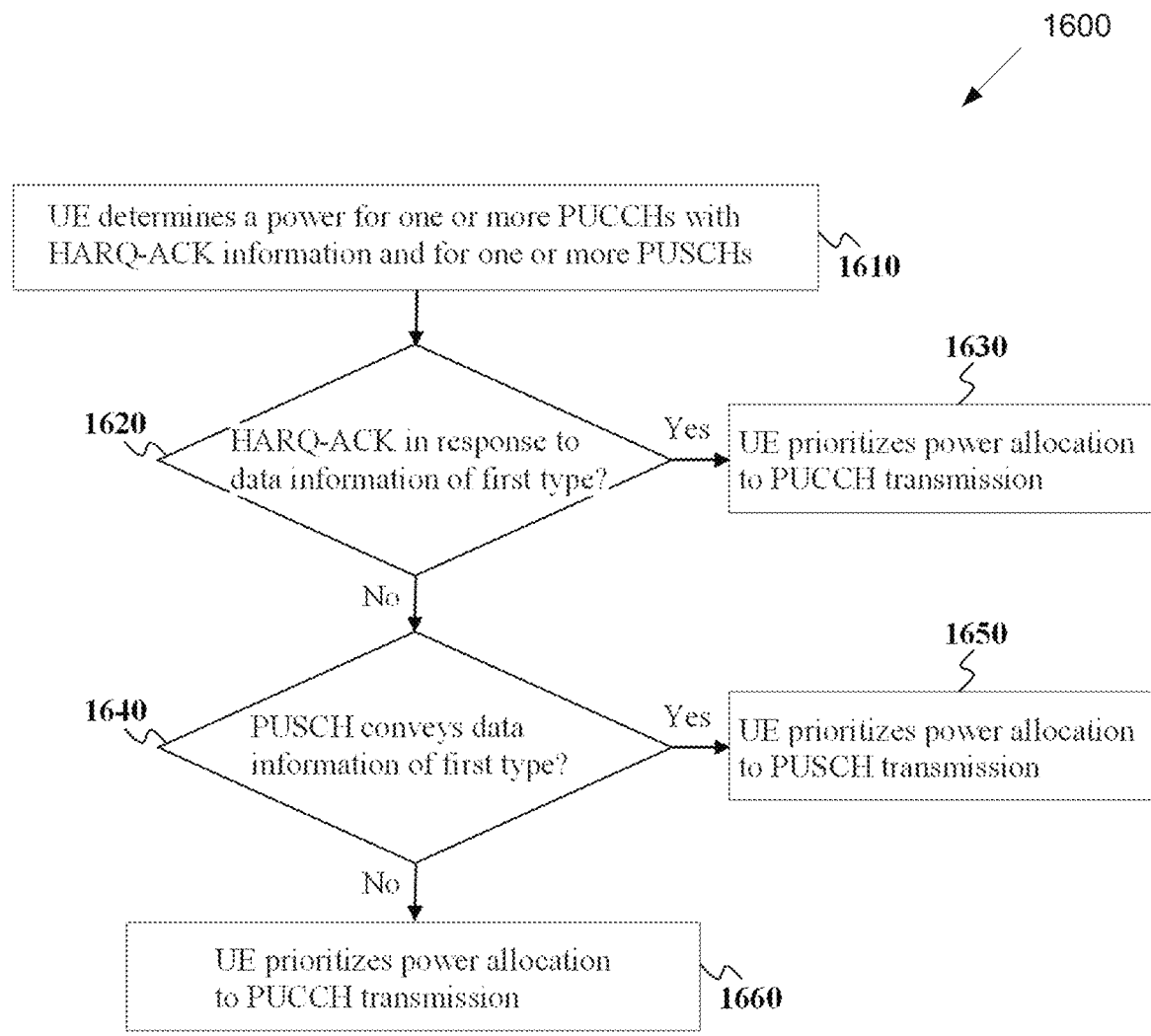
FIG. 16 illustrates a flow chart of a method for determination by a UE for prioritization of power allocation to simultaneous one or more PUCCH transmissions and one or more PUSCH transmissions according to embodiments of the present disclosure.

FIG. 16 illustrates a flow chart of a method 1600 for determination by a UE for prioritization of power allocation to simultaneous one or more PUCCH transmissions and one or more PUSCH transmissions according to embodiments of the present disclosure. The embodiment of the method 1600 illustrated in FIG. 16 is for illustration only and could have the same or similar configuration. FIG. 16 does not limit the scope of this disclosure to any particular implementation.

As shown in FIG. 16, a UE determines a power for one or more PUCCH transmissions conveying HARQ-ACK information in response to reception of data information of a first type or of a second type and for one or more PUSCH transmissions conveying data information of a first type or of a second type in step 1610. The UE determines whether a PUCCH transmission conveys HARQ-ACK information in response to reception of data information of the first type in step 1620. When the UE does, the UE prioritizes power allocation to the PUCCH transmission in step 1630. When the UE does not, the UE determines whether a PUSCH transmission conveys data information of the first type in step 1640. When the UE does, the UE prioritizes power allocation to the PUSCH transmission in step 1650. When the UE does not, the UE prioritizes power allocation to the PUCCH transmission in step 1660.

When more than one waveform can be used for PUSCH transmissions, power prioritization rules among PUSCH transmissions can consider the waveform for each PUSCH transmission. For example, when a UE simultaneously transmits a first PUSCH with a DFT-S-OFDM waveform on a first cell and a second PUSCH with an OFDM waveform on a second cell, the UE can prioritize power allocation (when power limited) to the first PUSCH transmission with the DFT-S-OFDM waveform as such waveform is typically used when a UE experiencing poor SINRs/coverage and a reduced transmission power can result to a failure by the gNB to correctly receive the first PUSCH transmission and maintain a connection with the UE particularly when the first cell in the primary cell. However, at least when both PUSCH transmissions are on secondary cells, the UE can prioritize power allocation to the second PUSCH transmission with the OFDM waveform as it is typically associated with a larger data TB sizes and a larger spectral efficiency.

When a UE operates with carrier aggregation (CA), and the UE transmits a first PUSCH on a first cell over a first number of slots and transmits a second PUSCH on a second cell over a second number of slots, where the first number of slots and the second number of slots overlap in time and the first number of slots starts earlier than the second number of slots, the following conditions can apply in determining respective PUSCH transmission powers in a first overlapping slot when the UE is power limited at least for PUSCH transmissions associated with a same traffic type with respect to power prioritization (same power control equation).

In a first embodiment, when the first PUSCH conveys a same transport block in every slot from the first number of slots, the UE prioritizes power allocation for the first PUSCH transmission and reduces a power for the second PUSCH transmission so that a maximum transmission power is not exceeded in the first overlapping slot. The same applies in a slot from all remaining overlapping slots, between the first number of slots and the second number of slots, when a total transmission power determined according to an equation, such as for example equation 1, exceeds a maximum transmission power in the slot.

In a second embodiment, when the first PUSCH conveys a different transport block in each slot from the first number of slots, the UE applies an equal power scaling for a power reduction for both the first PUSCH transmission and the second PUSCH transmission in the first overlapping slot. It is also possible for the first embodiment to apply even when the first PUSCH conveys a different transport block in each slot from the first number of slots as this can enable a gNB to assume that a transmission power for the first PUSCH is same across slots and apply filtering for DMRS received as part of PUSCH receptions in different slots.

For beam-formed transmissions from a UE, where a transmission is over a narrow beam-width instead of being omnidirectional, a cell can be viewed as comprising of multiple sub-cells (or beams) and a setting of an UL PC parameter can be per sub-cell instead of per cell. For example, for a cell c that includes $S_c$ sub-cells, each parameter in equation 1 or equation 2 that includes a cell index c can be substituted by a respective parameter that includes both a cell index c and a sub-cell index s, $0 \leq s \leq S_c - 1$. For example, in equation 1, $P_{PUSCH,c}(i)$ $P_{CMAX,c}(i)$, $M_{PUSCH,c}(i)$, $P_{O\_PUSCH,c}(i)$, $\alpha_c(j)$, $PL_c$, $\Delta_{TF,c}(i)$, and $f_c(i)$ can be respectively substituted by $P_{PUSCH,c,s}(i)$, $P_{CMAX,c,s}(i)$, $M_{PUSCH,c,s}(i)$, $P_{O\_PUSCH,c,s}(j)$, $\alpha_{c,s}(j)$, $PL_{c,s}$, $\Delta_{TF,c,s}(i)$, and $f_{c,s}(i)$ and q UE can derive a PUSCH transmission power $P_{PUSCH,c,s}(i)$ in decibels per milliwatt (dBm), in cell c, sub-cell s, and slot i as in equation 7. Equation 7 is given by:

$$P_{PUSCH,c,s}(i) = \min\left\{ \begin{array}{c} P_{CMAX,c,s}(i), \\ 10\log_{10}(M_{PUSCH,c,s}(i)) + P_{O\_PUSCH,c,s}(j) + \\ \alpha_{c,s}(j) \cdot PL_{c,s} + \Delta_{TF,c,s}(i) + f_{c,s}(i) \end{array} \right\} [\text{dBm}] \quad \text{equation 7}$$

In equation 7, when a UE transmits only on a single sub-cell in a time instance, $P_{CMAX,c,s}(i)$ can be equal to $P_{CMAX,c}(i)$. When a UE can dynamically switch a transmission beam, a field in the DCI format scheduling a corresponding transmission (PUSCH, PUCCH, or SRS) can indicate a sub-cell (beam) s, $0 \leq s \leq S_c - 1$, for the UE to use for transmission and the UE can determine an associated transmission power from a power control formula for sub-cell s, for example as in equation 7.

When a UE is configured to transmit simultaneously on a sub-set of sub-cells from the $S_c$ sub-cells, for example when a UE has multiple antenna panels, a gNB can configure a partition of $P_{CMAX,c}(i)$ to $P_{CMAX,c,s}(i)$ for each sub-cell in the sub-set of the $S_c$ sub-cells, for example in terms of percentages for a linear value of $P_{CMAX,c}(i)$. The sum of the linear values of $P_{CMAX,c,s}(i)$ for the sub-set of the $S_c$ sub-cells can be equal to or smaller than the linear value of $P_{CMAX,c}(i)$. When a UE is power limited, the power limitation is considered to be per sub-cell relative to a configured value of $P_{CMAX,c,s}(i)$ and power scaling of channels or signals is independent per sub-cell subject to a total transmission power not exceeding $P_{CMAX,c,s}(i)$.

A UE can also have multiple panels for UL transmissions and a transmission power from different panels can follow a same determination as a transmission power on different sub-cells (beams). However, when a UE transmits simultaneously a same channel from multiple panels and the UE is power limited, a scaling operation that uniformly reduces a transmission power across all panels can be problematic as, due to the different power control formulas used for different panels, the UE can be power limited for transmissions only from some panels or the required transmission power can be materially different among panels. A power headroom report also needs to be defined depending on whether or not a UE transmits from a single panel or from multiple panels.

When a UE is configured for CA operation or for dual connectivity operation, there can be more than one power control mechanisms used for transmissions on different cells and the UE can be configured by a gNB the power control mechanism to use.

When a duration for transmissions from a UE, with some exceptions such as for SRS transmissions, is always substantially same on all cells, such as for example as in LTE, a first power control mechanism for the UE to determine a transmission power in a slot can consider all cells where the UE transmits in the slot. For example, the UE can determine a PUSCH transmission power on a cell as in equation 1 and, when a total power for all PUSCH transmissions exceeds $P_{CMAX}$, the UE can apply an equal scaling to the power of PUSCH transmissions on all cells (including dropping some PUSCH transmissions on some cells).

When a duration for transmissions from a UE can be different on different cells, equal power scaling is not generally feasible in practice as a first transmission for the UE on a first cell can be ongoing when a transmission from the UE on a second cell begins and in that embodiment it can be detrimental for the UE to reduce (scale) the power of the first transmission when a total power exceeds a maximum total power. In order to enable proper functionality for a power control mechanism when durations of transmissions can be different on groups of cells, while slot durations for transmissions are same on cells in a same group of cells, a second power control mechanism can apply and a UE can be configured either a maximum total power or a minimum total power as being available for transmissions on each group of cells.

For example, for two groups of cells, a gNB can configure a UE with first and second available total powers, $P_{CMAX,max1} \leq P_{CMAX}$ and $P_{CMAX,max2} \leq P_{CMAX}$, for transmissions on the first and second groups of cells, respectively. A UE can determine a transmission power on each cell from a group of cells as in LTE by replacing $P_{CMAX}$ with the available total power for the group of cells. When a total power for transmissions in a group of cells, such as the first group of cells, exceeds a respective available total power, such as $P_{CMAX,max1}$, the UE can use additional power up to a power defined as the difference between $P_{CMAX}$ and the available total power in the other group of cells, such as $P_{CMAX} - P_{CMAX,max2}$.

For example, for two groups of cells, a gNB can configure a UE with first and second available total powers, $P_{CMAX,max1} \leq P_{CMAX}$ and $P_{CMAX,max2} \leq P_{CMAX}$, for transmissions on the first and second groups of cells, respectively. A UE can determine a transmission power on each cell from a group of cells as in LTE by replacing $P_{CMAX}$ with the maximum available total power for the group of cells. The UE can use a power of $\hat{P}_{CG1} = \min(\hat{P}_{CMAX,max1}, \hat{P}_{CG1})$ for transmissions on the first group of cells where $\hat{P}_{CG1}$ is the linear value of a total power the UE determines for transmissions on cells of the first cell group according to respective power control formulas such as, for example, in equation 1 for a PUSCH transmission.

The UE can use a total power up to $\hat{P}_{CG2} = \min(\min(\hat{P}_{CMAX,max2}, \hat{P}_{CG2}), \hat{P}_{CMAX} - \hat{P}_{CG1})$, where $\hat{P}_{CG2}$ is the linear value of a total power the UE determines for transmissions on cells of the second cell group according to respective power control formulas.

The first group of cells can use a longer scheduling duration than the second group of cells and a scheduling duration on the second group of cells does not extend past a first scheduling duration on the first group of cells. For example, when a scheduling duration on the first group of cells is 1 millisecond (msec), a scheduling duration on the second group of cells can be 0.5 msec or 0.25 msec and one scheduling duration on the second group of cells starts at a same symbol as the scheduling duration in the first group of cells (i.e. transmissions on the two groups of cells are synchronized with respect to slot boundaries and a beginning or end of a slot boundary on the first group of cells is also a beginning of a first slot or an end of a second slot, respectively, on the second group of cells).

Otherwise, if transmissions on the two cell groups can be asynchronous (without alignment of slot boundaries), it can be assumed that $P_{CMAX,max1} + P_{CMAX,max2} = P_{CMAX}$, $\hat{P}_{CG1} = \min(\hat{P}_{CMAX,max1}, \hat{P}_{CG1})$, and $\hat{P}_{CG2} = \min(\hat{P}_{CMAX,max2}, \hat{P}_{CG2})$. The principles for CA power control over groups of cells with slot boundary alignment can be extended to power control for synchronous dual connectivity. The principles for CA power control over groups of cells without slot boundary alignment can be extended to power control for asynchronous dual connectivity.

For CA operation, a UE can be configured to use the first power control mechanism, for example as in LTE CA, or use the second power control mechanism (with a configuration of cell groups and respective maximum power or minimum power per cell group).

A UE can receive TPC commands in different DCI formats. For example, a UE can receive a TPC command in an UL DCI format scheduling a PUSCH transmission from the UE, in a DL DCI format scheduling a PDSCH reception to the UE and a corresponding HARQ-ACK transmission in a PUCCH in response to transport block reception in the PDSCH, or in a DCI format that conveys only TPC commands. For TPC commands in DCI formats that are associated with transmissions from the UE, such as an UL DCI format associated with data transmission in a PUSCH from the UE or a DL DCI format associated with HARQ-ACK transmission from the UE in a PUCCH, a time for the applicability of the TPC command can be the time when the respective PUSCH or PUCCH transmission starts.

For TPC commands in a DCI format that is not associated with a transmission from the UE, a time for the applicability of the TPC command can be predetermined in a system operation, such as four slots after the slot of the DCI format reception by the UE or equal to a time for a minimum UE processing capability for processing TPC commands or for preparing a PUSCH transmission, or indicated by the UE for example as part of the UE's capability or category, or configured to the UE by a serving gNB. It is also possible for a time for an applicability of TPC commands in DCI formats that are associated with transmissions (configuring transmissions) from the UE to be determined as for a time for an applicability of TPC commands in DCI formats that are not associated with transmissions (do not configure transmissions) from the UE.

Figure 17:
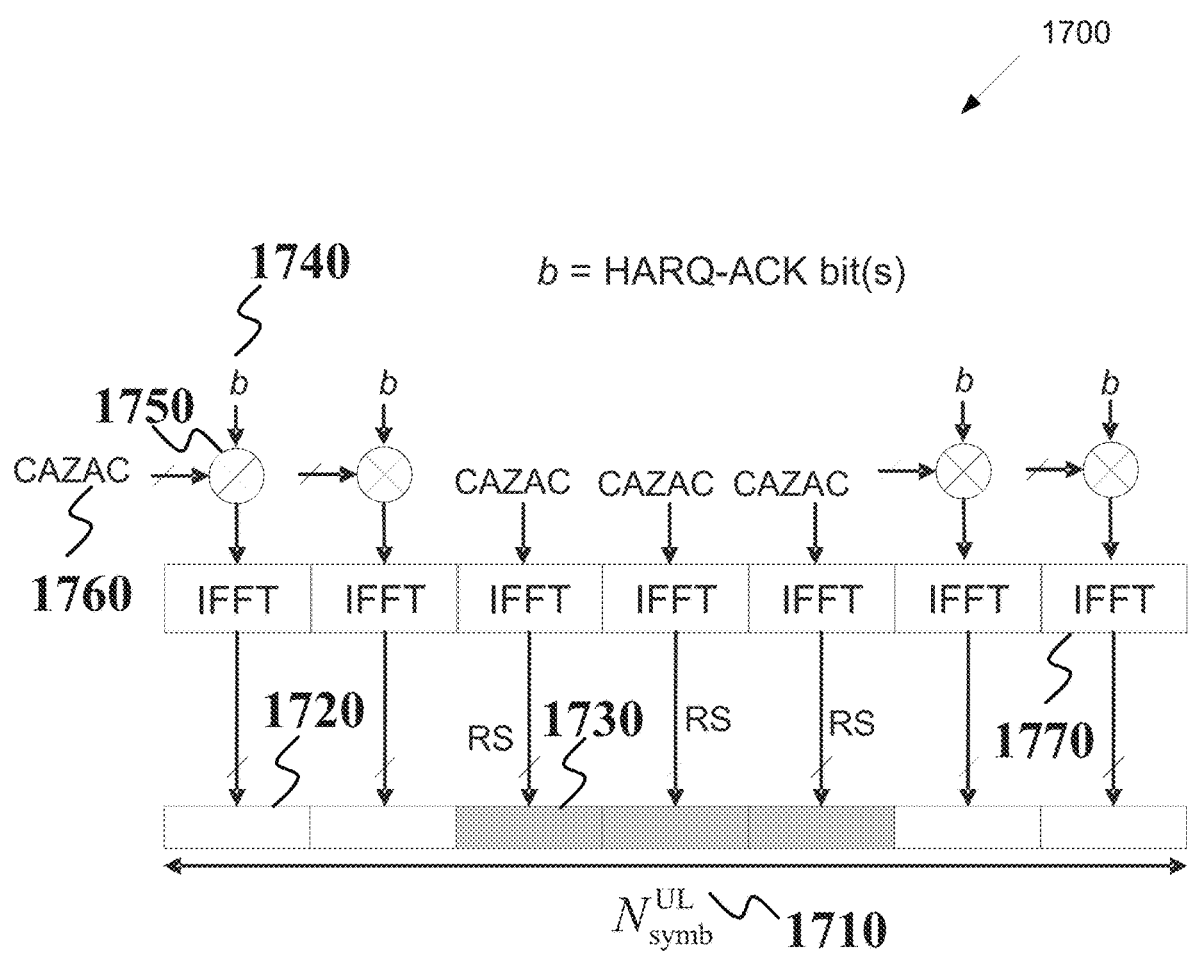
FIG. 17 illustrates an example PUCCH structure for transmitting HARQ-ACK information or SR information in seven symbols of a slot according to embodiments of the present disclosure.

FIG. 17 illustrates an example PUCCH structure 1700 for transmitting HARQ-ACK information or SR information in seven symbols of a slot according to embodiments of the present disclosure. The embodiment of the PUCCH structure 1700 illustrated in FIG. 17 is for illustration only and could have the same or similar configuration. FIG. 17 does not limit the scope of this disclosure to any particular implementation.

$N_{symb}^{UL}$ symbols 1710 are used for transmitting HARQ-ACK information 1720 or RS 1730 in a RB. HARQ-ACK bits b 1740 modulate 1750 a CAZAC sequence 1760 using binary phase shift keying (BPSK) or quaternary phase shift keying (QPSK) modulation. A modulated CAZAC sequence is transmitted after performing an IFFT 1770. A RS is transmitted through an unmodulated CAZAC sequence. For SR transmission, b=−1. A UE can transmit both HARQ-ACK and SR in a same slot by selecting a resource configured for SR transmission and transmitting HARQ-ACK information.

When a single-carrier property for signal transmission is not required, CAZAC sequences for RS and UCI can be FDM in case of one UCI bit or two UCI bits or, for more than two UCI bits, UCI symbols instead of a PBSK/QPSK modulated CAZAC sequence can be transmitted.

One important characteristic of so-called 5G/NR networks is the support of services having materially different characteristics such as in a target latency or reliability or in an operating carrier frequency. For example, services requiring low latency can be associated with transmission of small data TBs that can support fast decoding and HARQ-ACK transmission. For example, operation in high carrier frequencies, such as in millimeter wave bands, can be associated with large transmission BWs and PUCCH transmissions over a large BW and in only one symbol of a slot. Conversely, mobile broadband (MBB) applications are typically associated with support of large data TBs and requirements for coverage over large cell sizes necessitating transmissions of UL control channels over several symbols of a slot.

For an SR transmission, in order for a gNB to determine an associated data traffic type, such as one requiring low latency or high reliability or mobile broadband and so on, and schedule UL data transmission accordingly in order to fulfill requirements for the data traffic type, the SR transmission needs to be able to identify the data traffic type. This can be achieved by a UE transmitting an SR that includes multiple bits, in order to identify one of multiple traffic types, or by the gNB configuring the UE with multiple SR resources, each corresponding to a data traffic type, or both (when resources for different SR types can occasionally coincide).

Also, in order to support traffic types with various latency requirements, an SR transmission periodicity can be variable ranging from one or few slot symbols to tens of slot symbols. Additionally, different SR transmissions can have different reliability requirements where, for example, an SR associated with a data traffic type requiring low latency can have a larger reliability requirement than an SR for a latency-tolerant data traffic type.

A UE can have concurrent SR transmissions and transmissions of other UCI types such as HARQ-ACK or CSI. Particularly when a PUCCH transmission uses a DFT-S-OFDM waveform, it is beneficial to multiplex SR and HARQ-ACK/CSI transmissions in a same PUCCH in order to avoid a simultaneous multiple PUCCH transmissions and avoid increasing a peak-to-average power ratio or a maximum power reduction that can be detrimental for coverage. However, SR transmissions and HARQ-ACK or CSI transmissions can also have different reliability requirements and this can make a multiplexing in a same PUCCH transmission difficult to achieve in practice.

Therefore, there is a need to define mechanisms to enable multiplexing SR and HARQ-ACK in a same PUCCH transmission having a variable duration.

There is another need to determine when SR and HARQ-ACK are multiplexed in a same PUCCH transmission and when SR and HARQ-ACK are conveyed by separate PUCCH transmissions.

There is another need to support transmissions of different SR types according to respective reliability targets.

There is another need to support a transmission of an SR that includes multiple bits.

Finally, there is a need to define PUCCH structures supporting SR transmissions with different periodicities.

In the following, for brevity, descriptions are limited to multiplexing aspects of SR with HARQ-ACK but same description apply to multiplexing aspects of SR and CSI as when a number of HARQ-ACK bits is larger than two.

One embodiment of the present disclosure considers multiplexing a first PUCCH transmission conveying SR and a second PUCCH transmission conveying HARQ-ACK or CSI (HARQ-ACK/CSI) when each PUCCH transmission is over same slot symbols and when a number of the slot symbols can be variable.

A UE can be configured to transmit a first PUCCH in first frequency resources to convey SR and a second PUCCH in second frequency resources to convey HARQ-ACK/CSI over one or more slot symbols. The UE can also be configured whether to jointly or separately transmit SR and HARQ-ACK/CSI. Separate transmission can apply, for example, when SR and HARQ-ACK/CSI have different reception reliability requirements and particularly when SR has higher reception reliability requirements than HARQ-ACK/CSI.

When the UE is configured to separately transmit SR and HARQ-ACK/CSI, the UE always transmits SR using the first PUCCH in the first frequency resources and transmits HARQ-ACK/CSI using the second PUCCH in the second frequency resources. When the UE has multiple transmitter antennas, the UE can use a first subset of transmitter antennas to transmit the first PUCCH and use the second subset of transmitter antennas to transmit the second PUCCH at least when a transmission per subset of antennas is based on a DFT-S-OFDM waveform and it is preferable to maintain a single carrier property in order to have a low peak-to-average power ratio (PAPR).

When a PUCCH transmission is based on an OFDM waveform or when PAPR is not a consideration, for example when the UE is not coverage limited, both the first subset and the second subset of antennas can be used for each PUCCH transmission. When the UE is configured to transmit only SR or only HARQ-ACK/CSI in a slot, the UE can use both the first subset and the second subset of antennas for the respective PUCCH transmission. The UE can also adjust a PUCCH transmission power, for example through the parameter A, (F) in equation 2 or equation 3, depending on whether the UE uses only a first or second subset of antennas or the UE uses both the first and second subsets of antennas.

When the UE is configured to jointly transmit SR and HARQ-ACK/CSI, a multiplexing can depend on a PUCCH structure. In a first embodiment, a first PUCCH structure for conveying HARQ-ACK with one bit or two bits uses FDM between RS SCs and HARQ-ACK SCs where, for example, RS is transmitted using a first unmodulated CAZAC sequence and HARQ-ACK is transmitted using a second CAZAC sequence with BPSK modulation for one HARQ-ACK bit or with QPSK modulation for two HARQ-ACK bits.

A first design for multiplexing of HARQ-ACK and a single SR bit in a same PUCCH also uses two sequences for SR transmission over a same number of respective frequency resources. When the UE transmits a positive SR, the UE uses code/frequency resources configured for SR transmission to transmit the PUCCH conveying the HARQ-ACK. When the UE transmits a negative SR, the UE uses code/frequency resources configured for HARQ-ACK transmission to transmit the PUCCH conveying the HARQ-ACK. A gNB can perform energy detection over the first and second code/frequency resources to determine whether the UE conveys a positive SR or a negative SR.

Figure 18:
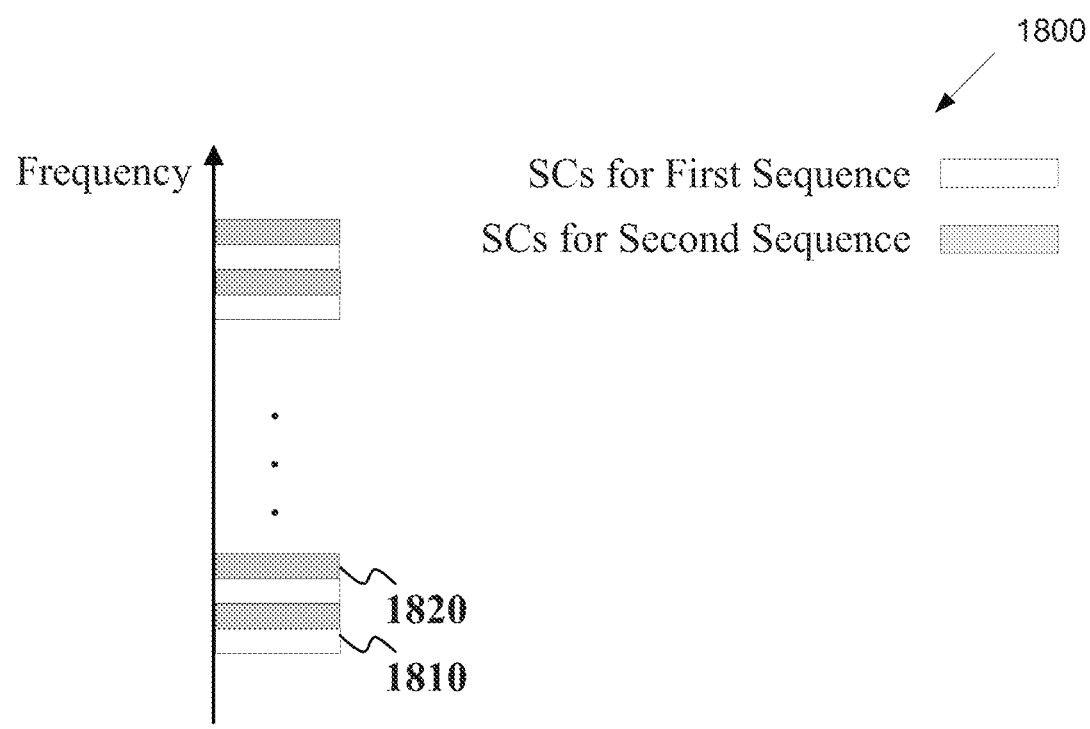
FIG. 18 illustrates an example transmission of a PUCCH conveying an SR through the transmission of a first sequence over first sub-carriers and of a second sequence over second sub-carriers according to embodiments of the present disclosure.

FIG. 18 illustrates an example transmission of a PUCCH 1800 conveying an SR through the transmission of a first sequence over first sub-carriers and of a second sequence over second sub-carriers according to embodiments of the present disclosure. The embodiment of the transmission of a PUCCH 1800 illustrated in FIG. 18 is for illustration only and could have the same or similar configuration. FIG. 18 does not limit the scope of this disclosure to any particular implementation.

A UE is configured a set of frequency resources such as a number of RBs that are consecutive or non-consecutive in frequency for transmission of a first PUCCH conveying an SR. In order to enable a transmission of a second PUCCH that conveys HARQ-ACK in the set of frequency resources configured for a PUCCH transmission conveying an SR, the first PUCCH and the second PUCCH need to have a same structure. Assuming that the second PUCCH structure includes a RS transmission in first SCs for coherent demodulation of HARQ-ACK information in second SCs and that a first unmodulated CAZAC sequence is transmitted in the first SCs and a second modulated CAZAC sequence is transmitted in the second SCs, the first PUCCH structure that conveys an SR transmission includes a transmission of the first unmodulated CAZAC sequence in the first SCs 1810 and a transmission of the second unmodulated CAZAC sequence in the second SCs 1820.

The first CAZAC sequence and the second CAZAC sequence can be same or different. The first CAZAC sequence and the second CAZAC sequence can use a same cyclic shift or use different cyclic shifts. A PUCCH transmission can be over one symbol or over multiple symbols with or without frequency hopping.

A second design for multiplexing HARQ-ACK and a single SR bit in a same PUCCH transmission is to perform adaptive HARQ-ACK bundling depending on whether or not a UE is configured SR transmission when the UE is configured HARQ-ACK transmission. When the UE has two HARQ-ACK bits to transmit and the UE is not configured to transmit SR, the UE transmits two HARQ-ACK bits. When the UE has two HARQ-ACK bits to transmit and the UE is configured to transmit SR, the UE bundles the two HARQ-ACK bits to one HARQ-ACK bit and uses the other QPSK constellation point to convey a positive SR or a negative SR.

A third design for multiplexing of HARQ-ACK and a single SR bit in a same PUCCH is for a UE to adaptively select a modulation order depending on whether or not the UE is configured for SR transmission when the UE is configured for HARQ-ACK transmission. When the UE has one or two HARQ-ACK bits to transmit and the UE is not configured to transmit SR, the UE uses BPSK or QPSK modulation to transmit the HARQ-ACK bits, respectively. When the UE has one or two HARQ-ACK bits to transmit and the UE is configured to transmit SR, the UE uses QPSK or 8PSK modulation to transmit the HARQ-ACK bits and a negative or positive SR, respectively.

A fourth design for multiplexing of HARQ-ACK and a single SR bit in a same PUCCH is to for a UE to adaptively select a PUCCH format structure depending on whether or not the UE is configured SR transmission, corresponding to one of one or more service types, when the UE is configured HARQ-ACK transmission. When the UE has two HARQ-ACK bits to transmit and the UE is not configured to transmit SR, the UE can use a QPSK modulated sequence to transmit the HARQ-ACK bits and interpret a PUCCH resource assignment as corresponding to a first PUCCH format. When the UE has two HARQ-ACK bits to transmit and the UE is configured to transmit SR, the UE jointly codes the two HARQ-ACK bits and the one (negative or positive) SR bits using, for example a Reed-Muller code, and interprets a PUCCH resource assignment as corresponding to a second PUCCH format.

Figure 19:
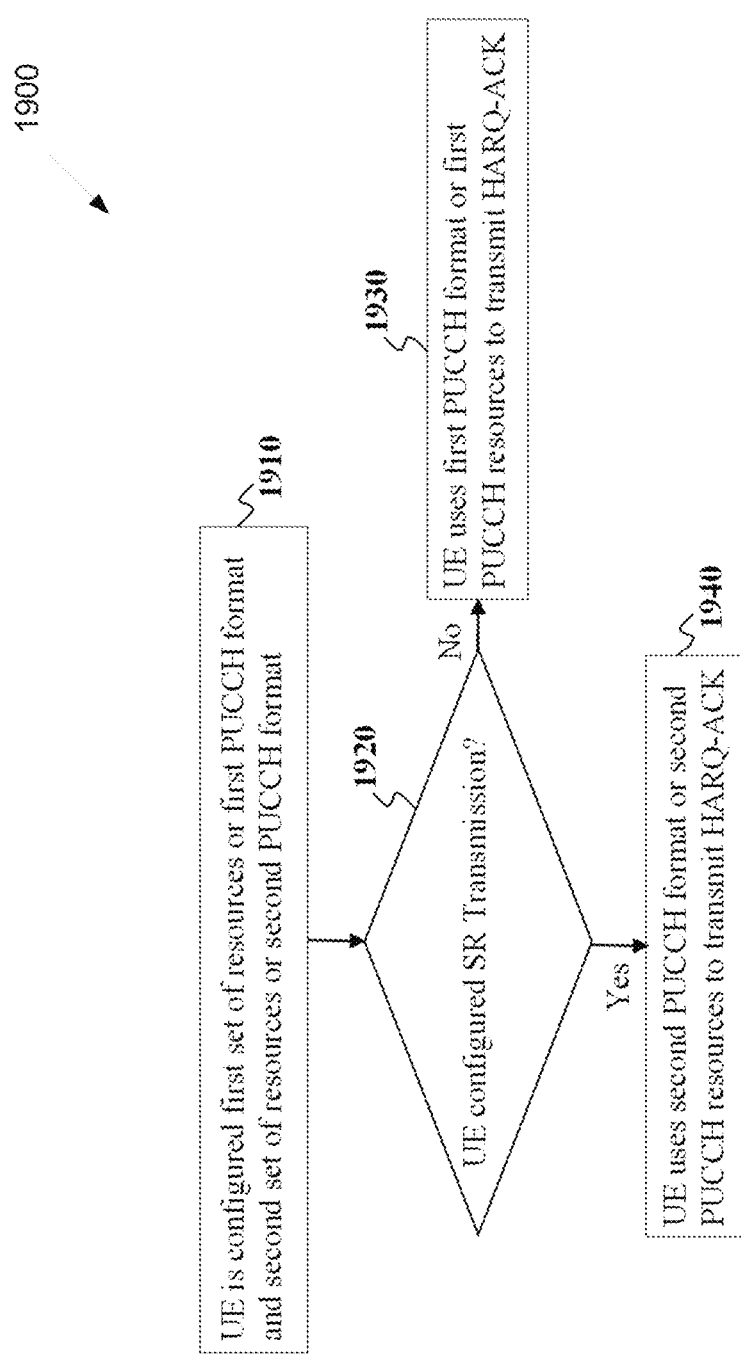
FIG. 19 illustrates a flow chart of a method for determination of a PUCCH format or of a resource for a PUCCH transmission by a UE depending on whether or not the UE is configured to transmit SR according to embodiments of the present disclosure.

FIG. 19 illustrates a flow chart of a method 1900 for determination of a PUCCH format or of a resource for a PUCCH transmission by a UE depending on whether or not the UE is configured to transmit SR according to embodiments of the present disclosure. The embodiment of the method 1900 illustrated in FIG. 19 is for illustration only and could have the same or similar configuration. FIG. 19 does not limit the scope of this disclosure to any particular implementation.

A UE is configured a first set of resources or a first PUCCH format for use in a PUCCH transmission when the UE is not configured SR transmission and is configured a second set of resources or a second PUCCH format for use in a PUCCH transmission when the UE is configured SR transmission in step 1910. The UE determines whether it is configured to transmit (positive or negative) SR when the UE transmits HARQ-ACK in a PUCCH in step 1920. When the UE is not configured to transmit SR, the UE uses the first PUCCH format or the first PUCCH resources for the HARQ-ACK transmission in step 1930. When the UE is configured to transmit SR, the UE uses the second PUCCH format or the second PUCCH resources for the HARQ-ACK transmission 1940.

For example, the first PUCCH format can convey a maximum of 2 HARQ-ACK bits while the second PUCCH format can convey more than 2 HARQ-ACK and SR bits. For example, to accommodate either HARQ-ACK bits only or bot HARQ-ACK bits and SR bits, the first PUCCH resources can include frequency resources over a first number of RBs while the second PUCCH resources can include frequency resources over a second number of RBs. For example, the UE can interpret a field in a DCI format indicating a PUCCH resource as indicating a resource from a first set of frequency resources when the UE is not configured to transmit SR and as indicating a resource from a second set of frequency resources when the UE is configured to transmit SR.

In one embodiment, a PUCCH structure for conveying HARQ-ACK with one bit or two bits uses CAZAC sequence selection. When the UE has one HARQ-ACK bit to transmit and the UE is not configured to transmit SR, the UE can use a first cyclic shift of a CAZAC sequence or a second cyclic shift of the CAZAC sequence to convey an ACK or a NACK, respectively. Similar, when the UE has two HARQ-ACK bits to transmit and the UE is not configured to transmit SR, the UE can use a first, second, third, or fourth cyclic shift of a CAZAC sequence.

A first design for multiplexing HARQ-ACK and a single SR bit in a same PUCCH is to use additional two or four cyclic shifts (referred to SR cyclic shifts), when the UE has one or two HARQ-ACK bits to transmit respectively, to transmit HARQ-ACK when the UE also has a positive SR to transmit; otherwise, when the UE has a negative SR to transmit, the UE uses the two or four cyclic shifts associated with the HARQ-ACK transmission (referred to as HARQ-ACK cyclic shifts).

When the UE has two HARQ-ACK bits to transmit, the UE can apply HARQ-ACK bundling and multiplex SR using a same approach as when the UE has one HARQ-ACK bit to transmit. A second design for multiplexing of HARQ-ACK and a single SR bit in a same PUCCH is to have adaptive HARQ-ACK bundling when the UE is also configured for SR transmission. Similar to the first design, when the UE has one HARQ-ACK bit to transmit, the UE can use one of two HARQ-ACK cyclic shifts when the UE does not have a positive SR to transmit and use one of two SR cyclic shifts when the UE has a positive SR to transmit. A third design for multiplexing of HARQ-ACK and SR is to use a different PUCCH format to transmit HARQ-ACK when the UE is also configured SR transmission such as in the fourth design of the first embodiment.

When the SR cyclic shifts are in same frequency resources as the HARQ-ACK cyclic shifts, the SR cyclic shifts are different than the HARQ-ACK cyclic shifts and all are cyclic shifts of a same CAZAC sequence. When the SR cyclic shifts are in different frequency resources than the HARQ-ACK cyclic shifts, the SR cyclic shifts can be same or different than the HARQ-ACK cyclic shifts and can be cyclic shifts of a same or different CAZAC sequence.

In one embodiment, a PUCCH structure for conveying HARQ-ACK inputs a sequence of RS symbols (all having a same value) followed by a sequence of HARQ-ACK symbols to DFT precoding. A first design for multiplexing HARQ-ACK and SR in a same PUCCH is to additionally multiplex SR symbols. The multiplexing of SR symbols can generally be before or after the RS symbols or the HARQ-ACK symbols. For example, the SR symbols can be prior to the RS symbols to reduce latency when the PUCCH format transmission is over multiple slot symbols.

For example, the SR symbols can be after the RS symbols to ensure placement of RS symbols in a first slot symbol of the PUCCH transmission and therefore minimize latency for obtaining a channel estimate when the PUCCH format transmission is over multiple symbols. After SR detection, a gNB can also use the SR symbols as RS symbols to enhance a channel estimate for demodulating HARQ-ACK symbols. A UE can be configured two sets of resources for PUCCH transmission depending on whether or not the UE is configured to transmit SR.

For example, a UE can interpret an indication in a DCI format for a resource of a PUCCH conveying a HARQ-ACK transmission during a number of symbols to correspond to a first resource from a first set of resources when the UE is not configured to transmit SR during the number of symbols and correspond to a second resource from a second set of resources when the UE is configured to transmit SR during the number of symbols. For example, the second resource can be larger than the first resource (in the frequency domain).

A second design for multiplexing HARQ-ACK and a single SR bit in a same PUCCH, in case of one or two HARQ-ACK bits, is for the UE to use a resource configured for HARQ-ACK transmission when the UE does not have a positive SR and to use a resource configured for SR transmission when the UE has a positive SR.

An advantage of the first design over the second design is that the first design requires only a single PUCCH resource when a UE has configured (positive or negative) SR transmission and HARQ-ACK transmission. The UE can ignore a value of a field indicating a PUCCH resource for HARQ-ACK transmission when the timing of the HARQ-ACK transmission coincides with a configured timing for an SR transmission. The UE can increase a transmission power to accommodate transmission of both HARQ-ACK and SR relative to when the UE transmits only SR or only HARQ-ACK to reflect the increased UCI payload. A use of a configured SR resource for a UE to jointly transmit (positive or negative) SRs of one or multiple bits and HARQ-ACK can be configured to a UE by a gNB regardless of a particular PUCCH format or structure used to transmit the joint SR and HARQ-ACK information and regardless of a number of symbols used for the PUCCH transmission.

One embodiment of this disclosure considers a determination for a power of a PUCCH transmission conveying SR and HARQ-ACK or CSI. When SR, HARQ-ACK, or CSI have same reception reliability target then, for the purposes of determining a power for a PUCCH transmission conveying a multiple UCI types, a same power control configuration can apply adjusted according to a total UCI payload, for example as in equation 2.

When SR, HARQ-ACK, or CSI do not have same reception reliability target, parameters of a power control formula that a UE uses to determine a PUCCH transmission power can be separately configured for each UCI type. For example, using equation 2 as reference, a PUCCH transmission power in cell c and slot i for a UCI type can be determined as in equation 8 as shown in:

$$P_{PUSCH}(i) = \min\begin{Bmatrix} P_{CMAX,c}(i), \\ P_{0\_UCI} + \alpha_{UCI} \cdot PL_c + 10\log_{10}(M_{PUCCH,c}(i)) + \\ h(n_{CQI}, n_{HARQ}, n_{SR}) + \\ \Delta_{F\_PUCCH}(F) + \Delta_{TxD}(F) + g_c(i) \end{Bmatrix} [dBm]$$

equation 8

In equation 8, $P_{0\_UCI}$ is replaced by $P_{0\_HARQ}$, $P_{0\_SR}$, or $P_{0\_CSI}$ for HARQ-ACK, SR, or CSI respectively, and a UE-specific component for each $P_{0\_UCI}$ is separately configured for HARQ-ACK, SR, or CSI. A path-loss compensation factor $\alpha_{UCI}$ can be introduced for each UCI type or the path-loss compensation factor can be set by default to a value of one at least for HARQ-ACK and SR. A closed-loop component $g_c(i)$ corresponding to accumulative or absolute TPC commands can remain same for each UCI type. Further, as multiple RBs can be required for a PUCCH transmission over a few symbols to achieve the target reliability for a respective UCI type, a PUCCH transmission power also depends on a respective number of $M_{PUCCH,c}(i) \geq 1$ RBs.

When an SR requires higher reliability than HARQ-ACK and a HARQ-ACK payload is small, such as one bit or two bits, a UE can multiplex SR and HARQ-ACK in a same PUCCH using one of applicable designs described in the first embodiment of this disclosure. For example, for a single SR bit, the UE can transmit the PUCCH using a power determined according to a parameter configuration for SR transmission by adding an SR bit to a HARQ-ACK payload ($n_{HARQ}=n_{HARQ}+1$).

When an SR requires higher reliability than HARQ-ACK, the UE can transmit a first PUCCH to convey SR with a power determined according to a parameter configuration for SR transmission and transmit a second PUCCH to convey HARQ-ACK with a power determined according to a parameter configuration for HARQ-ACK transmission. The UE behavior whether to jointly or separately transmit SR and HARQ-ACK/CSI can be configured to the UE by the gNB or be determined by the UE based on a predetermined or configured required transmission power differential.

Figure 20:
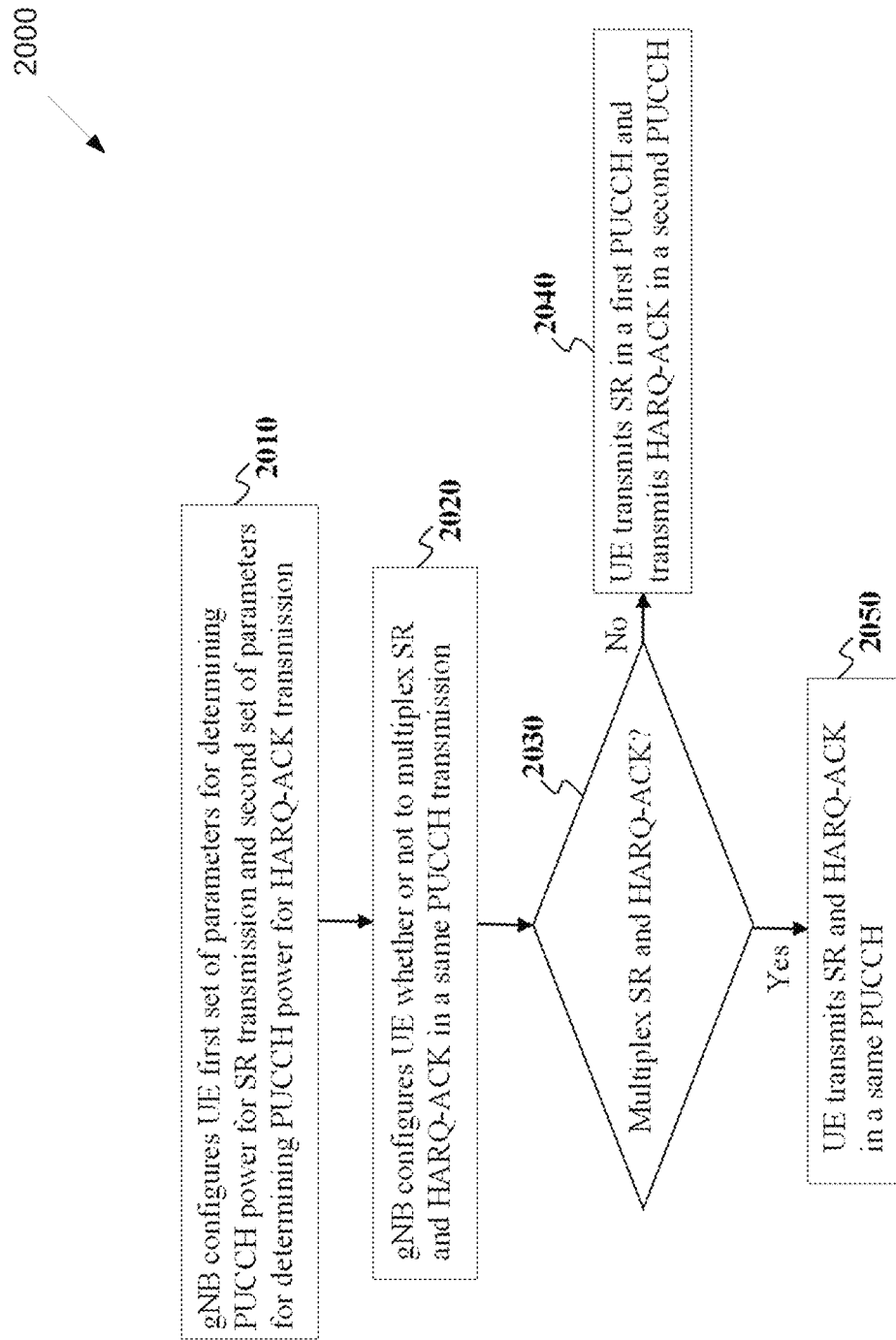
FIG. 20 illustrates a flow chart of a method for determination by a UE whether to jointly or separately transmit SR and HARQ-ACK according to embodiments of the present disclosure.

FIG. 20 illustrates a flow chart of a method 2000 for determination by a JE whether to jointly or separately transmit SR and HARQ-ACK according to embodiments of the present disclosure. The embodiment of the method 2000 illustrated in FIG. 20 is for illustration only and could have the same or similar configuration. FIG. 20 does not limit the scope of this disclosure to any particular implementation.

As shown in FIG. 20, a gNB configures a UE a first set of parameters for determining a power for a PUCCH transmission conveying SR and a second set of parameters for determining a power for a PUCCH transmission conveying HARQ-ACK in step 2010. The gNB also configures the UE whether or not to multiplex SR and HARQ-ACK in a same PUCCH transmission in step 2020.

The configuration can be an unconditional one or a conditional one depending on a number of HARQ-ACK bits or a threshold for a power difference between a PUCCH conveying SR and a PUCCH conveying HARQ-ACK. The UE determines whether or not to multiplex SR and HARQ-ACK in a same PUCCH transmission (when a transmission of a positive or negative SR and a HARQ-ACK transmission coincide) in step 2030.

When the UE determines that SR and HARQ-ACK are not to be multiplexed in a same PUCCH, the UE transmits SR in a first PUCCH using a resource configured by higher layers from the gNB and transmits HARQ-ACK in a second PUCCH using a resource configured by higher layers or a DCI format in step 2040. When the UE determines that SR and HARQ-ACK are be multiplexed in a same PUCCH, the UE transmits SR and HARQ-ACK in a PUCCH using a resource configured by higher layers or a DCI format in step 2050.

When HARQ-ACK (or CSI) requires higher reliability than SR, the UE can multiplex SR with HARQ-ACK in a same PUCCH using one of applicable designs described in the first embodiment of this disclosure and transmit the PUCCH with a power determined according to a configuration for HARQ-ACK transmission. For example, for a single SR bit, the UE can add an SR bit to a HARQ-ACK payload ($n_{HARQ}=n_{HARQ}+1$). This is because the SR reliability is ensured and, due to the small SR payload, a required power for the PUCCH transmission does not materially increase.

One embodiment of the present disclosure considers configuration of resources for transmissions of different types of SRs. In the following, transmissions of two SR types are considered but, unless otherwise stated, the descriptions can generalize for more than two SR types.

A gNB can configure a UE a first set of parameters for transmitting a first SR type and a second set of parameters for transmitting a second SR type. For example, each set of parameters can include a PUCCH resource, a periodicity, an offset, and a maximum number of SR transmissions. Each set of parameters can also include a sub-carrier spacing (SCS) such as 15 KHz or 60 KHz.

For example, the gNB can configure the UE with a SCS of 15 KHz, a PUCCH resource that spans 14 slot symbols in time and 12 SCs in frequency, with a periodicity of 70 slot symbols, and with a maximum number of 10 SR transmissions for a first SR type and with a SCS of 60 KHz, a PUCCH resources that spans 7 slot symbols in time and 96 SCs in frequency, with a periodicity of 28 slot symbols, and with a maximum number of 2 SR transmissions for a second SR type. For example, the gNB can configure the UE with a SCS of 15 KHz, a PUCCH resource that spans 1 slot symbol in time and 96 SCs in frequency, with a periodicity of 8 slot symbols, and with a maximum number of 2 SR transmissions for a second SR type.

A disadvantage of configuring multiple PUCCH resources for respective transmissions of multiple SR types is the associated overhead. An SR resource can often remain unused and once used by a UE and the UE is then scheduled UL transmissions, the SR resource remains unused as, typically, it cannot be reconfigured for use by other UEs. It is therefore beneficial to enable use of a single PUCCH resource for an SR transmission to convey multiple types of SR through a multi-bit SR. This can be achieved by using a PUCCH resource configured for transmission of an SR type requiring a shorter periodicity to also support a transmission of an SR type requiring a longer periodicity. Transmissions of SR types corresponding to different data services can be with a same numerology, such as the numerology associated with an SR type requiring the shortest latency, even when the associated data services use different numerologies.

When a UE needs to transmit an SR of a first type over a number of $N_{SR0}$ symbols with periodicity $T_{SR0}$, the UE can use a corresponding configured PUCCH resource and transmit the PUCCH with a power required to achieve the respective target reliability for the first SR type. For example, assuming only SR transmission, the UE can determine a PUCCH transmission power as $$P_{PUCCH,SR0}(i) = \min\begin{cases} P_{CMAX,c}(i), \\ P_{0\_SR0} + PL_c + 10\log_{10}(M_{PUCCH,c}(i)) + \\ \Delta_{F\_PUCCH}(F) + \Delta_{TxD}(F') + g_c(i) \end{cases}$$

where $P_{0\_SR0}$ is configured for SR transmission of the first type.

When the UE needs to transmit an SR of a second type over a number of $N_{SR1}$ symbols with periodicity $T_{SR1} > T_{SR0}$, where $N_{SR1}/N_{SR0}=N_p$, the UE can use the same configured PUCCH resource over a number of $N_p$ successive $T_{SR0}$ periods and transmit a PUCCH conveying a second SR type with a power $$P_{PUCCH,SR1}(i) = \min\begin{cases} P_{cMAX,c}(i), \\ P_{0\_SR1} + PL_c + 10\log_{10}(M_{PUCCH,c}(i)) + \\ \Delta_{F\_PUCCH}(F) + \Delta_{TxD}(F') + g_c(i) \end{cases}$$

where $P_{0\_SR1}$ is configured for SR transmission of the second type. The SR transmission of the second type can be constrained to start only at $T_{SR1}$ intervals, in order to facilitate a gNB receiver operation, or can start at any $T_{SR0}$ interval in order to reduce a respective latency.

Figure 21:
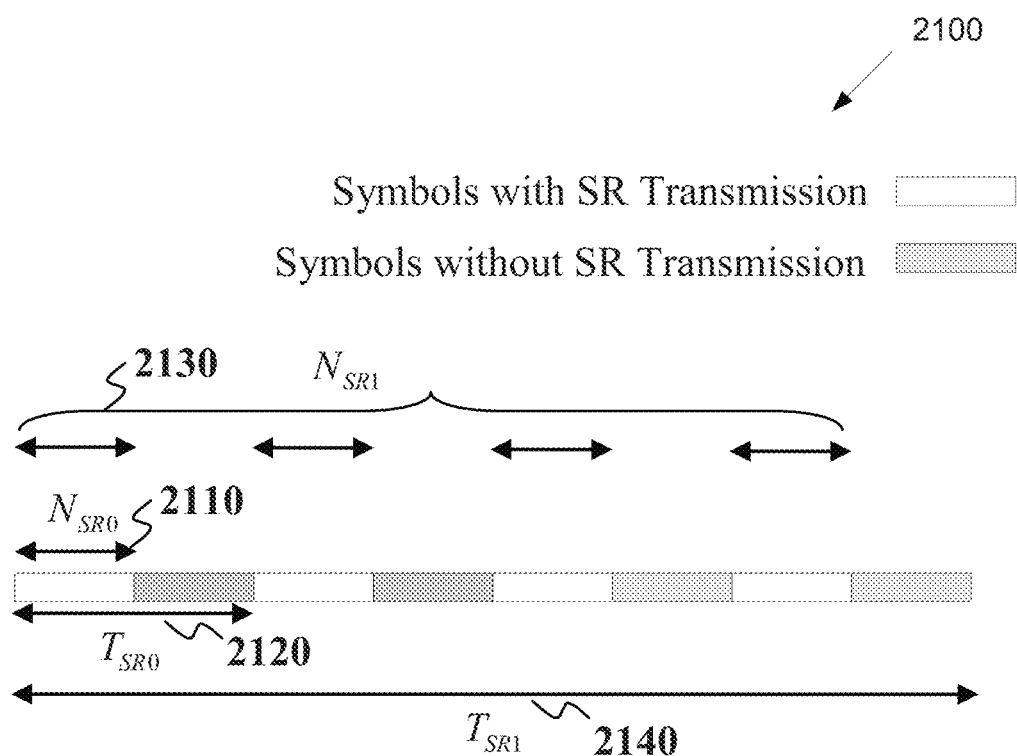
FIG. 21 illustrates an example transmission of a first SR type and of a second SR on a same PUCCH resource according to embodiments of the present disclosure.

FIG. 21 illustrates an example transmission of a first SR type and of a second SR type 2100 on a same PUCCH resource according to embodiments of the present disclosure. The embodiment of transmission of a first SR type and of a second SR type 2100 illustrated in FIG. 21 is for illustration only and could have the same or similar configuration. FIG. 21 does not limit the scope of this disclosure to any particular implementation.

As shown in FIG. 21, a UE is configured a resource for transmission of a PUCCH conveying a first SR type or a second SR type. The UE is also configured transmission of the first SR type over $N_{SR0}$ symbols 2110 with periodicity of $T_{SR0}$ symbols 2120 and transmission of the second SR type over $N_{SR1}$ symbols 2130 (four multiple of $N_{SR0}$ symbols) with periodicity of $T_{SR1}$ symbols 2140.

In addition to using a different power or a different duration for a PUCCH transmission in a same resource according to an SR type, a different modulation of a transmitted signal can also be used. Unlike conventional on-off keying for an SR transmission, an SR signal can be modulated when a same PUCCH resource is used to convey SRs of different types, for example similar to HARQ-ACK signaling (multi-bit SR). A respective PUCCH can include transmission of both RS and SR information. For example, using BPSK modulation, a tri-state information can exist that includes no SR transmission (DTX), SR transmission for a first SR type for example through a binary 0, and SR transmission for a second SR type for example through a binary 1.

When a UE needs to transmit an SR of a first type and an SR of a second type in a same $T_{SR0}$ interval, the UE can postpone a transmission of the SR of the second type (SR of the first type is assumed to require lower latency). When the UE is transmitting the SR of the second type and the UE needs to transmit the SR of the first type, the UE can again postpone the transmission of the SR of the second type during the $T_{SR0}$ interval and transmit the SR of the first type. A gNB receiver can attempt reception of first type SR over $N_{SR0}$ symbols with periodicity $T_{SR0}$ and of second type SR over $N_{SR1}$ symbols with periodicity $T_{SR1}$.

Figure 22:
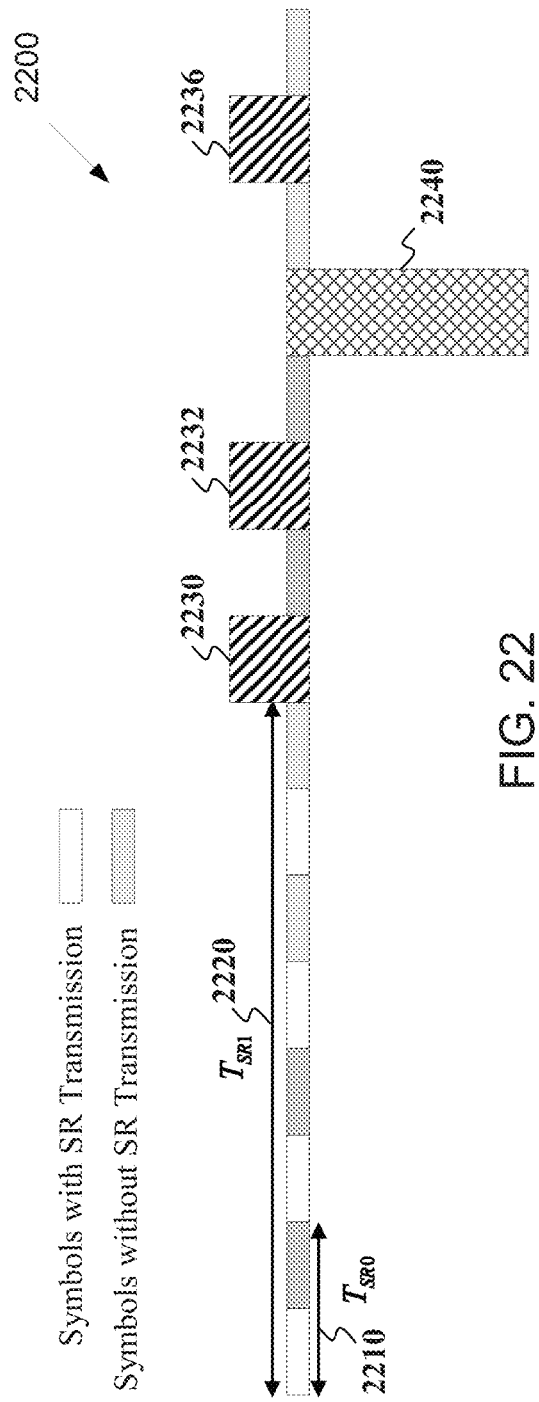
FIG. 22 illustrates another example transmission of a first SR type and of a second SR type on a same PUCCH resource according to embodiments of the present disclosure.

FIG. 22 illustrates another example transmission of a first SR type and of a second SR type 2200 on a same PUCCH resource according to embodiments of the present disclosure. The embodiment of the transmission of a first SR type and of a second SR type 2200 illustrated in FIG. 22 is for illustration only and could have the same or similar configuration. FIG. 22 does not limit the scope of this disclosure to any particular implementation.

As shown in FIG. 22, a UE is configured a resource for transmission of a PUCCH conveying a first SR type or a second SR type. The UE is also configured transmission of the first SR type over $N_{SR0}$ symbols with periodicity of $T_{SR0}$ symbols 2210 and transmission of the second SR type over $N_{SR1}=4 \cdot N_{SR0}$ symbols with periodicity of $T_{SR1}$ symbols 2220. When the UE does not have a positive SR, the UE does not transmit a PUCCH in the configured resource. In first $N_{SR0}$ symbols of a period of $T_{SR1}$ symbols, the UE has SR transmission of the second type and transmits with a second power a second PUCCH that includes SR sub-carriers and RS sub-carriers where the SR sub-carriers are modulated with "+1" 2230.

The UE continues the second PUCCH transmission in second $N_{SR0}$ symbols, after a period of $T_{SR0}$ symbols, in the period of $T_{SR1}$ symbols 2232. In third $N_{SR0}$ symbols in a period of $T_{SR0}$ symbols, within the period of $T_{SR1}$ symbols, the UE has SR transmission of the first type and transmits with a first power a first PUCCH that includes SR sub-carriers and RS sub-carriers where the SR sub-carriers are modulated with "−1" 2240. The UE continues the first PUCCH transmission in fourth $N_{SR0}$ symbols in the period of $T_{SR1}$ symbols 2236.

Transmission of multiple SR types can also be supported through a single configuration for a transmission periodicity with the UE indicating whether it transmits SR and, when the UE transmits SR, indicating the transmitted SR type from the multiple SR types. The configuration for the transmission periodicity can be for the SR type requiring the lowest latency. Even through some SR types can require a larger latency than the smallest one, such SR types can also benefit from a lower latency and additional respective resource configurations can be avoided. A tradeoff for a UE transmitting an SR type over a shorter period that necessary is that an associated transmission power needs to be increased. However, the UE is assumed to have such power available for a transmission of an SR type requiring the smallest latency that can even require larger reception reliability. In case of collisions, the UE can postpone transmission of SR types that can have longer transmission periodicities.

Figure 23:
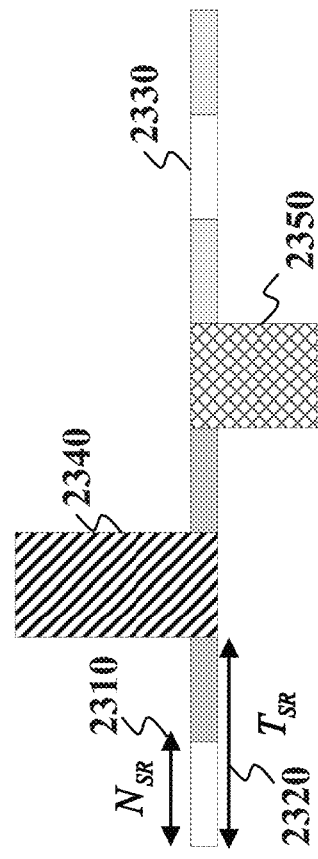
FIG. 23 illustrates an example transmission of a first SR type and of a second SR type on a same PUCCH resource and with a same periodicity according to embodiments of the present disclosure.

FIG. 23 illustrates an example transmission of a first SR type and of a second SR type 2300 on a same PUCCH resource and with a same periodicity according to embodiments of the present disclosure. The embodiment of the transmission of a first SR type and of a second SR type 2300 illustrated in FIG. 23 is for illustration only and could have the same or similar configuration. FIG. 23 does not limit the scope of this disclosure to any particular implementation.

As shown in FIG. 23, a UE is configured a resource for transmission of a PUCCH conveying a first SR type or a second SR type. The UE is also configured transmission of SR over $N_{SR}$ symbols 2310 with periodicity of $T_{SR}$ symbols 2320. When the UE does not have a positive SR, the UE does not transmit a PUCCH in the configured resource 2330. When the UE has SR transmission of a first type, the UE transmits with a first power a first PUCCH that includes SR sub-carriers and RS sub-carriers where the SR sub-carriers are modulated with "+1" 2340.

When the UE has SR transmission of a second type, the UE transmits with a second power a second PUCCH that includes SR sub-carriers and RS sub-carriers where the SR sub-carriers are modulated with "−1" 2350. When the UE has transmission of positive SRs of both the first and second types, the UE can prioritize transmission of a SR type, such as the first SR type, for example when an associated data traffic service requires lower latency.

When a UE has multiple configurations for SR transmissions, it is possible that the UE needs to simultaneously transmit a first PUCCH with a first duration to convey an SR and a second PUCCH with a second duration to convey other UCI, such as HARQ-ACK or CSI. When the UE is not power limited or has a capability to simultaneously transmit multiple PUCCHs, the UE can transmit both PUCCHs. When the UE is power limited or does not have a capability to simultaneously transmit multiple PUCCHs, the UE can be configured the PUCCH transmission to prioritize. Typically, at least for operation on a same band, shorter PUCCH transmissions are associated with stricter latency requirements and can be prioritized.

When time-domain orthogonal multiplexing applies for a PUCCH transmission and a part of the PUCCH transmission needs to be power scaled (including scaling a power to zero), time-domain orthogonality cannot be maintained. To avoid this problem, UE multiplexing of PUCCH transmissions on same frequency resources can avoid use of time-domain orthogonal multiplexing. Then, a UE that is power can puncture or power scale a second PUCCH transmission in symbols where the UE has a first PUCCH transmission.

Transmitter and receiver structures for DFT-S-OFDM are similar to the ones for OFDM, where a discrete Fourier transform (DFT) filter is included prior to the IFFT at the transmitter and an inverse DFT filter is included after the FFT at the receiver, and a corresponding description is omitted for brevity.

Using LTE as exemplary reference, when a UE transmits HARQ-ACK bits, RI bits, or CSI-RS resource indicator (CRI) bits in a PUSCH that conveys one data TB, the UE determines a number of coded modulation symbols per layer Q' for HARQ-ACK as in equation 9. A similar determination applies when a PUSCH conveys more than one data TB such as two data TB s.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{equation 9}$$

In equation 9, O is the number of HARQ-ACK bits, RI bits, or CRI bits, an $M_{sc}^{PUSCH}$ is a scheduled PUSCH transmission BW, in number of SCs, in a current slot for the data TB, and $N_{symb}^{PUSCH-initial}$ is a number of slot symbols for initial PUSCH transmission for the same data TB, and $\beta_{offset}^{PUSCH} = \beta_{offset}^{HARQ-ACK}$ for HARQ-ACK transmission or $\beta_{offset}^{PUSCH} = \beta_{offset}^{RI}$ is a parameter configured to the UE by a gNB through higher layer signaling, and $M_{sc}^{PUSCH-initial}$, C, and $K_r$ are obtained from the DCI format conveyed in initial DL control channel for the same data TB. If there is no initial DL control channel for the same data TB, $M_{sc}^{PUSCH-initial}$, C, and $K_r$ are determined from the most recent semi-persistent scheduling (SPS) assignment when the initial PUSCH for the same data TB is SPS or from the random access response grant for the same data TB when the PUSCH is initiated by the random access response grant. Further, C is a number of code blocks (CBs) in the data TB and $K_r$ is a size of CB r, and ⌈ ⌉ is the ceiling function that rounds a number to its next higher integer.

In LTE, when a UE transmits CQI or PMI in a PUSCH (denoted as CQI/PMI and jointly referred to as CSI for brevity), the UE determines a number of coded modulation symbols per layer Q' as in equation 10. For multi-beam operation with analog or hybrid beamforming, a CSI report can include, in addition to CQI and PMI, beam state information (BSI) or beam related information (BRI). Equation 10 is given by:

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right) \quad \text{equation 10}$$

In equation 10, O is the number of CQI/PMI bits, and L is the number of cyclic redundancy check (CRC bits given by $$L = \begin{cases} 0 & O \le 11 \\ 8 & \text{otherwise} \end{cases},$$

and $\beta_{offset}^{PUSCH} = \beta_{offset}^{CQI}$ is a parameter configured to the UE by a gNB through higher layer signaling, $Q_{CQI} = Q_m^{(x)} \cdot Q'$ and $\beta_{offset}^{PUSCH} = \beta_{offset}^{CQI}$, where $\beta_{offset}^{CQI}$ may be determined according to LTE specification depending on the number of transmission codewords for the corresponding PUSCH, and on the UL power control set for the corresponding PUSCH when two UL power control sets are configured by higher layers for the cell. If RI is not transmitted then $Q_{RI}^{(x)}=0$. Remaining notation is similar to the one described for HARQ-ACK and is not described for brevity. The variable "x" in $K_r(x)$ represents a TB index corresponding to a highest MCS value indicated by an initial UL DCI format.

Control and data multiplexing is performed such that HARQ-ACK information is present on both slots and is mapped to resources around the DMRS. The inputs to the data and control multiplexing are the coded bits of the control information denoted by $q_0, q_1, q_2, q_3, \ldots, q_{N_L \cdot Q_{CQI}-1}$ and the coded bits of the UL-SCH denoted by $f_0, f_1, f_2, f_3, \ldots, f_{G-1}$. The output of the data and control multiplexing operation is denoted by $g_0, g_1, g_2, g_3, \ldots, g_{H'-1}$, where $H=(G+N_L \cdot Q_{CQI})$ and $H'=H/(N_L \cdot Q_m)$, and where $g_i$, i=0, ..., H'−1 are column vectors of length $(Q_m \cdot N_L)$. H is the total number of coded bits allocated for data and CQI/PMI information across the $N_L$ transmission layers of the data TB. Control and data multiplexing in case more than one data TB is transmitted in a PUSCH and additional description in this disclosure is omitted for brevity.

A PUSCH transmission can convey only A-CSI, and can also include HARQ-ACK or RI, without including any data. When a UE detects an UL DCI format with a CSI request triggering an A-CSI report in a PUSCH transmission, the UE can determine to not include data in the PUSCH transmission when the UE reports CSI for one serving cell and the PUSCH is scheduled in 4 or less RBs and an MCS index in the UL DCI format is a last MCS index. Other condition can also apply depending on a respective operation scenario. A CSI request field in an UL DCI format includes a predefined number of bits, such as 1 bit or 2 bits. For example, a mapping of the 2 bits can be as in TABLE 1.

TABLE 1

Mapping of CSI request field to CSI reports a UE provides in a PUSCH

| Value of CSI request field | Description |
|---|---|
| "00" | No aperiodic CSI report is triggered |
| "01" | Aperiodic CSI report is triggered for serving cell c |
| "10" | Aperiodic CSI report is triggered for a 1st set of serving cells configured by higher layers |
| "11" | Aperiodic CSI report is triggered for a 2nd set of serving cells configured by higher layers |

When a UE multiplexed only UCI (without data) in a PUSCH transmission and the UE also transmits HARQ-ACK bits or RI bits, the UE determines a number of coded symbols Q' for HARQ-ACK or RI as in equation 11

$$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right) \quad \text{equation 11}$$

In equation 11, O is a number of HARQ-ACK bits or RI/CRI bits and $O_{CQI-MIN}$ is a number of CQI bits including CRC bits assuming rank equals to 1 for all serving cells that an A-CSI is triggered for. For HARQ-ACK $Q_{ACK}=Q_m \cdot Q'$ and $\beta_{offset}^{PUSCH}=\beta_{offset}^{HARQ-ACK}/\beta_{offset}^{CQI}$. For RI/CRI, $Q_{RI}=Q_m \cdot Q'$, $Q_{CRI}=Q_m \cdot Q'$ and $\beta_{offset}^{PUSCH}=\beta_{offset}^{RI}/\beta_{offset}^{CQI}$. For CSI, $Q_{CQI}=N_{symb}^{PUSCH} \cdot M_{sc}^{PUSCH} \cdot Q_m - Q_{RI}$. One problem with the determination of a number of HARQ-ACK or RI/CRI coded modulation symbols in equation 11 is that the number is not based on an actual CSI MCS but is instead based on a smallest CSI MCS resulting from using the smallest possible CSI payload ($O_{CQI-MIN}$ bits). As a consequence, a number of HARQ-ACK or RI coded modulation symbols in equation 11 can be significantly over-dimensioned, for example by more than 100%.

When a UE multiplexes UCI in a PUSCH transmission, UCI symbols can be either be rate matched with data symbols or UCI symbols can puncture data symbols. For example, in LTE, a UE rate matches CSI report symbols and data symbols and punctures data symbols to transmit HARQ-ACK symbols. Rate matching has smaller impact on a data reception reliability as a structure of a code used for encoding data information is maintained while puncturing can destroy such code structure, for example by removing systematic bits. However, rate matching between UCI and data places an extra burden on UE hardware complexity as data encoding and rate matching needs to occur after UCI encoding and rate matching.

Puncturing of encoded data symbols by encoded UCI symbols increases a time budget at a UE for data encoding and rate matching, as there is no need for these operations to wait for respective ones for UCI to occur first, but can degrade a data reception reliability. It is therefore beneficial to enable rate matching for UCI and data information while avoiding an additional processing latency for data encoding and rate matching.

A PUCCH structure (format) for UCI transmission can be same, with a possible exception for a location of one or more symbols used for DMRS transmission, as a PUSCH structure for data information transmission and UCI can be transmitted in a same manner as data information using, for example, a DFT-S-OFDM waveform. A shortcoming of this approach is that for a minimum resource granularity of 1 RB in the frequency domain and 14 slot symbols in the time domain, the allocated resources can be unnecessarily large for relatively small UCI payloads. FDM and TDM of UEs can apply to improve an efficiency of resource utilization.

For example, for TDM, a first UE can transmit a PUCCH in a first number of symbols in a slot and a second UE can transmit a PUCCH in a second number of symbols in the slot where the second number of symbols is located after the first number of symbols. It is therefore beneficial to enable signaling for TDM of PUCCH transmissions from different UEs in a same slot.

Transmission timing for HARQ-ACK information in a PUCCH from a UE can be indicated in DCI formats scheduling corresponding PDSCH receptions to the UE. Similar, transmission timing for data information in a PUSCH from the UE can be indicated in a DCI format scheduling the PUSCH transmission to the UE. It is therefore possible that DCI formats configure a PUCCH transmission and a PUSCH transmission from a same UE and the reception timings of the DCI formats at the UE is different.

Such reception timing differences can result to different UE behavior due to different UE processing timelines required for multiplexing UCI with data in a PUSCH transmission and apply rate matching or for transmitting UCI in a PUCCH. Therefore, it is beneficial to define a UE behavior for UCI and data transmission in a same time unit depending on a difference between a time the UE determines the UCI transmission and a time the UE determines the data transmission.

For dynamic HARQ-ACK codebook determination, a number of HARQ-ACK information bits that a UE transmits in a PUCCH can also vary, for example depending on a number of data TBs that the UE generates corresponding HARQ-ACK information bits. A UE can use a different PUCCH format for transmission of different numbers of HARQ-ACK information bits. For example, a UE can use a first PUCCH format for transmission of 1 or 2 HARQ-ACK information bits and use a second PUCCH format for transmission of more than 2 HARQ-ACK information bits.

As different PUCCH formats require different resources for respective transmissions, such as cyclic shifts or orthogonal covering codes (OCCs) for a PUCCH format with structure similar to PUCCH format 1a/1b in LTE, or RBs for a PUCCH format with structure similar to PUCCH format 4 in LTE, it is beneficial for a UE to have a correct interpretation of an indicated resource for a PUCCH transmission even when a UE fails to detect one or more DCI formats. For example, when a gNB transmits to a UE three DCI formats scheduling three respective PDSCH transmissions and the gNB expects the UE to transmit three HARQ-ACK information bits, the gNB indicates a PUCCH resource corresponding to a second PUCCH format used for transmission of three HARQ-ACK information bits.

However, when the UE fails to detect one or two of the three DCI formats, the UE can assume that a first PUCCH format, that is applicable for transmission of 1 or 2 HARQ-ACK bits, is to be used and interprets the indicated resource as one for the first PUCCH format thereby creating potential interference to PUCCH transmissions from other UEs. Therefore, it is beneficial to enable a resource determination for PUCCH transmissions that is robust to a UE failing to detect one or more DCI formats scheduling PDSCH receptions to the UE.

A data TB includes a number of code blocks (CBs) and a gNB can configure a UE a number of code block groups (CBGs) for the UE to transmit respective HARQ-ACK information, instead of transmitting one HARQ-ACK information bit for the data TB. A UE can determine a number of CBs from a data TB size and can substantially apply an equal partition of CBs to CBGs (some CBGs can have one more CB than other CBGs).

For example, a gNB can configure a UE with 4 CBGs per TB and for a TB that includes 10 CBs, the UE can form 4 CBGs that respectively include the first 3 CBs, the second 3 CBs, the second to last 2 CBs, and the last 2 CBs. At least when the encoded HARQ-ACK information bits do not include CRC protection, there can be undetected errors in the values of HARQ-ACK information bits for CBGs that are transmitted from the UE and the values that are detected by the gNB. For this reason, a DCI format can include a bit-map with size equal to the number of configured CBGs and values that indicate CBGs that are transmitted by the gNB where, for example a value of 0 can indicate no transmission and a value of 1 can indicate transmission.

However, due to detection errors of HARQ-ACK information bits at the gNB, a UE may have previously correctly received CBGs indicated for transmission and may have incorrectly received CBGs that are not indicated for transmission. Therefore, it is beneficial for a UE to inform a gNB, through HARQ-ACK information bits for CBGs of a data TB, of previous detection errors at the gNB for the HARQ-ACK information bits for the CBGs of the data TB. It is also beneficial for a UE to avoid a transmission of CBGs that the UE previously correctly received to result to incorrect reception of the CBGs by the UE. Have UE send NACK for CBGs that were incorrectly decoded and not retransmitted and to not process CBGs that are retransmitted and were correctly decoded.

Therefore, there is a need to enable rate matching for transmission of UCI and data information from a UE while avoiding an additional processing latency for data encoding and rate matching.

There is another need to define a UE behavior for UCI and data transmission in a same time unit depending on a difference between a time the UE determines the UCI transmission and a time the UE determines the data transmission.

There is another need to enable signaling for TDM of PUCCH transmissions from different UEs in a same slot.

There is another need to enable resource determination for PUCCH transmissions that is robust to a UE failing to detect one or more DCI formats scheduling PDSCH transmissions to the UE.

There is another need for a UE to inform a gNB, through HARQ-ACK information bits for CBGs of a data TB, of previous detection errors at the gNB for the HARQ-ACK information bits for the CBGs of the data TB.

Finally, there is a need for a UE to avoid a transmission of CBGs that the UE previously correctly received to result to incorrect reception of the CBGs by the UE.

In the following, for brevity, data information is assumed to be transmitted using one data TB that can include one or more data CBs. Associated description of embodiments can be directly extended in case more than one data TBs are supported. Further, a DCI format scheduling a PUSCH transmission is referred to as UL DCI format while a DCI format scheduling a PDSCH transmission is referred to as DL DCI format.

One embodiment of the present disclosure considers enabling rate matching for UCI and data information while avoiding an additional processing latency for data encoding and rate matching and determining conditions for the application of rate matching or of puncturing.

A timing between a detection by a UE of a DL DCI format and a corresponding HARQ-ACK transmission in response to a reception of data TBs conveyed by a PDSCH reception scheduled by the DL DCI format can be indicated in the DL DCI format, from a set of values configured in advance by higher layer signaling, or can be configured in advance by higher layer signaling, or the set of values can be predetermined in a system operation prior to higher layer signaling. The timing can be either relative to a slot or a symbol of the DL DCI format detection or relative to a slot or a symbol to the PDSCH reception.

In case a slot or symbol duration for a PDCCH reception or for a PDSCH reception is different than a slot or symbol duration for a PUSCH transmission or PUCCH transmission conveying corresponding HARQ-ACK information, the timing unit can be a slot or a symbol for PUSCH transmission or PUCCH transmission. For example, for slot-based scheduling and same slot duration in the DL and the UL, a DL DCI format can indicate respective HARQ-ACK transmission in a PUCCH that is 4 slots after the slot of the associated PDSCH reception.

For example, for slot-based scheduling and a DL slot duration that is four times smaller than an UL slot duration, the DL DCI format can indicate respective HARQ-ACK transmission in a PUCCH that is 4 UL slots after the DL slot of the associated PDSCH reception where the end of the DL slot is within the first of the 4 UL slots.

A timing between a detection by a UE of an UL DCI format and a corresponding PUSCH transmission can be indicated in the UL DCI format, from a set of values configured in advance by higher layer signaling, or can be configured in advance by higher layer signaling, or the set of values can be predetermined in a system operation prior to higher layer signaling. As for the HARQ-ACK transmission, a timing indicated in arm UL DCI format is relative to a slot duration or symbol duration (UL slot or symbol duration) for the PUSCH transmission, in case it is different than a slot duration or symbol duration for the PDCCH transmission conveying the UL DCI format (DL slot or DL symbol duration).

Similar, a timing between a detection by a UE of a DL DCI format and a corresponding PDSCH reception can be indicated in the DL DCI format, from a set of values configured in advance by higher layer signaling, or can be configured in advance by higher layer signaling, or be predetermined in a system operation. The timing indicated in the DL DCI format is relative to a slot duration or symbol duration (DL slot or symbol duration) for the PDSCH transmission.

Figure 24:
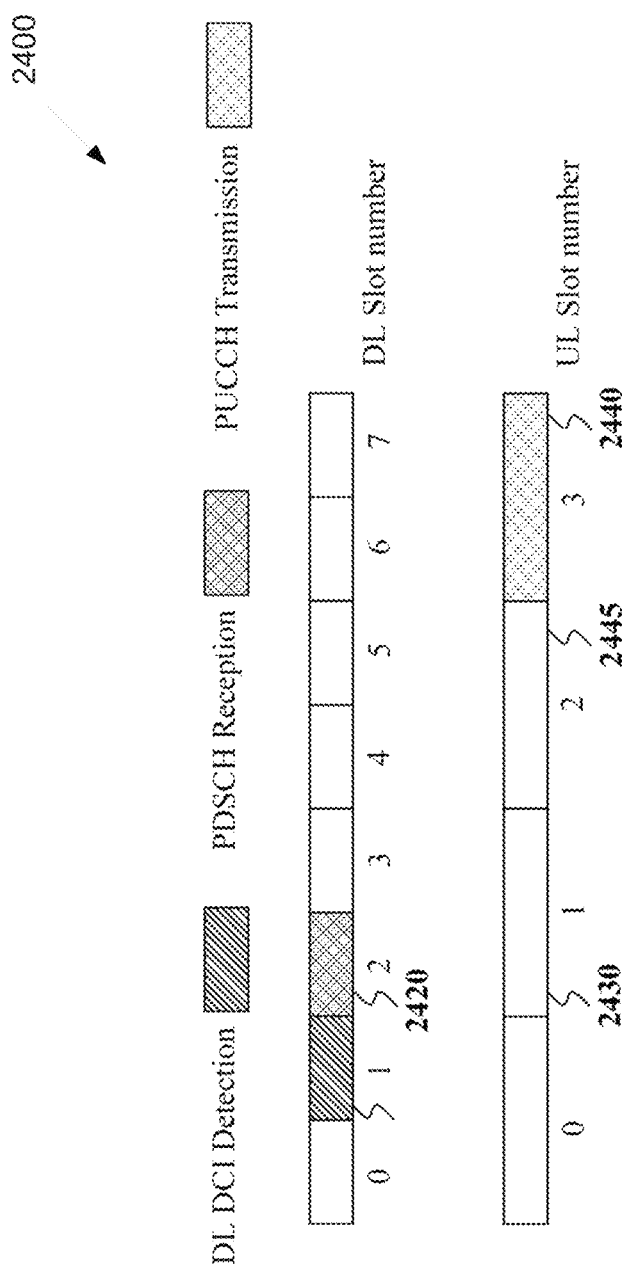
FIG. 24 illustrates an example timing determination between a PDSCH reception and a PUCCH transmission conveying corresponding HARQ-ACK information according to embodiments of the present disclosure.

FIG. 24 illustrates an example timing determination 2400 between a PDSCH reception and a PUCCH transmission conveying corresponding HARQ-ACK information according to embodiments of the present disclosure. The embodiment of the timing determination 2400 illustrated in FIG. 24 is for illustration only and could have the same or similar configuration. FIG. 24 does not limit the scope of this disclosure to any particular implementation.

As shown in FIG. 24, a UE is configured with DL slot duration for PDCCH or PDSCH receptions and with an UL slot for PUCCH transmissions. The UL slot duration is twice the DL slot duration. In DL slot 1 2410, the UE detects a DL DCI format scheduling a PDSCH reception in DL slot 2 2420 and including a field that indicates a timing for a corresponding HARQ-ACK transmission in a PUCCH. The timing value is 2 and is interpreted by the UE in number of UL slots relative to the UL slot 1 2430 as the end of DL slot 2 2420 is in UL slot 1 2430. Based on the timing value, the UE transmits a PUCCH conveying the HARQ-ACK information in UL slot 3 2440. It is also possible that the timing is relative to the end of DL slot 1 of the DCI format detection and in that case, for the example in FIG. 24, a timing value of 2 again indicates a PUCCH transmission in UL slot 2 2445.

For simplicity of the descriptions, the following consider a same slot duration, or symbol duration, for DL transmissions to a UE and for UL transmissions from the UE. Nevertheless, the descriptions can be generalized for different slot durations or symbol durations between DL transmissions and UL transmissions.

For simplicity of the descriptions, the following consider a same slot duration, or symbol duration, for DL transmissions to a UE and for UL transmissions from the UE. Nevertheless, the descriptions can be generalized for different slot durations or symbol durations between DL transmissions and UL transmissions.

A UE detects DL DO formats scheduling PDSCH receptions to the UE in a number of slots up to slot $n_1$ and all DL DCI formats indicating a transmission of a corresponding HARQ-ACK codebook in slot $n_1+k_1$. The UE also detects in slot $n_2$ an UL DCI format scheduling a PUSCH transmission from the UE in slot $n_2+k_2$. It is $n_1+k_1=n_2+k_2$. The following two cases are considered.

In one embodiment of Case 1: $n_1 \le n_2$, when $n_1 \le n_2$, the UE can determine a number of HARQ-ACK bits to transmit in slot $n_1+k_1$ before or at a same time the UE determines a PUSCH transmission in slot $n_2+k_2$ (same as slot $n_1+k_1$). Therefore, when the UE detects the UL DCI scheduling the PUSCH transmission, the UE can also know a size of a HARQ-ACK codebook the UE needs to multiplex with data in the PUSCH transmission.

For example, the UE can be indicated the HARQ-ACK codebook size either by prior higher layer configuration or through a DL assignment index (DAI) in an UL DCI format scheduling the PUSCH transmission.

Then, using a formula, such as for example as in equation 9 or equation 10, the UE can determine a number of sub-carriers in the PUSCH transmission required for multiplexing the HARQ-ACK coded modulation symbols, and can determine a remaining number of available sub-carriers in the time-frequency resources (RBs and slot symbols) allocated for the PUSCH transmission for mapping the data information or CSI. Then, the UE can perform the encoding and rate matching of the HARQ-ACK information bits and data information bits or CSI bits using parallel processing.

Same functionalities apply for transmission of CSI-type information in a PUSCH as the UE can know in advance the information payload and a number of required sub-carriers for mapping coded modulated symbols, for example using a formula such as for example as in equation 11. For periodic CSI that is multiplexed in the PUSCH, the payload can be determined in advance while for aperiodic CSI triggered by a field in the UL DCI format, the payload can be determined upon the detection of the DCI format.

Figure 25:
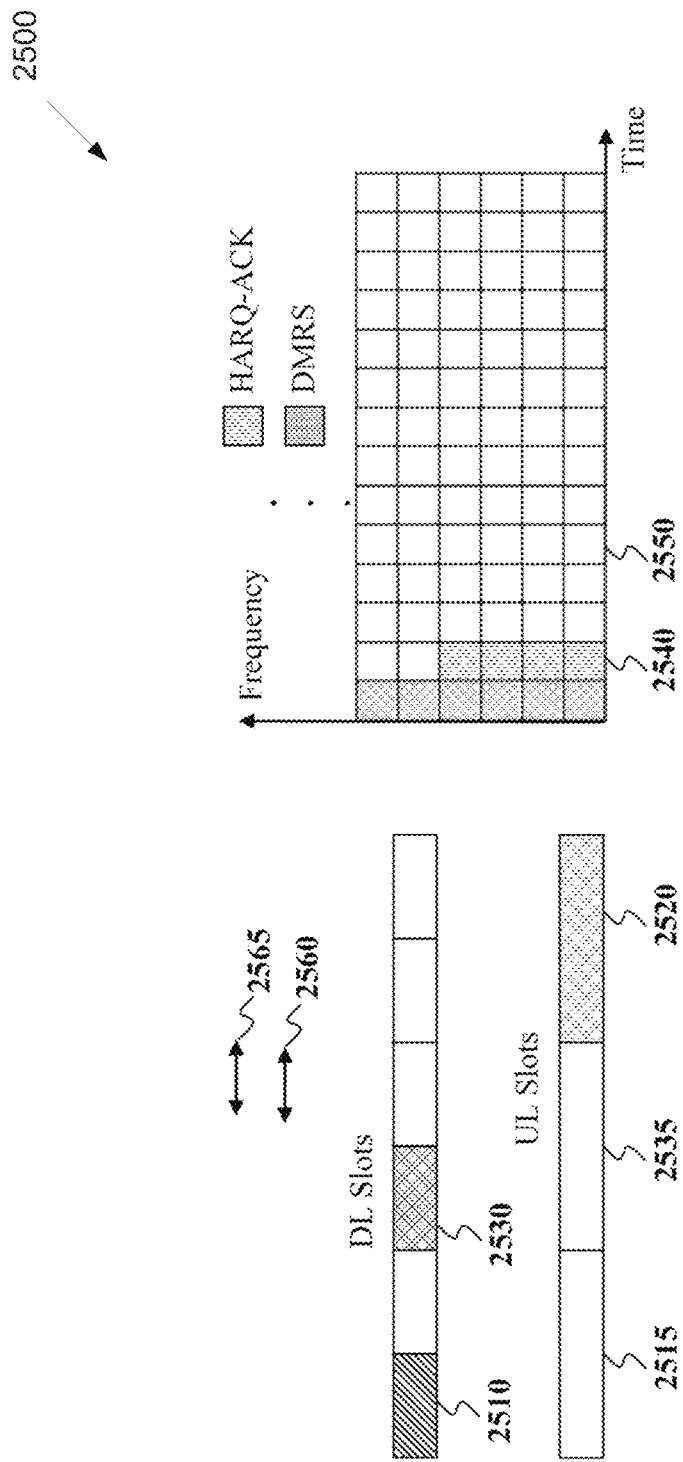
FIG. 25 illustrates an example first determination process for a UE to apply rate matching or puncturing when the UE multiplexes HARQ-ACK information and data information in a PUSCH transmission according to embodiments of the present disclosure.

FIG. 25 illustrates an example first determination process 2500 for a UE to apply rate matching or puncturing when the UE multiplexes HARQ-ACK information and data information in a PUSCH transmission according to embodiments of the present disclosure. The embodiment of the first determination process 2500 illustrated in FIG. 25 is for illustration only and could have the same or similar configuration. FIG. 25 does not limit the scope of this disclosure to any particular implementation.

As shown in FIG. 25, a UE detects DL DCI formats that schedule PDSCH receptions in DL slots up to DL slot $n_{D,1}$ 2510 and indicate, through a $k_{U,1}$ value of a field, a transmission of an associated HARQ-ACK codebook in UL slot $n_{U,1}+k_{U,1}$ 2520 where $n_{U,1}$ 2515 is an UL slot overlapping with the end of DL slot $n_{D,1}$ (of last DCI format detection or PDSCH reception) and $k_{U,1}$ is a number of UL slots, after UL slot $n_{U,1}$, for transmission of a corresponding HARQ-ACK codebook.

The UE detects an UL DCI format in DL slot $n_{D,2}$ 2530 that indicates an associated PUSCH transmission in UL slot $n_{U,2}+k_{U,2}=n_{U,1}+k_{U,1}$ 2520 where $n_{U,2}$ 2535 is an UL slot overlapping with the end of DL slot $n_{D,2}$ and $k_{U,2}$ is a number of UL slots, after UL slot $n_{U,2}$ indicated in the UL DCI format for transmission of a corresponding PUSCH. It is $n_{D,1} \le n_{D,2}$. Based on the information in the UL DCI format, such as an MCS field value, and on the HARQ-ACK codebook size, the UE determines a number of $N_{HARQ-ACK}^{sc}$ PUSCH sub-carriers where the UE is expected to multiplex coded modulated HARQ-ACK symbols 2540. A mapping of coded modulation data symbols is on PUSCH sub-carriers that exclude the $N_{HARQ-ACK}^{sc}$ sub-carriers 2550 (and DMRS symbols or DMRS sub-carriers and other configured sub-carriers). Encoding and rate matching to corresponding sub-carriers for HARQ-ACK information 2560 and data information 2565 can overlap in time.

In one embodiment of Case 2: $n_1 > n_2$, when $n_1 > n_2$, the UE does not know whether the UE will detect additional DL DCI formats scheduling respective PDSCH receptions after slot $n_2$ when the UE detects the UL DCI format.

When the HARQ-ACK codebook size is configured in advance by higher layer signaling, there are two cases. The first case is when the UE detects at least one DL DCI format in a slot prior to or same as slot $n_2$, the UE can determine the HARQ-ACK codebook size to multiplex in a PUSCH in slot $n_2+k_2$, regardless of whether or not the UE detects additional DL DCI formats after slot $n_2$ that require transmission of HARQ-ACK information in slot $n_2+k_2$, and based on the information in the UL DCI format as previously described the UE can determine a number of required sub-carriers for mapping the coded modulated HARQ-ACK symbols. Therefore, this case is practically equivalent to Case 1 when $n_1 \le n_2$ and the UE can be expected to apply rate matching for multiplexing HARQ-ACK and data information in the PUSCH.

The second case is when the UE does not detect any DL DCI format in a slot prior to or same as slot $n_2$ and the UE detects a DL DCI format after slot $n_2$ with a respective HARQ-ACK transmission in slot $n_2+k_2$ then, depending on a minimum UE processing time between an UL DCI detection and a respective PUSCH transmission (UE PUSCH preparation time), the UE may not be able to determine a number of required sub-carriers for HARQ-ACK multiplexing in the PUSCH before the UE performs encoding and rate matching of the data information to available resources. For the second case, the UE can be expected to apply puncturing of data on sub-carriers where the UE performs mapping of coded and modulated HARQ-ACK symbols when $n_2+k_2-n_1$ is smaller than the minimum UE PUSCH preparation time (otherwise, the UE can apply rate matching between data information and HARQ-ACK information). Unless otherwise stated, the following consider that $n_2+k_2-n_1$ is smaller than the minimum UE PUSCH preparation time but exceptions resulting to joint coding of all HARQ-ACK information bits in a PUSCH are also described.

When the HARQ-ACK codebook size is dynamically determined based on DAI value in detected DL DCI formats, the UE can be expected to apply puncturing of data on sub-carriers where the UE performs mapping of coded and modulated HARQ-ACK symbols for DL DCI formats the UE detects in slots after a slot where the UE detects an UL DCI format scheduling the PUSCH transmission where the UE multiplexes the corresponding HARQ-ACK information.

For $n_1 > n_2$ it is also possible, in order to simplify overall operation, to unconditionally apply puncturing to data symbols on sub-carriers where HARQ-ACK information symbols are to be transmitted.

Figure 26:
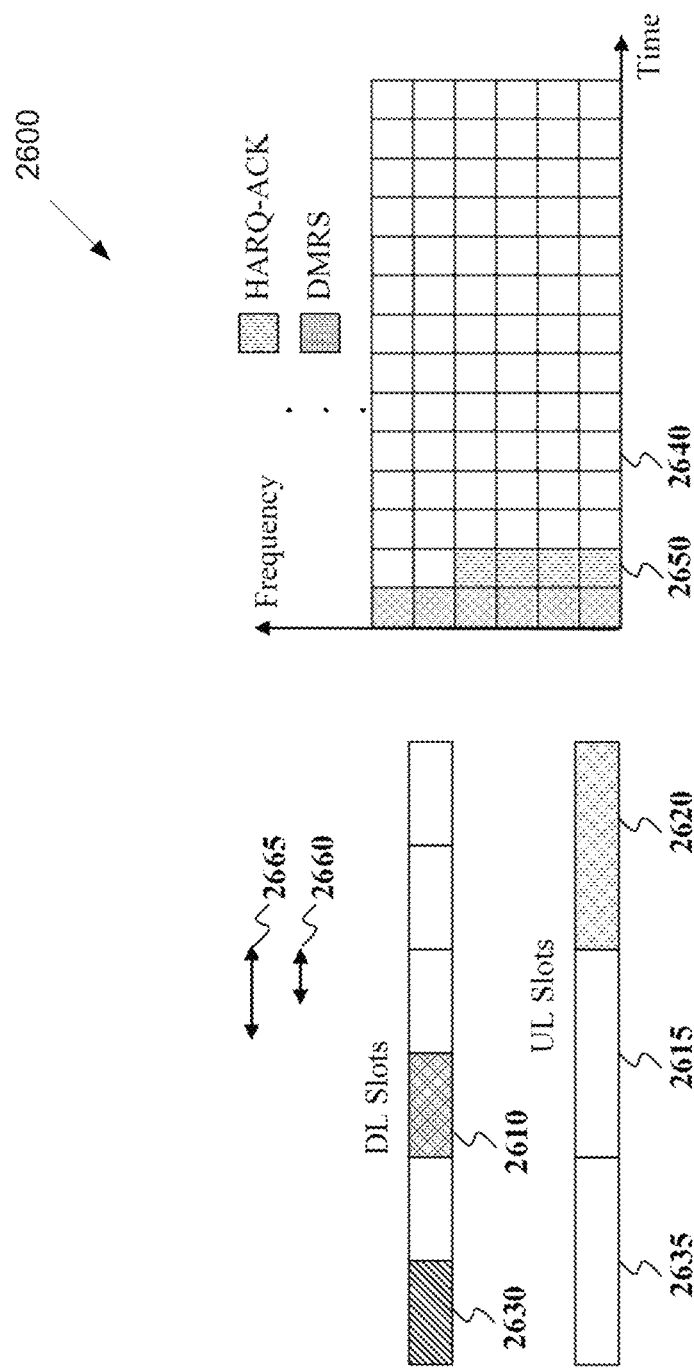
FIG. 26 illustrates an example second determination process for a UE to apply rate matching or puncturing when the multiplexes HARQ-ACK information and data information in a PUSCH transmission according to embodiments of the present disclosure.

FIG. 26 illustrates an example second determination process 2600 for a UE to apply rate matching or puncturing when the UE multiplexes HARQ-ACK information and data information in a PUSCH transmission according to embodiments of the present disclosure. The embodiment of the second determination process 2600 illustrated in FIG. 26 is for illustration only and could have the same or similar configuration. FIG. 26 does not limit the scope of this disclosure to any particular implementation.

As shown in FIG. 26, a UE detects a DL DCI format that schedules PDSCH reception in DL slot $n_{D,1}$ 2610 and indicates, through a $k_{U,1}$ value of a field, a transmission of an associated HARQ-ACK codebook in UL slot $n_{U,1}+k_{U,1}$ 2620 where $n_{U,1}$ 2615 is an UL slot overlapping with the end of DL slot $n_{D,1}$ (of last DCI format detection or PDSCH reception) and $k_{U,1}$ is a number of UL slots, after UL slot $n_{U,1}$, for transmission of a corresponding HARQ-ACK codebook. The UE detects an UL DCI format in DL slot $n_{D,2}$ 2630 that indicates an associated PUSCH transmission in UL slot $n_{U,2}+k_{U,2}=n_{U,1}+k_{U,1}$ 2620 where $n_{U,2}$ 2635 is an UL slot overlapping with the end of DL slot $n_{D,2}$ and $k_{U,2}$ is a number of UL slots, after UL slot $n_{U,2}$, indicated in the UL DCI format for transmission of a corresponding PUSCH. It is $n_{D,1} > n_{D,2}$.

The UE can start data encoding and rate matching prior to the detection of the DL DCI format in DL slot $n_{D,1}$ 2610 and a mapping of coded modulation data symbols is on all available PUSCH sub-carriers (excluding DMRS sub-carriers or other sub-carriers that are reserved or configured for other transmissions such as SRS or CSI by the UL DCI format) 2640. Based on the information in the UL DCI format, such as an MCS field value, and on the HARQ-ACK codebook size, the UE determines a number of $N_{HARQ-ACK}^{sc}$ PUSCH sub-carriers where the UE is expected to multiplex coded modulated HARQ-ACK symbols 2650. The UE punctures data in sub-carriers where the UE transmits HARQ-ACK coded modulated symbols. Encoding and rate matching to corresponding sub-carriers for HARQ-ACK information 2660 can start after ones for data information 2665.

When an UL DCI format received from a UE in slot $n_2$ and scheduling a PUSCH transmission from the UE in slot $n_2+k_2$ includes a DAI field (UL DAI), the DAI field indicates a number of DL DCI formats, or equivalently a number of HARQ-ACK information bits, that the UE needs to provide corresponding HARQ-ACK information in slot $n_2+k_2$. A DL DCI format scheduling a PDSCH reception to the UE with respective HARQ-ACK transmission in a slot $n_2+k_2$ can include a counter DAI field and a total DAI field. A configuration for DAI fields in a DL DCI format for a UE can be avoided when a semi-static HARQ-ACK codebook determination is configured for the UE. Then, using the values of the UL DAI field and, when any, of the counter DAI and total DAI fields, the UE can determine a HARQ-ACK codebook size to transmit in the PUSCH in slot $n_2+k_2$.

For example, a UE can be configured a bundling window size of 4 slots, 2 cells, and 2 HARQ-ACK bits per PDSCH reception and the UE then determines a HARQ-ACK codebook size of 16 bits when the UE receives at least one PDSCH or when an UL DAI indicates HARQ-ACK transmission in a PUSCH. A value of the UL DAI field can indicate a second number of HARQ-ACK information bits for the UE to transmit in the PUSCH, in addition to a first number of HARQ-ACK information bits that the UE determines according to the semi-static HARQ-ACK codebook size. With respect to data multiplexing in the PUSCH, the UE can apply rate matching and a first encoding method for the first number of HARQ-ACK bits and apply puncturing and a second encoding method for the second number of HARQ-ACK bits when the UE cannot jointly encode HARQ-ACK information bits corresponding to DL DCI formats the UE detects prior to or at a same PDCCH monitoring occasion as the UL DCI format and HARQ-ACK information bits corresponding to DL DCI formats the UE detects after the UL DCI format.

When the UE has enough processing time to jointly encode all HARQ-ACK information bits, the UE can jointly encode the first and second number of HARQ-ACK bits in a same HARQ-ACK codeword and apply rate matching for multiplexing HARQ-ACK information and data information in the PUSCH based on a total number of HARQ-ACK bits the UE determines from a value of the DAI field in the UL DCI format scheduling the PUSCH transmission.

The required/minimum UE processing time for jointly encoding all HARQ-ACK information bits for a transmission in a PUSCH, including ones corresponding to DL DCI formats the UE detects after detecting an UL DCI format scheduling the PUSCH transmission, can be different than the minimum UE PUSCH preparation time as it is determined by a time the UE generates the last HARQ-ACK information bit and a time the UE needs to encode the HARQ-ACK information bits. These functionalities can happen in parallel to rate matching between data information bits and HARQ-ACK information bits as the UE knows from the value of the DAI in the UL DCI format a number of resource elements to be used for multiplexing the encoded and modulated HARQ-ACK information bits.

For a dynamic HARQ-ACK codebook size that a UE can determine according to values of the UL DAI field and the DL counter DAI and total DAI fields, an UL DAI value in an UL DCI format transmitted in slot $n_2$ and scheduling a PUSCH transmission from a UE (UL DAI) in a slot $n_2+k_2$ can indicate, in conjunction with a counter DAI or a total DAI in DL DCI formats scheduling PDSCH receptions to the UE with respective HARQ-ACK transmissions from the UE in slot $n_2+k_2$, a HARQ-ACK codebook size larger than a HARQ-ACK codebook size determined from the DL counter DAI and the DL total DAI.

For example, a UE can determine a HARQ-ACK codebook size of 12 bits from values of a counter DAI and total DAI that the UE received in several DL DCI formats for respective PDSCH receptions associated HARQ-ACK transmission in slot $n_2+k_2$ and determine a HARQ-ACK codebook size of 16 bits from a value of an UL DAI field that the UE received in an UL DCI format scheduling PUSCH transmission in slot $n_2+k_2$. For example, UL DAI values of "00," "01," "10" and "11" can respectively indicate a HARQ-ACK codebook size of 0, 8, 16, 24, . . . bits, of 2, 10, 18, 26, . . . bits, of 4, 12, 20, 28, . . . bits and of 6, 14, 22, 30, . . . bits and the UL DAI value in the UL DCI format is "00" when the HARQ-ACK codebook size the UE determines from the DL counter and total DAI values is 12.

As the UE cannot generally know from the value of the UL DAI field how many DL DCI formats were transmitted to the UE after slot $n_2$, since the UE can fail to detect last DL DCI formats with consecutive counter DAI values until slot $n_2$, the UE needs to assume a first number of the additional HARQ-ACK bits (4 HARQ-ACK bits in the example) to include in a first HARQ-ACK codebook with the HARQ-ACK bits the UE determines from the DL counter and total DAI values and a second number of the additional HARQ-ACK bits to include on their own in a second HARQ-ACK codebook. This number can be configured by a gNB to the UE by higher layer signaling or be predetermined in a system operation. For example, the gNB can configure the UE to assume S HARQ-ACK bits for the second number of HARQ-ACK information bits. With respect to data multiplexing in the PUSCH, the UE can apply rate matching and a first encoding method for the first number of HARQ-ACK bits and apply puncturing and a second encoding method for the second number of HARQ-ACK information bits. When the UE can encode the HARQ-ACK information bits after the last DL DCI the UE detects, even when the UE detects the last DL DCI format after the UE detects the UL DCI format scheduling the PUSCH transmission, the UE can jointly encode the first and second number of HARQ-ACK bits in a single HARQ-ACK codebook and apply rate matching based on a total number of HARQ-ACK bits the UE determines from a value of the DAI field in the UL DCI format.

Figure 27:
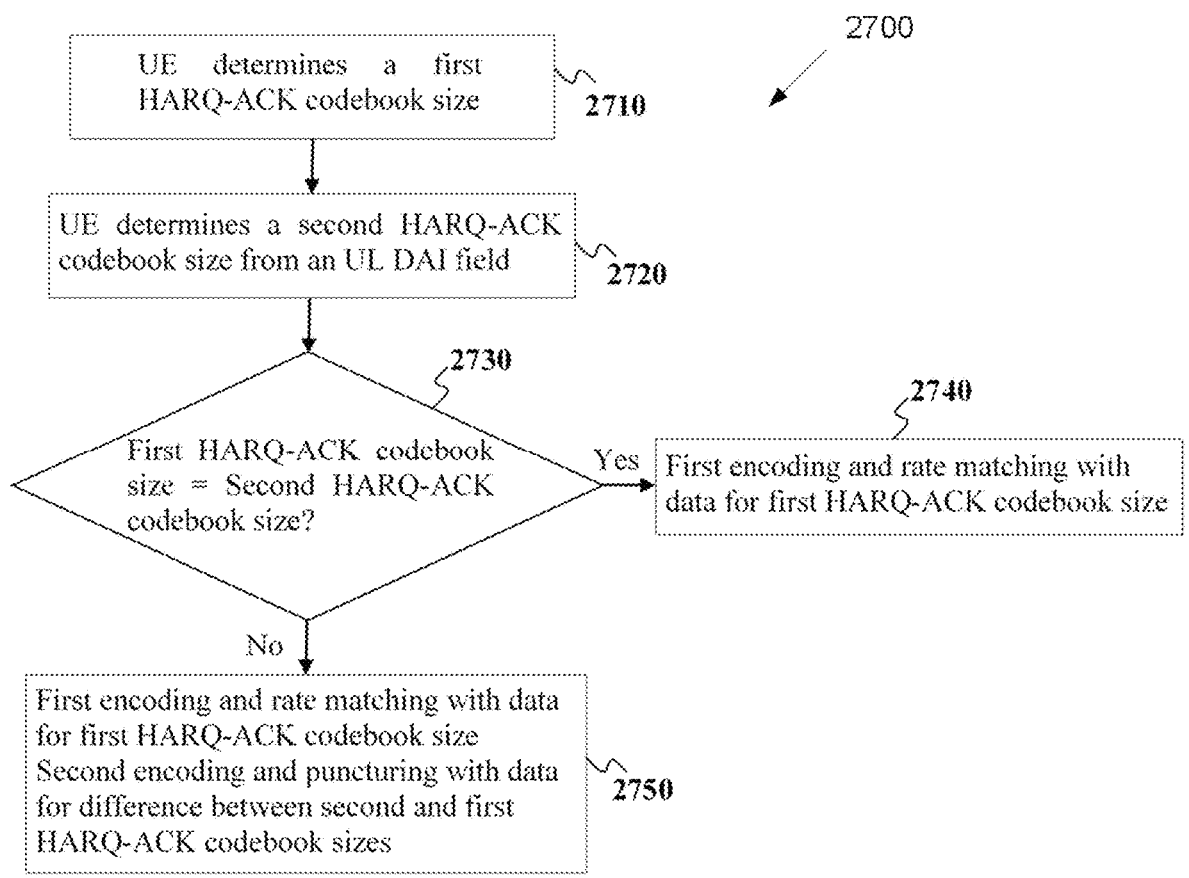
FIG. 27 illustrates a flow chart of a method for a UE to determine one or two HARQ-ACK codebook sizes according to embodiments of the present disclosure.

FIG. 27 illustrates a flow chart of a method 2700 for a UE to determine one or two HARQ-ACK codebook sizes according to embodiments of the present disclosure. The embodiment of the method 2700 illustrated in FIG. 27 is for illustration only and could have the same or similar configuration. FIG. 27 does not limit the scope of this disclosure to any particular implementation.

As shown in FIG. 27, a UE detects a DL DCI format and determines a first HARQ-ACK codebook size in step 2710. For example, the determination can be based on a semi-static HARQ-ACK codebook that the UE derives from a configuration of a number of slots, cells, and data TBs or CBGs for reporting HARQ-ACK information or on a dynamic HARQ-ACK codebook that the UE derives from counter DAI and total DAI fields in respective DL DCI formats and a configuration of data TBs or CBGs for reporting HARQ-ACK information in step 2710.

The UE detects an UL DCI format that includes an UL DAI field and determines a second HARQ-ACK codebook size in step 2720. The UE interprets the value of the UL DAI field as indicating a second HARQ-ACK codebook size that is larger than or equal to the first HARQ-ACK codebook size. For example, if the first HARQ-ACK codebook size is X bits and a granularity for the UL DAI value is Y bits then, for an UL DAI field of 2 bits, an UL DAI value indicates a second HARQ-ACK codebook size of X, or X+Y, or X+2Y, or X+3Y bits. For example, X=20 and Y=2. The UE determines whether the second HARQ-ACK codebook size is equal to the first HARQ-ACK codebook size in step 2730.

When the second HARQ-ACK codebook size is equal to the first HARQ-ACK codebook size, the UE applies a first encoding and rate matches with data the HARQ-ACK codebook in step 2740. When the second HARQ-ACK codebook size is larger the first HARQ-ACK codebook size, the UE applies the first encoding and rate matches with data the first HARQ-ACK codebook and applies a second encoding and punctures data for multiplexing a second HARQ-ACK codebook with size equal to the difference between the second and first HARQ-ACK codebook sizes in step 2750. For example, for a first HARQ-ACK codebook size or X and a second HARQ-ACK codebook size of X+2Y, the UE applies the first encoding and rate matches with data the first HARQ-ACK codebook of X bits and applies a second encoding and punctures data for multiplexing the second HARQ-ACK codebook of 2Y bits. When the UE processing time allows joint encoding of the first X and second 2Y HARQ-ACK information bits, the UE jointly codes the X and 2Y information bits and applies rate matching with the data information bits.

In on embodiment, TDM of PUCCH transmissions is considered in a same slot, One example of the aforementioned embodiment considers a PUCCH structure (format) for UCI transmission that uses a DFT-S-OFDM waveform in a slot symbol without multiplexing of UEs in same time-frequency resources. TDM for PUCCH transmissions from different UEs was considered in LTE specification. The second embodiment considers support of PUCCH transmissions with variable durations and the required signaling support in a DL DCI format to indicate the duration and location in a slot for a PUCCH transmission.

FIG. 28 illustrates an example first embodiment 2800 for TDM of two PUCCH transmissions from two respective UEs is a same slot according to embodiments of the present disclosure. The embodiment of the first embodiment 2800 illustrated in FIG. 28 is for illustration only and could have the same or similar configuration. FIG. 28 does not limit the scope of this disclosure to any particular implementation.

As shown in FIG. 28, a first UE 2810 transmits a PUCCH in a first BW and in the first three slot symbols that include symbols with UCI transmission 2820 and symbols with DMRS transmission 2825. A second UE 2830 transmits a PUCCH in the first BW and in the next four slot symbols of the slot that include symbols with UCI transmission 2840 and symbols with DMRS transmission 2845. In the second half symbols of the slot, each PUCCH transmission is in a second BW and occurs at same symbols as relative to the start of the slot 2850 and 2860. A PUCCH transmission may not occur at one or more last symbols of a slot that can be configured by higher layers to UEs as being reserved in the second BW for transmission of other channels or signals, such as SRS, or explicitly indicated by the DL DCI format indicating the duration of each PUCCH transmission.

FIG. 29 illustrates an example second embodiment 2900 for TDM of two PUCCH transmissions from two respective UEs is a same slot according to embodiments of the present disclosure. The embodiment of the second embodiment 2900 illustrated in FIG. 29 is for illustration only and could have the same or similar configuration. FIG. 29 does not limit the scope of this disclosure to any particular implementation.

As shown in FIG. 29, a first UE 2910 transmits a PUCCH in a first BW and in the first three slot symbols that include UCI transmission 2920 and DMRS transmission 2925 and in a second BW in the next three slot symbols 2930 using a same structure as in the first three symbols. A second UE 2940 transmits a PUCCH in a first BW and in the seventh, eighth, ninth, and tenth symbols that include UCI transmission 2950 and DMRS transmission 2955 and in a second BW in the last four slot symbols 2960 except for symbols, when any, configured by higher layers to the second UE as being reserved in the second BW for transmission of other channels or signals, such as SRS, or explicitly indicated by the DL DCI format indicating the duration of each PUCCH transmission.

Figure 30:
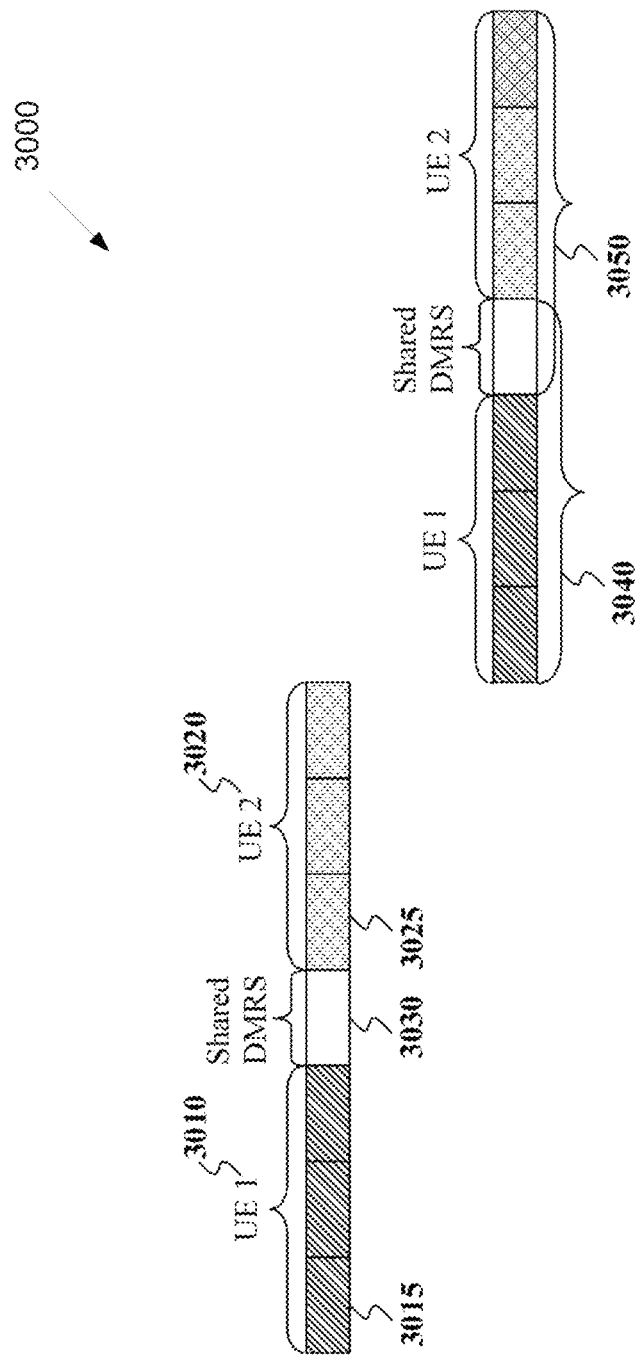
FIG. 30 illustrates an example third embodiment for TDM of two PUCCH transmissions from two respective UEs is a same slot according to embodiments of the present disclosure.

FIG. 30 illustrates an example third embodiment 3000 for TDM of two PUCCH transmissions from two respective UEs is a same slot according to embodiments of the present disclosure. The embodiment of the third embodiment 3000 illustrated in FIG. 30 is for illustration only and could have the same or similar configuration. FIG. 30 does not limit the scope of this disclosure to any particular implementation.

As shown in FIG. 30, a first UE 3010 transmits a PUCCH in the first three slot symbols that convey UCI 3015. A second UE 3020 transmits a PUCCH in the fifth through the seventh symbols that convey UCI transmission 3025. Both UEs transmit PUCCH in the fourth symbol 3030 that conveys DMRS where orthogonal UE multiplexing can be achieved, for example, through a use of different cyclic shifts of a CAZAC sequences. In the second half symbols of the slot, each PUCCH transmission is in a second BW and occurs at same symbols as relative to the start of the slot 3040 and 3050. A PUCCH transmission may not occur at one or more last symbols of a slot that can be configured by higher layers to UEs as being reserved in the second BW for transmission of other channels or signals, such as SRS, or explicitly indicated by the DL DCI format indicating the duration of each PUCCH transmission.

The structure in FIG. 30 can be modified in a straightforward manner to include more DMRS symbols for transmission in each of the first and second BWs based on a respective configuration by a gNB. For example, the number of DMRS symbols can be two and be located in the middle of the symbols used for PUCCH transmission in the first or second BW (or approximately in the middle when the number of symbols is not even) or be located at the second symbol and the second to last symbol from the number of symbols.

A signaling to a UE for the UE to determine a set of slot symbols for a PUCCH transmission can include a starting slot symbol and a number of slot symbols. Frequency hopping (FH) for a PUCCH transmission from a UE over two BWs can be configured to the UE by higher layer signaling or can be implicitly indicated by a DL DCI format. The implicit indication can be through an indication of a resource, from a set of resources, for the PUCCH transmission where some resources from the set of resources can be configured to be for a PUCCH transmission with FH and the remaining can be configured to be for a PUCCH transmission without frequency hopping. The DL DCI format can indicate the PUCCH resource.

Assuming use of FH for a PUCCH transmission and denoting by $N_{UL}$ a total number of slot symbols available for PUCCH transmissions, a UE can transmit a PUCCH in some or all of first $\lfloor N_{UL}/2 \rfloor$ slot symbols (or the first $\lceil N_{UL}/2 \rceil$ slot symbols) in first of one or more RBs of a BW and in some or all of the remaining $\lceil N_{UL}/2 \rceil$ slot symbols (or the remaining $\lfloor N_{UL}/2 \rfloor$ slot symbols) in second of the one or more RBs of the BW. For example, a UE can determine $N_{UL}$ by subtracting a number of symbols that the UE is configured by higher layers to assume as reserved from a total number of UL slot symbols.

A starting slot symbol for a PUCCH transmission can be restricted by specification to occur only at specific locations such as a first UL symbol of a slot or, in case of FH, at the $\lfloor N_{UL}/4 \rfloor$ symbol or the $\lceil N_{UL}/4 \rceil$ symbol of a slot. Then, one bit or two bits in a DL DCI format can indicate to a UE a starting slot symbol for a PUCCH transmission. A starting slot symbol for a PUCCH transmission from a UE in the first of the one or more RBs can be same as a starting slot symbol in the second of the one or more RBs.

A UE can be configured a total number of slot symbols for the PUCCH transmission. The configuration can be explicitly indicated in a DL DCI format or implicitly determined by a combination of higher layer signaling and a mapping to a number of UCI bits the UE transmits in the PUCCH. For example, the UE can be configured to transmit a PUCCH over 4 symbols when a number of UCI bits is between 3 and 11, a PUCCH transmission over 7 symbols when a number of UCI bits is between 12 and 22, and a PUCCH transmission over all $N_{UL}$ slot symbols when a number of UCI bits is above 22.

For dynamic signaling, assuming use of FH, a minimum number of 2 symbols per FH BW and a maximum of 7 symbols per FH BW, the possible durations are {2, 3, 4, 5, 6, 7} slot symbols when a first symbol for the PUCCH transmission is the first slot symbol, {2, 3, 4, 5} when a first symbol is the third slot symbol, {2, 3, 4} when a first symbol is the fourth slot symbol, {2, 3} when a first symbol is the fifth slot symbol and {2} when a first symbol is the fifth slot symbol. Therefore, a total number of combinations for a first symbol and a number of symbols for a PUCCH transmission is 16 and can be indicated by 4 bits.

Figure 31:
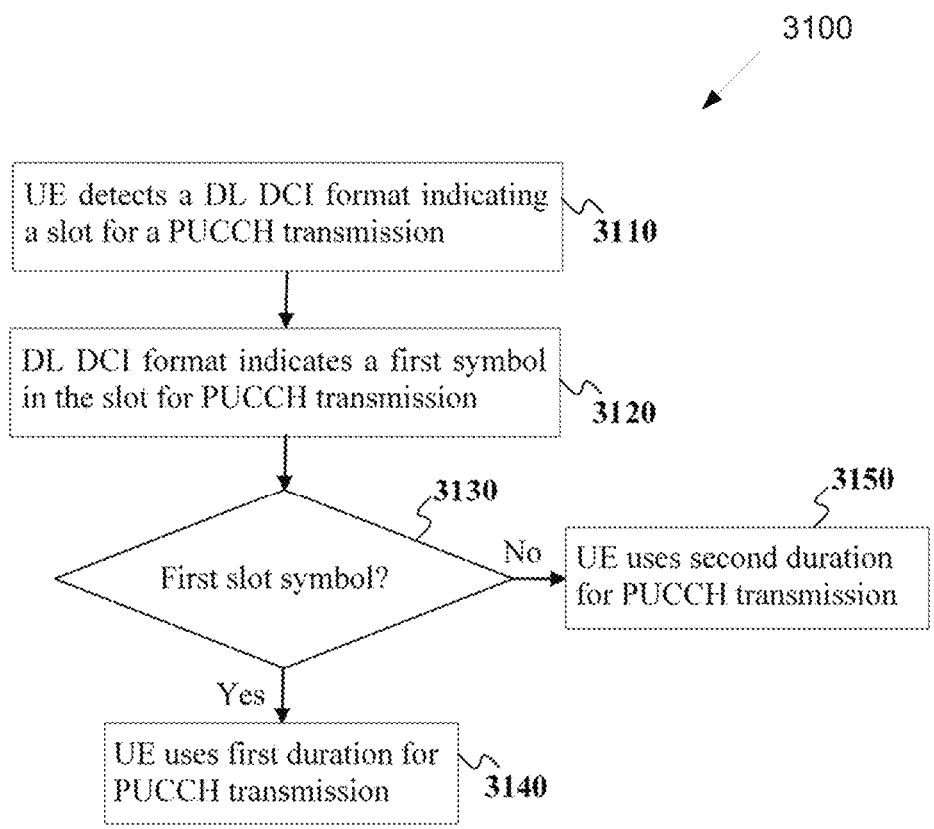
FIG. 31 illustrates a flow chart of a method for a UE to determine a configuration for a PUCCH transmission in a slot according to embodiments of the present disclosure.

FIG. 31 illustrates a flow chart of a method 3100 for a UE to determine a configuration for a PUCCH transmission in a slot according to embodiments of the present disclosure. The embodiment of the method 3100 illustrated in FIG. 31 is for illustration only and could have the same or similar configuration. FIG. 31 does not limit the scope of this disclosure to any particular implementation.

As shown in FIG. 31, a UE detects a DL DCI format indicating a slot for a PUCCH transmission, for example for the UE to convey HARQ-ACK or CSI-type information in step 3110. The DL DCI format also indicates a first symbol in the slot for the PUCCH transmission in step 3120. The slot indication and first slot symbol indication can be jointly encoded in one field of the DCI format or can be provided by separate fields of the DL DCI format. The UE determines whether the first slot symbol for the PUCCH transmission is the first UL symbol in the slot (or the first UL symbol configured for PUCCH transmissions in the slot) in step 3130. When the first slot symbol for the PUCCH transmission is the first UL symbol in the slot, the UE transmits the PUCCH over a first duration in step 3140. When the first slot symbol for the PUCCH transmission is not the first UL symbol in the slot, the UE transmits the PUCCH over a second duration in step 3150.

In one embodiment, a resource determination for a PUCCH transmission conveying HARQ-ACK information is considered when a corresponding PUCCH format depends on a HARQ-ACK information payload. One example considers a UE configured for single cell operation. When the UE transmits HARQ-ACK information in a PUCCH in response to a detection of a single DL DCI format, the UE uses a first PUCCH format and a first resource allocation method for a PUCCH transmission.

For example, a PUCCH resource can be defined by an RB and a number of slot symbols for the PUCCH transmission and also by a cyclic shift and an OCC, similar to PUCCH format 1a/1b in LTE, for forming the associated DMRS and HARQ-ACK signal. When the UE transmits HARQ-ACK information in a PUCCH in response to a detection of more than one DL DCI formats, the UE uses a second PUCCH format and a second resource allocation method for the PUCCH transmission.

For example, a PUCCH resource can be defined by one or more RBs and a number of slot symbols for the PUCCH transmission where at least the one or more RBs or the number of symbols are different than the RB for PUCCH transmission in response to the detection of a single DL DCI format since different PUCCH formats are used and orthogonal multiplexing of corresponding PUCCH transmissions in same resources is not, possible.

In one example, a UE can erroneously determine a PUCCH resource (and a PUCCH format) when a gNB transmits to the UE more than one DL DCI formats indicating a corresponding HARQ-ACK feedback in a single PUCCH transmission, and the UE detects only one of the DL DCI formats. It is also possible, although with practically negligible probability, that the UE detects a DL DCI format due to a false positive CRC check when the gNB does not transmit the DL DCI format. An erroneous PUCCH resource determination due to a missed DL DCI format detection can often occur with probability larger than a HARQ-ACK detection error probability and lead to interference among PUCCH transmissions that can create multiple HARQ-ACK detection errors.

In one embodiment for avoiding an incorrect PUC resource determination by a UE, a DL DCI format can include a PUCCH format indicator field in order for a gNB to explicitly indicate to the UE a PUCCH format that the UE may use for a corresponding PUCCH transmission. The PUCCH format indicator field can be a separate field or can be provided by a field jointly indicating a PUCCH format and a PUCCH resource as different PUCCH resources are configured for different PUCCH formats. A single bit indicating a PUCCH format corresponding to a lower or a higher HARQ-ACK payload than the one determined by a UE can suffice.

For example, for three PUCCH formats where a first, second, and third PUCCH formats respectively correspond to HARQ-ACK payloads of 1 or 2 bits, of 3 to 11 bits, and of above 11 bits, a probability for a UE to determine a HARQ-ACK payload of 1 or 2 bits when an actual one is more than 11 bits is typically negligible. For example, when the UE determines a HARQ-ACK payload of 1 or 2 bits, the UE can use the PUCCH format for HARQ-ACK payloads of 1 or 2 HARQ-ACK bits when the PUCCH format indicator field indicates a first PUCCH format and use the PUCCH format fir HARQ-ACK payloads between 3 and 11 HARQ-ACK bits when the PUCCH format indicator field indicates a second PUCCH format.

For example, when the UE determines a HARQ-ACK payload of 4 bits, the UE can use the PUCCH format for HARQ-ACK payloads between 3 and 11 HARQ-ACK bits regardless of a value for the PUCCH format indicator field. For example, when the UE determines a HARQ-ACK payload of 10 bits, the UE can use the PUCCH format for HARQ-ACK payloads between 3 and 11 HARQ-ACK bits when the PUCCH format indicator field indicates a first PUCCH format and use the PUCCH format for HARQ-ACK payloads above 11 HARQ-ACK bits when the PUCCH format indicator field indicates a second PUCCH format.

For example, when the UE determines a HARQ-ACK payload of above 11 bits, the UE can use the PUCCH format for HARQ-ACK payloads of above 11 HARQ-ACK bits regardless of a value for the PUCCH format indicator field—in such cases, the UE can use the PUCCH format indicator field fir confirming a validity of a detected DL DCI format and can consider the DL DCI format as invalid when the UE indicates use of a PUCCH format corresponding to a smaller HARQ-ACK payload range.

In one embodiment for avoiding an incorrect PUCCH resource determination by a UE, a DL DCI format can include a DL assignment indicator (DAT) field that is an incremental counter for the DL DCI format in a number of DL DCI formats with corresponding HARQ-ACK information in a same HARQ-ACK codebook and transmission in a same PUCCH. The indicated PUCCH resource in the DL DCI format varies according to the DAI value. When the DAI value is one, the DL DCI format indicates a resource for a transmission of a PUCCH having a first PUCCH format, when the DAI value is between two and a predetermined value such as one corresponding to a HARQ-ACK payload of 11 bits, the DL DCI format indicates a resource for a transmission of a PUCCH having a second PUCCH format, and when the DAI value is larger than the predetermined value, the DL DCI format indicates a resource for a transmission of a PUCCH having a third PUCCH format.

In one embodiment for avoiding an incorrect PUCCH resource determination by a UE, a DL DCI format can include a DL assignment indicator (DAI) field that is a total counter for a number of DL DCI formats with corresponding HARQ-ACK information in a same HARQ-ACK codebook and transmission in a same PUCCH. The indicated. PUCCH resource in the DL DCI format varies according to the DAI value. When the DAI value is one, the DL DCI format indicates a resource for a transmission of a PUCCH having a first PUCCH format, when the DAI value is between two and a predetermined value such as one corresponding to a HARQ-ACK payload of 11 bits, the DL DCI format indicates a resource for a transmission of a PUCCH having a second PUCCH format, and when the DAI value is larger than the predetermined value, the DL DCI format indicates a resource for a transmission of a PUCCH having a third PUCCH format.

Figure 32:
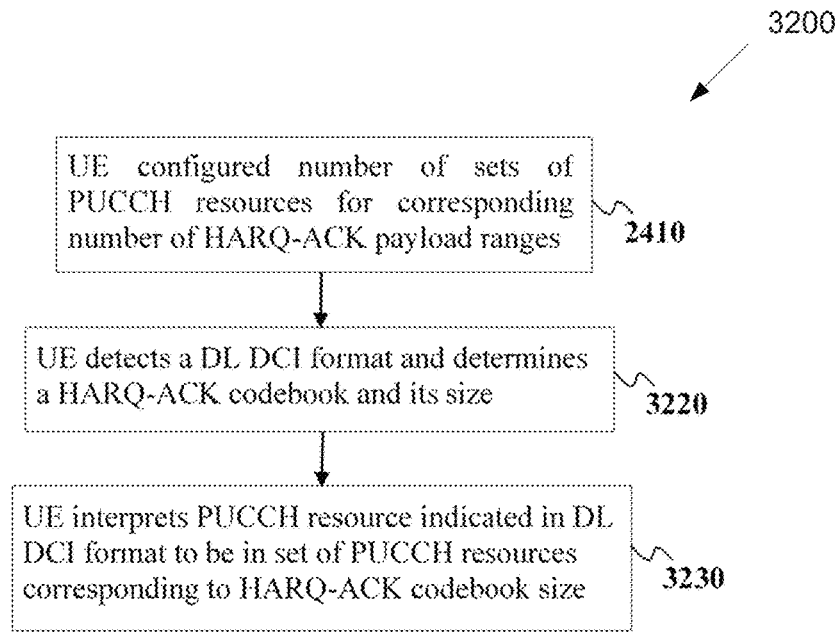
FIG. 32 illustrates a flow chart of a method for a UE to determine a PUCCH resource from multiple sets of configured PUCCH resources for a PUCCH transmission according to embodiments of the present disclosure.

FIG. 32 illustrates a flow chart of a method 3200 for a UE to determine a PUCCH resource from multiple sets of configured PUCCH resources for a PUCCH transmission according to embodiments of the present disclosure. The embodiment of the method 3200 illustrated in FIG. 32 is for illustration only and could have the same or similar configuration. FIG. 32 does not limit the scope of this disclosure to any particular implementation.

As shown in FIG. 32, a UE is configured a number of sets of PUCCH resources for a corresponding number of HARQ-ACK payload ranges in step 3210. The UE can be configured with different sets of PUCCH resources, such as numbers of RB s, even for a same PUCCH format in order to transmit different HARQ-ACK payloads using a same PUCCH format. The UE detects a DL DCI format and determines a HARQ-ACK codebook and a corresponding size in step 3220. Based on the HARQ-ACK codebook size, the UE interprets a PUCCH resource indicated by field in the DL DCI format as belonging to a set of PUCCH resources that corresponds to the HARQ-ACK codebook size in step 3230.

In one embodiment, a determination by a UE of HARQ-ACK information is considered when the UE is configured to provide HARQ-ACK information for CBGs of a data TB. A gNB can configure a UE a number of CBGs per TB, $N_{HARQ-ACK}^{TB}$, for the UE to provide corresponding HARQ-ACK information. At least when a HARQ-ACK codebook transmission is not protected by CRC, a DL DCI format includes a bit-map of $N_{HARQ-ACK}^{TB}$ bits indicating the CBGs of a TB that the gNB retransmits. For example, a value of "0" can indicate no retransmission while a value of "1" can indicate retransmission. Due to errors in HARQ-ACK codebook detection by the gNB and for a given data TB, the DL DCI format can indicate retransmission of CBGs that were correctly received by the UE or indicate no retransmissions of CBGs that were incorrectly received by the UE.

When a DL DCI format does not indicate a retransmission of a CBG that a UE incorrectly received, the UE can provide a NACK value for the CBG in a transmission of a HARQ-ACK codebook. This is possible when a HARQ-ACK codebook size corresponding to a TB is same as a number of configured CBGs (assuming no HARQ-ACK bundling across CBGs) and does not depend on a number of CBGs conveyed in a PDSCH transmission. When a DL DCI format indicates a retransmission of a CBG that a UE correctly received, the UE can disregard processing of the CBG can always set a corresponding value in a HARQ-ACK codebook to ACK.

Figure 33:
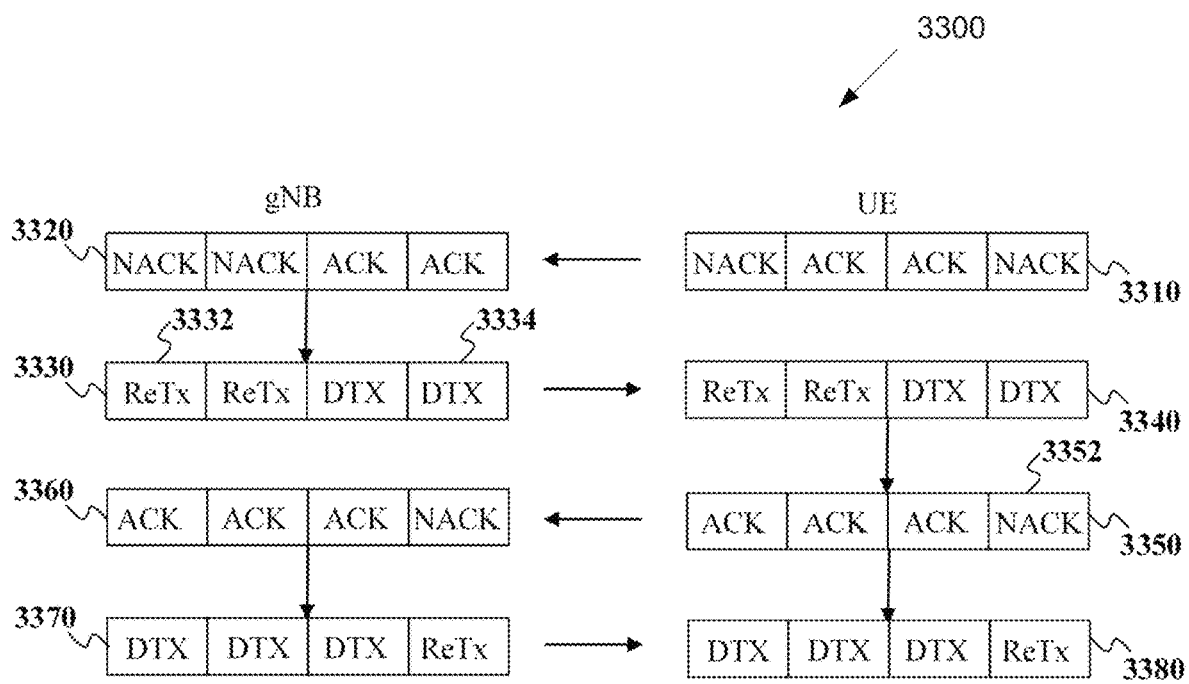
FIG. 33 illustrates an example UE to determine HARQ-ACK information corresponding to CBGs and for a gNB to perform CBG transmissions according to embodiments of the present disclosure.

FIG. 33 illustrates an example UE to determine HARQ-ACK information 3300 corresponding to CBGs and for a gNB to perform CBG transmissions according to embodiments of the present disclosure. The embodiment of the a UE to determine HARQ-ACK information 3300 illustrated in FIG. 33 is for illustration only and could have the same or similar configuration. FIG. 33 does not limit the scope of this disclosure to any particular implementation.

As shown in FIG. 33, based on one or more data TB transmissions from a gNB (the one or more TB s are associated with a same HARQ process number), a UE determines a HARQ-ACK codebook corresponding to 4 CBGs 3310. The gNB incorrectly detects the HARQ-ACK codebook transmitted from the UE 3320. The gNB retransmits a number of CBGs 3330 that include CBGs that the UE correctly decoded 3332 and do not include CBGs that the UE incorrectly decoded 3334. The UE detects a DL DCI format scheduling the transmission of the CBGs and, through a bit-map of 4 bits in the DL DCI format, the UE determines the transmitted CBGs 3340.

The UE performs HARQ soft combining for CBs of transmitted CBGs that the UE did not previously correctly decode and discards CBs that the UE previously correctly decoded, generates and transmits a HARQ-ACK codebook for the CBGs 3350 with values based on the decoding outcomes of CBs in each CBG, and sets to a NACK value the decoding outcome for a CBG that includes incorrectly decoded CBs and was not transmitted by the gNB 3352. The gNB correctly decodes the HARQ-ACK codebook 3360. The gNB transmits the CBs of the CBG having a decoded NACK value and does not transmit the CBs of CBGs having a decoded ACK value 3370. The UE detects a DL DCI format scheduling the transmission of the CBGs and, through a bit-map of 4 bits in the DL DCI format, the UE determines the transmitted CBG 3380.

In case of multiple TBs, a same number of CBGs per TB can be configured and HARQ-ACK bundling across CBGs of different TBs can also apply for the exemplary purposes of FIG. 33. In case HARQ-ACK bundling applies across different TBs, a same RV value can apply for both TB s and a respective DL DCI format can include a single RV field and a single NDI field instead of including separate respective field for each TB.

When a HARQ-ACK codebook transmission is protected by CRC, a DL DCI format does not need to include a bit-map of $N_{HARQ-ACK}$ bits to indicate the CBGs of a TB that the gNB retransmits. When the gNB correctly detects the HARQ-ACK codebook, the gNB can retransmit CBGs with a corresponding NACK value in the HARQ-ACK codeword and, for a same HARQ process number, indicate a next redundancy version (RV) value in the RV field included in the DCI format. For example, RV values can be in a series of 0 for an initial transmission of a data TB followed by 2, 3, and 1 for a respective first, second, and third retransmission of the data TB.

The UE can determine that a PDSCH scheduled by the DL DCI format conveys a retransmission of the CBGs that the UE indicated as incorrectly received through corresponding NACK values in the HARQ-ACK codebook. When the gNB incorrectly detects the HARQ-ACK codebook, as determined by the CRC check, or when the gNB determines that the UE did not transmit a HARQ-ACK codebook, for example by DTX detection of a corresponding PDCCH, the gNB can transmit in a PDSCH same CBGs as in a previous PDSCH transmission for a same HARQ process number using a same RV value in the RV field. When the UE detects the DL DCI format and determines a same RV value for a HARQ process number as for a previous PDSCH reception, the UE can determine that the PDSCH scheduled by the DL DCI format conveys same CBGs as in the previous PDSCH reception for the HARQ process number.

Figure 34:
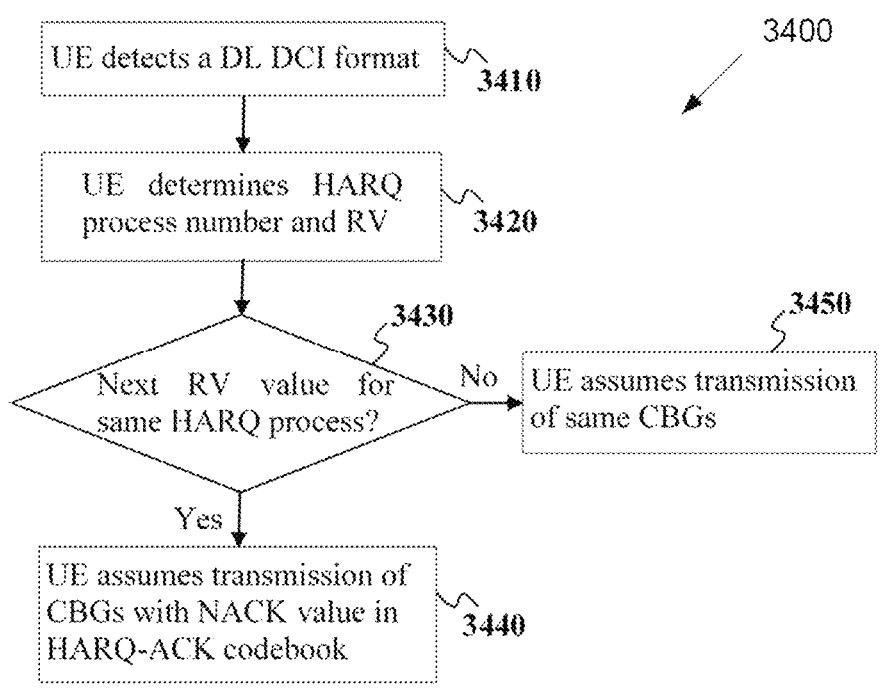
FIG. 34 illustrates a flow chart of a method for a UE to determine a number of transmitted CBGs and a RV value according to embodiments of the present disclosure.

FIG. 34 illustrates a flow chart of a method 3400 for a UE to determine a number of transmitted CBGs and a RV value according to embodiments of the present disclosure. The embodiment of method 3400 illustrated in FIG. 34 is for illustration only and could have the same or similar configuration. FIG. 34 does not limit the scope of this disclosure to any particular implementation.

As shown in FIG. 34, a UE detects a DL DCI format scheduling a PDSCH transmission that includes a number of CBGs in step 3410. The UE determine values for a HARQ process number field and for a RV field that are included in the detected DL DCI format in step 3420. The UE examines the RV value for the HARQ process number in step 3430. When the RV value is a next value relative to the RV value the UE determined in a previously last DL DCI format that indicated the same HARQ process number, the UE assumes that the DL DCI format schedules transmission of the CBGs having a corresponding NACK value in a last HARQ-ACK codebook transmission by the UE for the HARQ process number in step 3440. When the RV value is same as a RV value the UE determined in the previously last DL DCI format that indicated the same HARQ process number, the UE assumes that the DL DCI format schedules same CBGs as the last DL DCI format in step 3450.

In case of carrier aggregation (CA), additional considerations are needed as a UE can transmit a HARQ-ACK codebook when the UE detects first one or more DL DCI formats scheduling PDSCH receptions in respective first one or more cells even when the UE fails to detect second one or more DL DCI formats scheduling PDSCH receptions in respective second one or more cells. The UE can have a same HARQ-ACK codebook size for all cells, through a single configuration of a HARQ-ACK codebook size, for example corresponding to a maximum number of CBGs per TB across all cells, or can have a HARQ-ACK codebook size that is separately configured for each cell. A HARQ-ACK codebook for a UE can include a number of HARQ-ACK sub-codebooks corresponding to a number of cells the UE is configured for PDSCH receptions.

Even when a HARQ-ACK sub-codebook size is always same for all cells, the UE cannot determine HARQ-ACK sub-codebooks corresponding to any of the second one or more DL DCI formats as the UE does not know the respective second one or more cells and, for any of the second one or more DL DCI formats, the UE does know a respective HARQ process number indicated by a HARQ process number field. For example, for a PDSCH transmission mode conveying a single data TB, configuration of four CBGs per TB, and a DL DCI format from the second one or more DL DCI formats, a UE can expect a either retransmission of a data TB for a first HARQ process based on a respective HARQ-ACK sub-codebook of {ACK, ACK, NACK, NACK} that the UE previously transmitted to a gNB or the UE can expect an initial transmission of a data TB for a second HARQ process or a retransmission of a data TB based on a respective HARQ-ACK sub-codebook of {NACK, ACK, NACK, ACK} that the UE previously transmitted to the gNB for the second HARQ process. Therefore, when a UE fails to detect a DL DO format, the UE cannot determine the HARQ-ACK sub-codebook to include in the HARQ-ACK codebook.

To circumvent the above ambiguity problem, for each cell where the UE did not detect a corresponding DL DCI format, the UE can be configured to transmit a sub-codebook where all HARQ-ACK values in the sub-code book are set to NACK (or NACK/DTX). For a cell where a gNB detects a HARQ-ACK sub-codebook that includes all NACK/DTX values and where the gNB did not transmit a DL DCI format scheduling a PDSCH on the cell, the gNB can expect a HARQ-ACK sub-codebook having all NACK/DTX values and can use this a-priori information in decoding the HARQ-ACK codebook.

For a cell where a gNB detects a HARQ-ACK sub-codebook that includes all NACK/DTX values and where the gNB transmitted a DL DCI format scheduling a PDSCH on the cell conveying one or more data TBs, there are two cases. A first case is when the PDSCH conveys an initial transmission for the one or more data TBs. For the first case, the gNB can determine that either the UE failed to detect the DL DCI format or that the UE detected the DL DCI format but incorrectly received all CBGs. The gNB can retransmit the DL DCI format at a later time using a same RV value or a next RV value. A second case is when the PDSCH conveys a retransmission for CBGs of the one or more data TBs. For the second case, the gNB can determine that the UE failed to detect the DL DCI format. The gNB can retransmit the DL DCI format at a later time using a same RV. The DL DCI format can schedule a retransmission of the same CBGs as the DL DCI format that the UE previously failed to detect.

Figure 35:
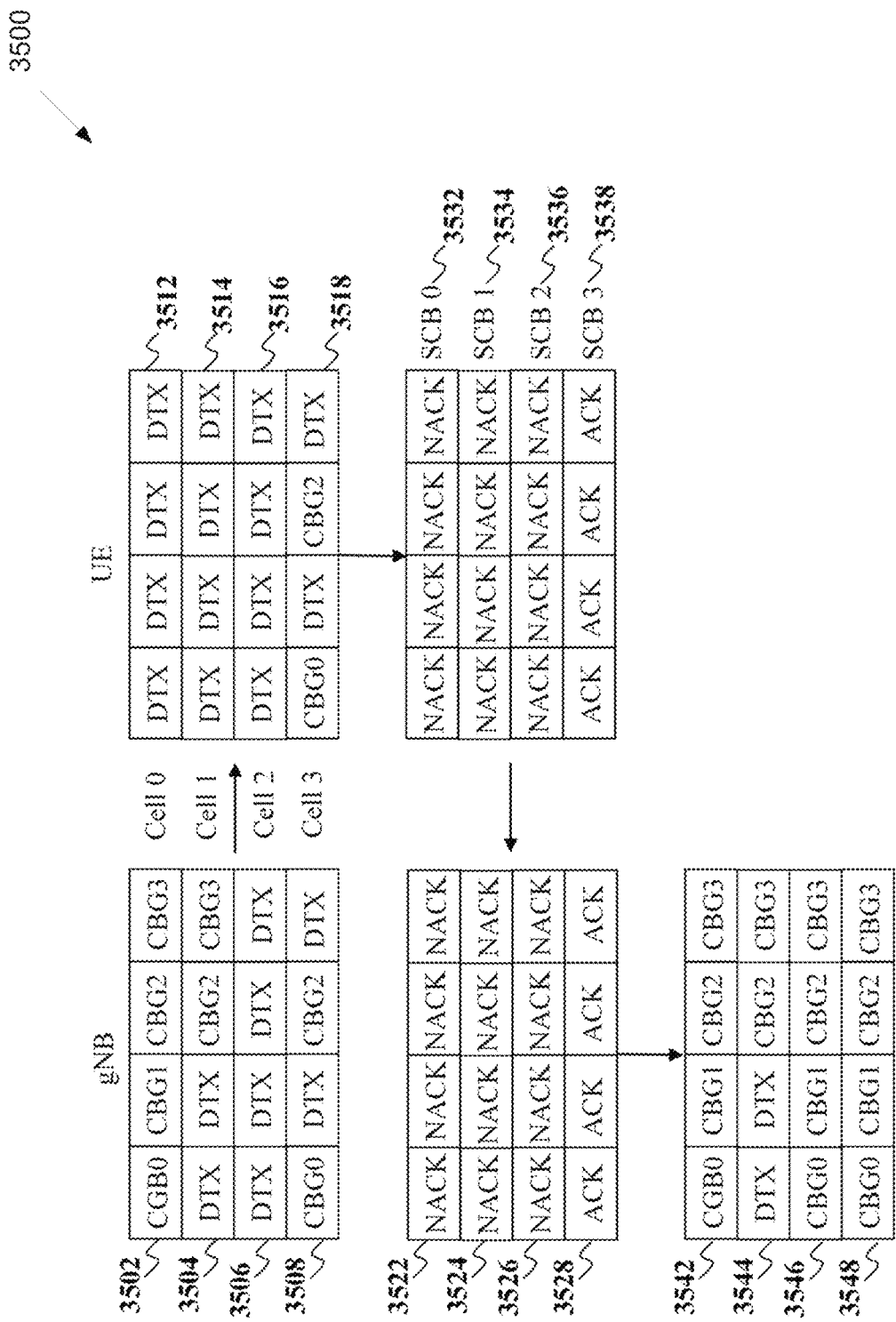
FIG. 35 illustrates an example UE to determine HARQ-ACK information corresponding to CBGs and for a gNB to perform CBG transmissions when the UE is configured for CA operation according to embodiments of the present disclosure.

FIG. 35 illustrates an example UE to determine HARQ-ACK information 3500 corresponding to CBGs and for a gNB to perform CBG transmissions when the UE is configured for CA operation according to embodiments of the present disclosure. The embodiment of the UE to determine HARQ-ACK information 3500 illustrated in FIG. 35 is for illustration only and could have the same or similar configuration. FIG. 35 does not limit the scope of this disclosure to any particular implementation.

As shown in FIG. 35, a gNB transmits in respective PDSCHs to a UE 4 CBGs on a first cell 3502, 2 CBGs on a second cell 3504, no CBGs/PDSCH on a third cell 3506, and 2 CBGs on a fourth cell 3508. The UE fails to detect a first DL DCI format scheduling the PDSCH reception conveying the 4 CBGs on the first cell 3512, fails to detect a second DL DCI format scheduling the PDSCH reception conveying the 2 CBGs on the second cell 3514, does not detect a DL DCI format scheduling a PDSCH reception on the third cell 3516, and detects a fourth DL DCI format scheduling the PDSCH reception conveying the 2 CBGs on the fourth cell 3518.

The UE generates a HARQ-ACK codebook that includes first 3522, second 3524, and third 3526 HARQ-ACK sub-codebooks (SCBs) each including 4 NACK/DTX values for the first, second, and third cells respectively, and a fourth 3528 HARQ-ACK sub-codebook that includes all ACK values reflecting a correct decoding of all CBGs. The gNB correctly detects the HARQ-ACK codebook 3530. The gNB transmits in respective PDSCHs to the UE the same 4 CBGs on the first cell 3542, the same 2 CBGs on the second cell 3544, 4 CBGs on the third cell 3546, and 4 new CBGs on the fourth cell 3548.

A UE can be configured to transmit HARQ-ACK information in a same HARQ-ACK codebook for several PDCCH monitoring instances, such as slots. For example, the UE can detect a first DL DCI during slot n that indicates transmission of corresponding HARQ-ACK information in a HARQ-ACK codebook during slot n+6 and also detect a second DL DCI format during slot n+3 that also indicates transmission of corresponding HARQ-ACK information in a HARQ-ACK codebook during slot n+6.

The UE does not detect any DL DCI formats in slots n+1 and n+2 and the UE cannot know whether or not there were DL DCI formats transmitted to the UE in slots n+1 and n+2 for the UE to include respective HARQ-ACK information in the HARQ-ACK codebook during slot n+6. A counter field in a DL DCI format can identify a number for the DL DCI format (such a counter can be avoided for indexing cells as a corresponding cell index can be configured in advance to the UE by higher layer signaling). This ambiguity can be resolved in a same manner as for the case of multiple cells in CA operation. The UE can be configured a number of DL DCI formats, or PDSCH transmissions, for the UE to report HARQ-ACK in a same HARQ-ACK codebook and the UE transmits a sub-codebook that includes a number of NACK/DTX values equal to the number of configured CBGs per TB for each DL DCI format from the number of DL DCI format that the UE failed to detect.

Having a maximum configured number of cells in a cell group and a maximum configured number of DL DCI formats over a number of PDCCH monitoring periods such as slots that a UE needs to transmit corresponding HARQ-ACK information in a same HAW-ACK codebook results to a maximum HARQ-ACK codebook size and limits a corresponding coverage.

One embodiment to reduce a maximum HARQ-ACK codebook size is to include a HARQ-ACK information counter number field in each DL DCI format that is a counter of a number of HARQ-ACK information bits that the UE needs to transmit in response to detection of DL DCI formats with smaller indexes that the DL DCI format including the DL DCI format. DL DO formats can be indexed first across the cell domain, according to a cell index of a corresponding scheduled PDSCH transmission, and the across the time domain according to a time index, such as a slot index, for a PDSCH transmission conveying the DL DO format.

For example, for a HARQ-ACK codebook corresponding to scheduling over a maximum of two cells and over a maximum of two time slots, a DL DCI format transmission in a first slot that schedules a PDSCH transmission on a first cell is indexed first, a DL DCI format transmission in a first slot that schedules a PDSCH transmission on a second cell is indexed second, a DL DCI format transmission in a second slot that schedules a PDSCH transmission on a first cell can be indexed third, and a DL DO format transmission in a second slot that schedules a PDSCH transmission on a second cell can be indexed fourth. A HARQ-ACK information counter field can include, for example, 4 bits for a configuration of 4 CBGs per TB or 5 bits for a configuration of 8 CBGs per TB. In this manner, the HARQ-ACK information counter field can result to an error-free operation when a UE fails to detect up to 3 DL DCI formats with consecutive indexes.

A DL DCI format can also include a HARQ-ACK information total number field, having for example a same number of bits as the HARQ-ACK information counter number field, to indicate a total number of HARQ-ACK information hits across all cells in a slot of the DL DCI format transmission. A UE can determine numeric values for the HARQ-ACK information counter number and the HARQ-ACK information total number in a same manner as for the counter DAI and the total DAI.

When a HARQ-ACK information total number field is not included in a DL DCI format, a gNB can decode a HARQ-ACK information codebook according to a few hypotheses, such as 4 hypotheses, corresponding to HARQ-ACK codebook sizes when the UE detects a DL DCI format with the largest HARQ-ACK information counter number value, when the UE fails to detect a DL DCI format with the largest HARQ-ACK information counter number value but detects a DL DCI format with the second largest HARQ-ACK information counter number value, when the UE fails to detect a DL DCI format with the two largest HARQ-ACK information counter number values but detects a DL DCI format with the third largest HARQ-ACK information counter number value, and when the UE fails to detect a DL DCI format with the three largest HARQ-ACK information counter number value but detects a DL DCI format with the fourth largest HARQ-ACK information counter number value.

Figure 36:
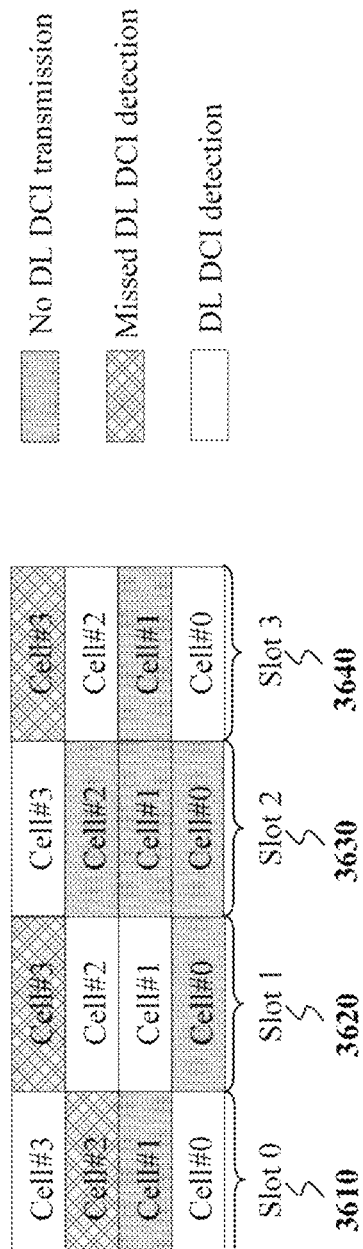
FIG. 36 illustrates an example operation of a HARQ-ACK information counter number field according to embodiments of the present disclosure.

FIG. 36 illustrates an example operation of a HARQ-ACK information counter number field 3600 according to embodiments of the present disclosure. The embodiment of the operation of a HARQ-ACK information counter number field 3600 illustrated in FIG. 36 is for illustration only and could have the same or similar configuration. FIG. 36 does not limit the scope of this disclosure to any particular implementation.

As shown in FIG. 36, a UE is configured for a HARQ-ACK codebook transmission corresponding to PDSCH receptions over a maximum of four cells and over a maximum of four slots. In a first slot 3610, a gNB transmits three DL DCI formats to a UE that respectively schedule PDSCH receptions that covey 2, 4, and 2 CBGs and having respective values for a HARQ-ACK information counter number field of 2, 6, and 8 3615. In a second slot 3620, the gNB transmits three DL DCI formats to the UE that respectively schedule PDSCH receptions that convey 4, 4, and 2 CBGs and having respective values for the HARQ-ACK information counter number field of 12, 16, and 18 3625.

In a third slot 3630, the gNB transmits one DL DCI format to the UE that schedules a PDSCH reception that coveys 2 CBGs and having a value for the HARQ-ACK information counter number field of 20 3635. In a fourth slot 3640, the gNB transmits three DL DCI formats to the UE that respectively schedule PDSCH receptions that covey 2, 4, and 4 CBGs and having respective values for the HARQ-ACK information counter number field of 22, 26, and 30 3645.

Based on the HARQ-ACK information counter number field values, the UE can form a HARQ-ACK codebook corresponding to all DL DCI formats transmitted by the gNB, including DL DCI formats that the UE failed to detect, except for the last DL DCI format transmitted in the fourth slot and scheduling a PDSCH reception on the fourth cell. When the UE correctly decodes a CBG, the UE sets a corresponding HARQ-ACK value to ACK. When the UE incorrectly decodes a CBG of fails to detect a DL DCI scheduling a CBG, the UE sets a corresponding HARQ-ACK value to NACK/DTX.

The UE reports a HARQ-ACK codebook that includes 26 HARQ-ACK information bit values instead of a correct HARQ-ACK codebook that includes 30 HARQ-ACK information bit values. The gNB can perform four decoding operations for the HARQ-ACK codebook according to a size of 30 bits, a size of 26 bits, a size of 22 bits, and a size of 20 bits.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for reporting hybrid automatic repeat request acknowledgement (HARQ-ACK) information, the method comprising:
  receiving:
    first downlink control information (DCI) formats associated with HARQ-ACK information of a first type, and
    second DCI formats associated with HARQ-ACK information of a second type;
  encoding the HARQ-ACK information of the first type and the HARQ-ACK information of the second type, wherein the HARQ-ACK information of the first type is separately encoded from the HARQ-ACK information of the second type;
  multiplexing the encoded HARQ-ACK information of the first type and the encoded HARQ-ACK information of the second type in a physical uplink shared channel (PUSCH); and
  transmitting the PUSCH.

2. The method of claim 1, wherein each of the first DCI formats includes a field with value indicating the first type for the associated HARQ-ACK information.

3. The method of claim 1, wherein the multiplexing of the HARQ-ACK information of the first type and of the HARQ-ACK information of the second type is sequential over PUSCH resource elements that are available for the multiplexing.

4. The method of claim 1, further comprising:
  receiving a DCI format scheduling the PUSCH transmission; and
  determining:
    a number of PUSCH resource elements for multiplexing the HARQ-ACK information of the first type according to a first offset value, and
    a number of PUSCH resource elements for multiplexing the HARQ-ACK information of the second type according to a second offset value, wherein the first offset value and the second offset value are indicated by a value of a field in the DCI format.

5. The method of claim 1, further comprising:
  receiving a DCI format scheduling the PUSCH transmission; and
  determining:
    a number of bits for the HARQ-ACK information of the first type based on a value of a first downlink assignment indicator (DAI) field in the DCI format, and
    a number of bits for the HARQ-ACK information of the second type based on a value of a second DAI field in the DCI format.

6. The method of claim 1, further comprising:
  receiving:
    first and second sets of parameter values for determining a power of PUSCH transmissions of the first type and the second type, respectively,
    a DCI format scheduling the PUSCH transmission; and determining:
   a type of the PUSCH transmission based on a value of a field in the DCI format, wherein the field indicates the type, and
   a power based on a set of parameter values for the type of the PUSCH transmission; and
transmitting the PUSCH using the power.

7. The method of claim 1, wherein:
the HARQ-ACK information of the first type corresponds to communication with a first latency or a first reliability, and
the HARQ-ACK information of the second type corresponds to communication with a second latency or a second reliability, wherein the first latency or the first reliability is different than the second latency or the second reliability.

8. A user equipment (UE), comprising:
a transceiver configured to receive:
   first downlink control information (DCI) formats associated with HARQ-ACK information of a first type, and
   second DCI formats associated with hybrid automatic repeat request (HARQ-ACK) information of a second type;
a processor, operably coupled to the transceiver, the processor configured to:
   encode the HARQ-ACK information of the first type and the HARQ-ACK information of the second type, wherein the HARQ-ACK information of the first type is separately encoded from the HARQ-ACK information of the second type, and
   multiplex the encoded HARQ-ACK information of the first type and the encoded HARQ-ACK information of the second type in a physical uplink shared channel (PUSCH); and
the transceiver is further configured to transmit the PUSCH.

9. The UE of claim 8, wherein each of the first DCI formats includes a field with value indicating the first type for the associated HARQ-ACK information.

10. The UE of claim 8, wherein the multiplexing of the HARQ-ACK information of the first type and of the HARQ-ACK information of the second type is sequential over PUSCH resource elements that are available for the multiplexing.

11. The UE of claim 8, wherein:
the transceiver is further configured to receive a DCI format scheduling the PUSCH transmission; and
the processor is further configured to determine:
   a number of PUSCH resource elements for multiplexing the HARQ-ACK information of the first type according to a first offset value, and
   a number of PUSCH resource elements for multiplexing the HARQ-ACK information of the second type according to a second offset value, wherein the first offset value and the second offset value are indicated by a value of a field in the DCI format.

12. The UE of claim 8, wherein:
the transceiver is further configured to receive a DCI format scheduling the PUSCH transmission; and
the processor is further configured to determine:
   a number of bits for the HARQ-ACK information of the first type based on a value of a first downlink assignment indicator (DAI) field in the DCI format, and
   a number of bits for the HARQ-ACK information of the second type based on a value of a second DAI field in the DCI format.

13. The UE of claim 8, wherein:
the transceiver is further configured to receive:
   first and second sets of parameter values for determining a power of PUSCH transmissions of the first type and the second type, respectively,
   a DCI format scheduling the PUSCH transmission; and
the processor is further configured to determine:
   a type of the PUSCH transmission based on a value of a field in the DCI format, wherein the field indicates the type, and
   a power based on a set of parameter values for the type of the PUSCH transmission; and
the transceiver is further configured to transmit the PUSCH using the power.

14. The UE of claim 8, wherein:
the HARQ-ACK information of the first type corresponds to communication with a first latency or a first reliability, and
the HARQ-ACK information of the second type corresponds to communication with a second latency or a second reliability, wherein the first latency or the first reliability is different than the second latency or the second reliability.

15. A base station, comprising:
a transceiver configured to:
   transmit:
      first downlink control information (DCI) formats associated with hybrid automatic repeat request (HARQ-ACK) information of a first type, and
      second DCI formats associated with HARQ-ACK information of a second type, and
   receive a physical uplink shared channel (PUSCH); and
a processor, operably coupled to the transceiver, the processor configured to:
   demultiplex HARQ-ACK information of the first type and HARQ-ACK information of the second type from the PUSCH, and
   decode the HARQ-ACK information of the first type and the HARQ-ACK information of the second type, wherein the HARQ-ACK information of the first type is separately decoded from the HARQ-ACK information of the second type.

16. The base station of claim 15, wherein each of the first DCI formats includes a field with value indicating the first type for the associated HARQ-ACK information.

17. The base station of claim 15, wherein the demultiplexing of the HARQ-ACK information of the first type and of the HARQ-ACK information of the second type is sequential over PUSCH resource elements that are available for the demultiplexing.

18. The base station of claim 15, wherein:
the transceiver is further configured to receive a DCI format scheduling the PUSCH transmission; and
the processor is further configured to determine:
   a number of PUSCH resource elements for multiplexing the HARQ-ACK information of the first type according to a first offset value, and
   a number of PUSCH resource elements for multiplexing the HARQ-ACK information of the second type according to a second offset value, wherein the first offset value and the second offset value are indicated by a value of a field in the DCI format.

19. The base station of claim 15, wherein:
the transceiver is further configured to receive a DCI format scheduling the PUSCH transmission; and
the processor is further configured to determine:
- a number of bits for the HARQ-ACK information of the first type based on a value of a first downlink assignment indicator (DAI) field in the DCI format, and
- a number of bits for the HARQ-ACK information of the second type based on a value of a second DAI field in the DCI format.

20. The base station of claim 15, wherein:
the transceiver is further configured to receive:
- first and second sets of parameter values for determining a power of PUSCH transmissions of the first type and the second type, respectively,
- a DCI format scheduling the PUSCH transmission; and the processor is further configured to determine:
- a type of the PUSCH transmission based on a value of a field in the DCI format, wherein the field indicates the type, and
- a power based on a set of parameter values for the type of the PUSCH transmission; and the transceiver is further configured to transmit the PUSCH using the power.

* * * * *